(12) United States Patent
Meyers

(10) Patent No.: US 8,549,204 B2
(45) Date of Patent: Oct. 1, 2013

(54) METHOD AND APPARATUS FOR SCHEDULING TRANSACTIONS IN A MULTI-SPEED BUS ENVIRONMENT

(75) Inventor: Christopher Michael Meyers, Beaverton, OR (US)

(73) Assignee: Fresco Logic, Inc., Beaverton, OR (US)

( * ) Notice: Subject to any disclaimer, the term of this patent is extended or adjusted under 35 U.S.C. 154(b) by 192 days.

(21) Appl. No.: 13/032,240

(22) Filed: Feb. 22, 2011

(65) Prior Publication Data
US 2011/0208892 A1   Aug. 25, 2011

Related U.S. Application Data

(63) Continuation-in-part of application No. 13/015,392, filed on Jan. 27, 2011.

(60) Provisional application No. 61/307,939, filed on Feb. 25, 2010, provisional application No. 61/307,929, filed on Feb. 25, 2010, provisional application No. 61/369,668, filed on Jul. 31, 2010, provisional application No. 61/369,686, filed on Jul. 31, 2010, provisional application No. 61/391,027, filed on Oct. 7, 2010.

(51) Int. Cl.
G06F 13/20 (2006.01)
G06F 13/42 (2006.01)
G06F 3/06 (2006.01)

(52) U.S. Cl.
CPC .......... *G06F 13/4226* (2013.01); *G06F 3/0659* (2013.01)
USPC ................. 710/313; 710/6; 710/17; 710/308; 710/310; 710/311

(58) Field of Classification Search
USPC .......................................................... 710/313
See application file for complete search history.

(56) References Cited

U.S. PATENT DOCUMENTS

| | | | |
|---|---|---|---|
| 6,959,355 B2 * | 10/2005 | Szabelski | 710/313 |
| 7,185,126 B2 * | 2/2007 | Szabelski | 710/60 |
| 2003/0065839 A1 | 4/2003 | Howard et al. | |
| 2004/0168001 A1 * | 8/2004 | Szabelski | 710/62 |
| 2004/0168009 A1 * | 8/2004 | Szabelski | 710/313 |
| 2006/0020737 A1 * | 1/2006 | Szabelski | 710/313 |
| 2006/0059293 A1 * | 3/2006 | Wurzburg et al. | 710/313 |

(Continued)

OTHER PUBLICATIONS

U.S. Appl. No. 13/015,392, filed Jan. 27, 2011.
Compaq et al., "Universal Serial Bus Specification Revision 1.1," Sep. 23, 1998.

(Continued)

*Primary Examiner* — Ryan Stiglic
(74) *Attorney, Agent, or Firm* — Stoel Rives LLP

(57) ABSTRACT

Systems and methods schedule periodic and non-periodic transactions in a multi-speed bus environment that includes in a downstream hub a data forwarding component, such as a USB transaction translator, which accommodates communication speed shifts at the hub. The method may comprise receiving a split packet request defining a transaction with a device, tagging the request with an identifier allocated to the data forwarding component, storing the request in a transaction list associated with the identifier, initiating transfer of payload data, and updating a counter associated with the identifier to reflect an amount of payload data for which transfer was initiated. The identifier may have associated therewith a counter for tracking a number of bytes-in-progress to the data forwarding component and one or more transaction lists configured to store a plurality of split packet requests awaiting execution and state information regarding an execution status of the requests.

29 Claims, 21 Drawing Sheets

(56) References Cited

U.S. PATENT DOCUMENTS

2006/0095604 A1* 5/2006 Edirisooriya ............... 710/22
2006/0227759 A1* 10/2006 Bohm et al. ............... 370/351
2007/0208895 A1* 9/2007 Chang et al. ............... 710/110
2007/0245058 A1* 10/2007 Wurzburg et al. ............. 710/313
2008/0005262 A1* 1/2008 Wurzburg et al. ............. 709/217

OTHER PUBLICATIONS

Compaq et al., "Universal Serial Bus Specification Revision 2.0," Apr. 27, 2000 (in particular, Chapter 11 and section 8.4.2.).

Hewlett-Packard Co. et al., "Universal Serial Bus 3.0 Specification Revision 1.0," Nov. 12, 1998.

* cited by examiner

METHOD AND APPARATUS FOR SCHEDULING TRANSACTIONS IN A MULTI-SPEED BUS ENVIRONMENT

RELATED APPLICATIONS

This application is a continuation-in-part of and claims priority under 35 U.S.C. §120 from U.S. application Ser. No. 13/015,392, filed Jan. 27, 2011, and claims the benefit under 35 U.S.C. §119(e) of U.S. Provisional Patent Application No. 61/307,939, filed Feb. 25, 2010; U.S. Provisional Patent Application No. 61/307,929, filed Feb. 25, 2010; U.S. Provisional Patent Application No. 61/369,668, filed Jul. 31, 2010; U.S. Provisional Patent Application No. 61/369,686, filed Jul. 31, 2010; and U.S. Provisional Patent Application No. 61/391,027, filed Oct. 7, 2010. Each of the above applications are hereby incorporated by reference in their entireties.

COPYRIGHT NOTICE

© 2010 Fresco Logic, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

The field of this disclosure relates generally to serial bus data transfer and, in particular, to executing transactions in a multi-speed bus environment.

BACKGROUND

Various interfaces have been designed to facilitate data exchange between a host computer and peripheral devices, such as keyboards, scanners, and printers. One common bus-based interface is the Universal Serial Bus (USB), which is a polled bus in which the attached peripherals share bus bandwidth through a host-scheduled, token-based protocol. The bus allows peripheral devices to be attached, configured, used, and detached while the host and other peripheral devices are operating.

Hubs provide additional connections to the USB. A hub typically includes an upstream facing port that communicates with the host (or an upstream hub) and one or more downstream facing ports, each of which can communicate with a peripheral device or downstream hub. Because the USB supports various data transfer rates (e.g., low-speed, full-speed, and high-speed), a hub typically includes one or more transaction translators to accommodate speed shifts at the hub. For example, if the hub communicates with the host at high-speed and has a low-speed or full-speed device connected to one of its downstream facing ports, the transaction translator converts special high-speed transactions called split transactions to low-speed or full-speed transactions so that data can be transferred between the host and the hub at high-speed. To accommodate speed shifts at the hub, a transaction translator includes buffers to hold transactions that are in progress. The buffers essentially provide an interface between the high-speed signaling environment and the low-speed and full-speed signaling environments.

Split transactions are scheduled by host software to communicate with low-speed and full-speed devices that are attached to downstream high-speed hubs. The split transactions convey isochronous, interrupt, control, and bulk transfers across the high-speed bus to hubs that have low-speed or full-speed devices attached to their ports. Periodic transactions, such as isochronous transfers with USB speakers or interrupt transfers with USB keyboards, have strict timing requirements. Thus, periodic transactions need to move across the high-speed bus, through the transaction translator, across the low-speed or full-speed bus, back through the transaction translator, and onto the high-speed bus in a timely manner. Non-periodic transactions, such as bulk transfers with USB printers or control transfers for device configuration, do not have strict timing requirements.

For periodic transactions, the host software initiates high-speed split transactions at the appropriate time intervals to help avoid buffer overflows and buffer underflows at the periodic transaction buffers within the transaction translator. The host software traditionally predetermines the dispatch schedule for scheduled periodic traffic destined for transaction translators based on frequency and bandwidth considerations. The predetermined dispatch schedule is typically calculated or recalculated if there is a change to the number of periodic data pipelines in the system, which may interrupt periodic streaming data. An example hardware/software interface to control packet execution is specified in the enhanced host controller interface (EHCI) specification, which uses a frame list tree structure and a set of mask bits to control the start and complete split execution of periodic split packets.

DETAILED DESCRIPTION

Figure 1:
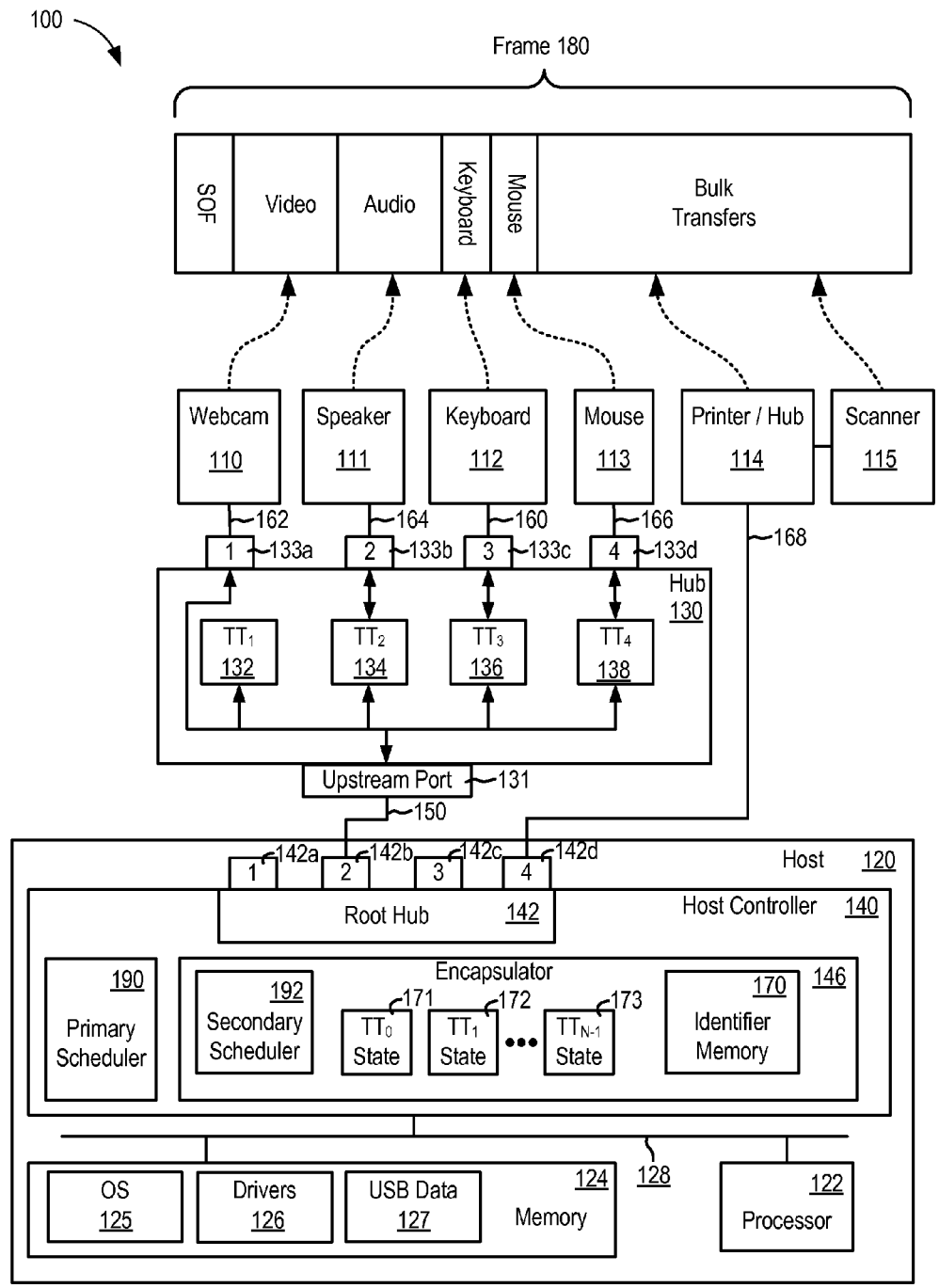
FIG. 1 is a block diagram illustrating a plurality of devices attached to a host via an intermediate hub, according to one embodiment.

With reference to the above-listed drawings, this section describes particular embodiments and their detailed construction and operation. The embodiments described herein are set forth by way of illustration only and not limitation. Those skilled in the art will recognize in light of the teachings herein that, for example, other embodiments are possible, variations can be made to the example embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments. For example, additional details regarding the USB, split-transactions, low-speed transactions, full-speed transactions, high-speed transactions, hubs, and transaction translators can be found in the Universal Serial Bus Specification Revision 2.0, dated Apr. 27, 2000 (available from USB Implementers Forum, Inc. at http://www.usb.org/developers/docs/), which is hereby incorporated by reference in its entirety. In particular, Chapter 11 of the USB Specification Revision 2.0 provides additional details regarding hubs, transaction translators, and split-transactions. Additional details regarding the split-transaction protocol are described in section 8.4.2 of the USB Specification Revision 2.0.

As one skilled in the art will appreciate in light of this disclosure, certain embodiments may be capable of achieving certain advantages, including some or all of the following: (1) avoiding much of the software driver complexity to control periodic packet execution; (2) providing a simpler hardware/software interface to control periodic packet execution; (3) avoiding a software requirement to watch over all active periodic data pipes in order to build the timing map; (4) enabling virtualization for the host operating system(s) by freeing a software driver from having to watch over all active periodic data pipes; (5) by scheduling in real-time there is no predetermined schedule required except to deliver the packet information at the required interval rate, thereby resulting in simpler addition or removal of pipes to the periodic schedule without interrupting to rebuild or rebalance the schedule; (6) providing a logic-based hardware scheduler; (7) providing a logic-based hardware scheduler that collects all information for each packet to be executed to a downstream transaction translator in an upcoming frame interval (e.g., 1 millisecond (ms)) on a USB 2.0 high-speed bus; (8) by implementing a logic-based scheduler that determines dispatch timing of periodic packets in real-time, the driver can be freed from the task of timing map rebalance and transitioning from a first timing map (e.g., timing map A) to a second timing map (e.g., timing map B) during the attachment or removal of a new device to the bus; (9) providing a logic-based scheduler that determines dispatch timing of periodic packets in real-time facilitates rapid purge and recovery upon detection of an error with a downstream data forwarding component; (10) providing a host controller that dynamically determines a schedule (e.g., timing map) facilitates packing transactions close together in each frame to thereby maximize bus-idle time and yield opportunities for improved power savings by, for example, keeping a transceiver powered down for longer periods of time; and (11) providing a logic-based hardware scheduler that facilitates smaller application software code (e.g., drivers) by eliminating the need for the software code to incorporate a scheduling and balancing function. These and other advantages of various embodiments will be apparent upon reading this document.

FIG. 1 is a block diagram of an example system 100 in which the packet execution methods described herein may be implemented. In the system 100, a plurality of devices 110-115 are attached to a host 120 via an intermediate hub 130. The hub 130 incorporates a plurality of transaction translators 132-138, which facilitate speed shifts between buses operating at different communication speeds or data transfer rates. For example, a first bus 150, which couples the hub 130 to the host 120, operates at a first communication speed (e.g., high-speed) while a second bus 160, which couples a keyboard 112 to the hub 130, operates at a second communication speed (e.g., low-speed or full-speed). The host controller 140 includes primary and secondary schedulers 190 and 192 to determine when the host controller 140 will move data between the host 120 and a device (e.g., the devices 110-115). The primary scheduler 190 is configured to dispatch transactions at all transaction speeds supported by the host controller 140 (e.g., low-speed, full-speed, high-speed, and super-speed). The secondary scheduler 192 is configured to dispatch split transactions, which facilitate transferring data between the host 120 and the hub 130 at the first communication speed (e.g., high-speed) while data is transferred between the hub 130 and a device (e.g., the keyboard 112) at the second communication speed (e.g., low-speed or full-speed).

According to one embodiment, transactions traverse the second bus 160 at a full-speed or low-speed data transfer rate during one millisecond (ms) frame intervals. Periodic transactions, such as isochronous transfers with the speaker 111 or interrupt transfers with the keyboard 112, have strict timing requirements and are dispatched either every one millisecond or some power-of-two multiplier of every one millisecond. The primary scheduler 190 is configured to determine what millisecond frame interval a split transaction should be executed by the hub 130 and posts the split transaction to the secondary scheduler 192 preceding the target one-millisecond frame. Transactions traverse the first bus 150 at a high-speed data transfer rate during 125 microsecond frame intervals (e.g., the frame rate on the high-speed bus is eight times faster than the frame rate on the low-speed or full-speed bus).

The secondary scheduler 192 is configured to break a transaction destined for a low-speed or full-speed device (which may take one millisecond to execute on the second bus 160) into multiple sub-packets and determine which 125 microsecond frame intervals to transmit those sub-packets to the hub 130 via the first bus 150.

Data stored in transaction translator state fields 171-173 helps ensure that a targeted downstream transaction translator does not overflow or underflow. Information that may be used by the secondary scheduler 192 to determine when to dispatch split transactions includes, for example, one or more of the maximum packet size of a data payload to be moved, the direction of the data movement (e.g., an IN or OUT transaction relative to the host 120), and an identifier of the target transaction translator. Each transaction translator (e.g., transaction translators 132-138) may be identified solely by an address of the hub if one transaction translator is shared by all of the hub's ports (e.g., hub 1150 in FIG. 11). Alternatively, if one transaction translator is provided for each port as illustrated in FIG. 1, a transaction translator may be uniquely identified an address of the hub and a port number associated with the target transaction translator.

An identifier memory 170 is provided to store data used to associate transaction translators in communication with the host controller 140 to a unique identifier. The identifier memory 170 along with a plurality of state fields 171-173 are provided to track the state of transaction translators (e.g., transaction translators 134-138) within hubs that are in communication with the host 120. For example, the identifier memory 170 and the state fields 171-173 may be configured to track information such as the number of outstanding transactions of each type (e.g., non-periodic and periodic), the bytes-in-progress to downstream transaction translators, and other information used to determine when to dispatch split transactions (e.g., the maximum packet size of a data payload to be moved and the direction of the data movement). The primary and secondary schedulers 190 and 192 use the tracked state information to make real-time and immediate determinations for dispatching packets (e.g., non-periodic and periodic packets) from the host 120 to downstream transaction translators. The identifier memory 170 preferably includes one identifier for each transaction translator downstream from the host 120. Each identifier element within the identifier memory 170 can be marked unused when there are no active entries and then it can be reused at another time by another transaction translator. According to one embodiment, the identifier memory 170 comprises an associative array.

Referring again to FIG. 1, the system 100 includes the host 120, which may be any computing device, such as a general-purpose computer, personal computer, embedded system (e.g., a system that is embedded into a complete device and is designed to perform a few dedicated functions or tasks), or other device (e.g., mobile phone, smartphone, or set-top box). The host 120 performs several functions, such as detecting the attachment and removal of devices (e.g., the devices 110-115 and the hub 130), managing control and data flow between the host 120 and the devices, collecting status and activity statistics, and providing power to the attached devices. The host 120 includes a processor 122 connected to a memory 124 and the host controller 140. The connection may be via a bus 128, such as a peripheral component interconnect express (PCIe) bus, an advanced microcontroller bus architecture (AMBA) high-performance bus (AHB), an AMBA advanced extensible interface (AXI), or a CoreConnect bus, or other communication mechanism, such as direct connections of a serial, parallel, or other type.

The processor 122 may be any form of processor and is preferably a digital processor, such as a general-purpose microprocessor or a digital signal processor (DSP), for example. The processor 122 may be readily programmable; hard-wired, such as an application specific integrated circuit (ASIC); or programmable under special circumstances, such as a programmable logic array (PLA) or field programmable gate array (FPGA), for example. Program memory for the processor 122 may be integrated within the processor 122, may be part of the memory 124, or may be an external memory. The processor 122 executes one or more programs to control the operation of the other components, to transfer data between components, to associate data from the various components together (preferably in a suitable data structure), to perform calculations using the data, to otherwise manipulate the data, and to present results to the user. For example, the processor 122 preferably executes software to manage interactions between attached devices and host-based device software, such as device enumeration and configuration, isochronous and asynchronous data transfers, power management, and device and bus management information.

The memory 124 may comprise any suitable machine readable medium, such as random access memory (RAM), read only memory (ROM), flash memory, and EEPROM devices, and may also include magnetic or optical storage devices, such as hard disk drives, CD-ROM drives, and DVD-ROM drives. In certain embodiments, the host controller 140 is a shared memory host controller in which the memory 124 (e.g., RAM) is shared between the host controller 140 and the processor 122. In addition, or alternatively, an interface may be coupled to the bus 128 so that memory 124 or another memory, such as flash memory or a hard disk drive, are accessible locally or accessible remotely via a network.

Operating system (OS) 125 and drivers 126 may be stored in memory 124 or in another memory that is accessible to the host 120. The drivers 126 serve as the interface between the operating system 125 and the various hardware components that are included in the host 120, such as the memory 124 and the host controller 120, and other components that may be included in the host 120, such a display driver, network interface, and input/output controller. For example, for each hardware component included in the host 120, a driver for that component may be stored in memory 124. Data 127 may also be stored in memory 124 or in another memory that is accessible to the host 120. The data 127 may include data awaiting transfer to one of the devices 110-115, such as audio output destined for a speaker 111 or print data destined for a printer 114. The data 127 may also include data received from one of the devices 110-115, such as video data from a webcam 110, user input data from the keyboard 112 or a mouse 113, or image data from a scanner 115.

The host 120 interacts with devices 110-115 through the host controller 140, which functions as an interface to the host 120 and allows for two-way communication with the attached devices (e.g., the devices 110-115 and the hub 130). Various devices may be coupled to the host 120 via the host controller 140, such as the webcam 110, speaker 111, keyboard 112, mouse 113, printer 114, and scanner 115. Other devices that may be coupled to the host controller 140 include, for example, cameras, MP3 players, and other input devices such as a pen and tablet and a trackball. Although only one host controller is illustrated in FIG. 1, multiple host controllers may be included in the host 120. In addition, each of the devices 110-115 may serve as a hub for other devices. For example, the printer 114 provides hub functionality so that another device, such as the scanner 115, can be coupled to the host 120 via a hub within the printer 114. Further, external hubs, such as the hub 130, may be coupled to the host controller 140.

In the embodiment illustrated in FIG. 1, the host controller 140 includes a root hub 142 and an encapsulator 146. The root hub 142 is directly attached to or embedded in the host controller 140 and includes one or more root ports, such as root ports 1-4 (which are labeled 142a-142d in FIG. 1). The root hub 142 provides much of the same functionality as an externally connected hub, such as the hub 130, but the root hub 142 is integrated within the host 120 and the hardware and software interface between the root hub 142 and the host controller 140 is defined by the specific hardware implementation. A set of host controller state machines manage the attachment and removal of devices to the system 100 and manage the traversal of data between the host 120 and attached devices (e.g., the devices 110-115 and the hub 130).

According to one embodiment, the encapsulator 146 is configured to generate split transactions, which are special transactions that are generated and scheduled by the host 120 to facilitate speed shifts between buses operating at different communication speeds or data transfer rates, such as when the host 120 communicates with low-speed and full-speed devices that are attached to downstream high-speed hubs. The encapsulator 146 builds fields around a normal packet (e.g., an IN or OUT token packet) and collects information used to execute the normal packets. The information collected by the encapsulator 146 includes the state of transaction translators (e.g., transaction translators 134-138) within hubs that are in communication with the host 120. The identifier memory 170 and the plurality of state fields 171-173 are configured to store state information concerning various transaction translators, such as the number of outstanding transactions, bytes-in-progress to downstream transaction translators, the maximum packet size of a data payload to be moved, and the direction of the data movement. The state information tracked using the identifier memory 170 and the plurality of state fields 171-173 is used by the primary and secondary schedulers 190 and 192 to dispatch packets from the host 120 to downstream transaction translators.

After the encapsulator 146 receives a split packet request to initiate a split transaction, the encapsulation of a packet between the host 140 and a targeted transaction translator begins. Transfer-initiating requests, such as start-split tokens, are doled out by the encapsulator 146 to help ensure that the target transaction translator has sufficient forward packet headers and data to keep issuing packets until all are exhausted. The state information tracked using the identifier memory 170 and the plurality of state fields 171-173 is used by the primary and secondary schedulers 190 and 192 to help avoid buffer overflows and buffer underflows at the transaction buffers within the transaction translators. For example, transfer-initiating requests may be issued up to 188 bytes per 125 microsecond frame interval for OUT transactions per transaction translator instance. Additional details for multiple packets and various packet lengths are described in more detail below. Transfer-completing requests, such as complete-split tokens, are preferably issued no sooner than the second microsecond frame interval after a corresponding transfer-initiating request was issued. Transfer-completing requests may continue until a terminating event, such as the final data is received or other terminating indication, such as reaching the last window for a current bus frame interval. Certain transactions, such as isochronous OUT transactions, do not utilize transfer-completing requests. According to one embodiment, the encapsulator 146 is implemented in hardware, but the encapsulator 146 may be implemented in any combination of hardware, firmware, or software. Additional details regarding the encapsulator 146 will be described with reference to FIGS. 2, 9-11, 16, and 19.

The host controller 140 may be implemented in any combination of hardware, firmware, or software. According to a preferred embodiment, the host controller 140 implements a USB protocol, such as one or more of USB 1.0 described in Universal Serial Bus Specification Revision 1.1, dated September 1998, USB 2.0 described in Universal Serial Bus Specification Revision 2.0, dated Apr. 27, 2000, and USB 3.0 described in Universal Serial Bus 3.0 Specification Revision 1.0, dated Nov. 12, 2008, all of which are available from USB Implementers Forum, Inc. at http://www.usb.org/developers/docs/ and are hereby incorporated by reference in their entireties. According to other embodiments, the host controller 140 implements other protocols, such as a future USB version or another protocol that imposes a tiered ordering on a star topology to create a tree-like configuration.

Hosts according to other embodiments may have less than all of the components illustrated in FIG. 1, may contain other components, or both. For example, the host 120 may include a number of other components that interface with one another via the bus 128, including a display controller and display device, an input controller, and a network interface. The display controller and display device may be provided to present data, menus, and prompts, and otherwise communicate with a user via one or more display devices. The network interface may be provided to communicate with one or more hosts or other devices. The network interface may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet). A wireless connection may use low or high powered electromagnetic waves to transmit data using any wireless protocol, such as Bluetooth™, IEEE 802.11b/g/n (or other WiFi standards), infrared data association (IrDa), and radiofrequency identification (RFID).

An upstream port 131 of the hub 130 is coupled to port 2 (142b) of the root hub 142 via the first bus 150. As used herein, upstream refers to the port on a hub that is closest to the host in a communication topology sense and downstream refers to the port on the hub that is furthest from the host in a communication topology sense.

The hub 130 incorporates transaction translators 132, 134, 136, and 138, which facilitate speed shifts between buses operating at different communication speeds or data transfer rates. For example, as illustrated in FIG. 1, several devices are coupled to downstream ports 1-4 (133a-133d) via a respective bus 160-166. The speaker 111, keyboard 112, and mouse 113 communicate with the hub 130 at a communication speed that is less than the speed at which the hub 130 communicates with the host 120. For example, the speaker 111 may communicate with the hub 130 at full-speed and the keyboard 112 and mouse 113 may communicate with the hub 130 at slow-speed or full-speed while the hub 130 communicates with the host 120 at high-speed. Transaction translators 134-138 are utilized to translate transactions as the transactions transition between the slow-speed or full-speed signaling environment and the high-speed signaling environment. In contrast, the webcam 110 communicates with the hub 130 at a speed (e.g., high-speed) that is the same or substantially similar to the speed at which the hub 130 communicates with the host 120. Because there is no speed shift at the hub 130, data flowing between the webcam 110 and the host 120 bypasses the transaction translator 132. The transaction translators provide a mechanism to support slower devices (e.g., low-speed or full-speed devices) behind the hub 130, while all device data between the host 120 and the hub 130 is transmitted at a faster speed (e.g., high-speed).

In the example configuration illustrated in FIG. 1, the first bus 150 operates at a first communication speed while the second bus 160, a third bus 164, and a fourth bus 166 operate at a second communication speed that is different from the first communication speed. A fifth bus 162 and a sixth bus 168, which couples the printer 114 having an integral hub to port 4 (142d) of the root hub 142, also operate at the first communication. According to one embodiment, the first communication speed corresponds to a USB high-speed data transfer rate of approximately 480 megabits per second and the second communication speed corresponds to one of a USB low-speed data transfer rate of approximately 1.5 megabits per second or a USB full-speed data transfer rate of approximately 12 megabits per second. However, the first and second communication speeds may correspond to other data transfer rates. For example, the first communication speed may correspond to a USB super-speed data transfer rate of approximately 5 gigabits per second and the second communication speed may correspond to one of a USB high-speed, full-speed, or low-speed data transfer rate.

The devices (e.g., devices 110-115 and the hub 130) in communication with the host 120 share bus bandwidth. FIG. 1 illustrates a frame 180 depicting a variety of potential transactions that could be performed during a single frame (e.g., a one millisecond frame). The frame 180 illustrated in FIG. 1 is a contrived example to illustrate the shared nature of a frame. Not every device 110-115 will necessarily transfer data during each frame. For example, host software might poll the keyboard 112 every nth frame to check for keystrokes. Some devices require bandwidth every frame (e.g., isochronous transactions for speaker 111) while other devices transfer large blocks of data that do not have strict timing requirements (e.g., asynchronous transfers for the printer 114). When an application requires large amounts of bandwidth every frame, little bandwidth may be left for bulk transfers (e.g., for the printer 114 or scanner 115), which may, for example, slow or even stop the transfer of data to the printer 114. If the host controller 140 tries to poll the keyboard 112 when the buffer(s) within the transaction translator 136 are full, the hub 130 will not accept the transaction and the host controller 140 resends the same transaction during another frame, which may further slow the transfer of data to the printer 114, for example. By checking the state of the transaction translators 134-138 within the hub 130, the host controller 140 can determine when the buffer(s) within the transaction translator 136 are full, for example, and refrain from sending further transactions until the buffer(s) are ready to accept additional data. Thus, checking the state of the transaction translators helps improve bus efficiency, which may speed up the transfer of data to the printer 114, for example.

Figure 2:
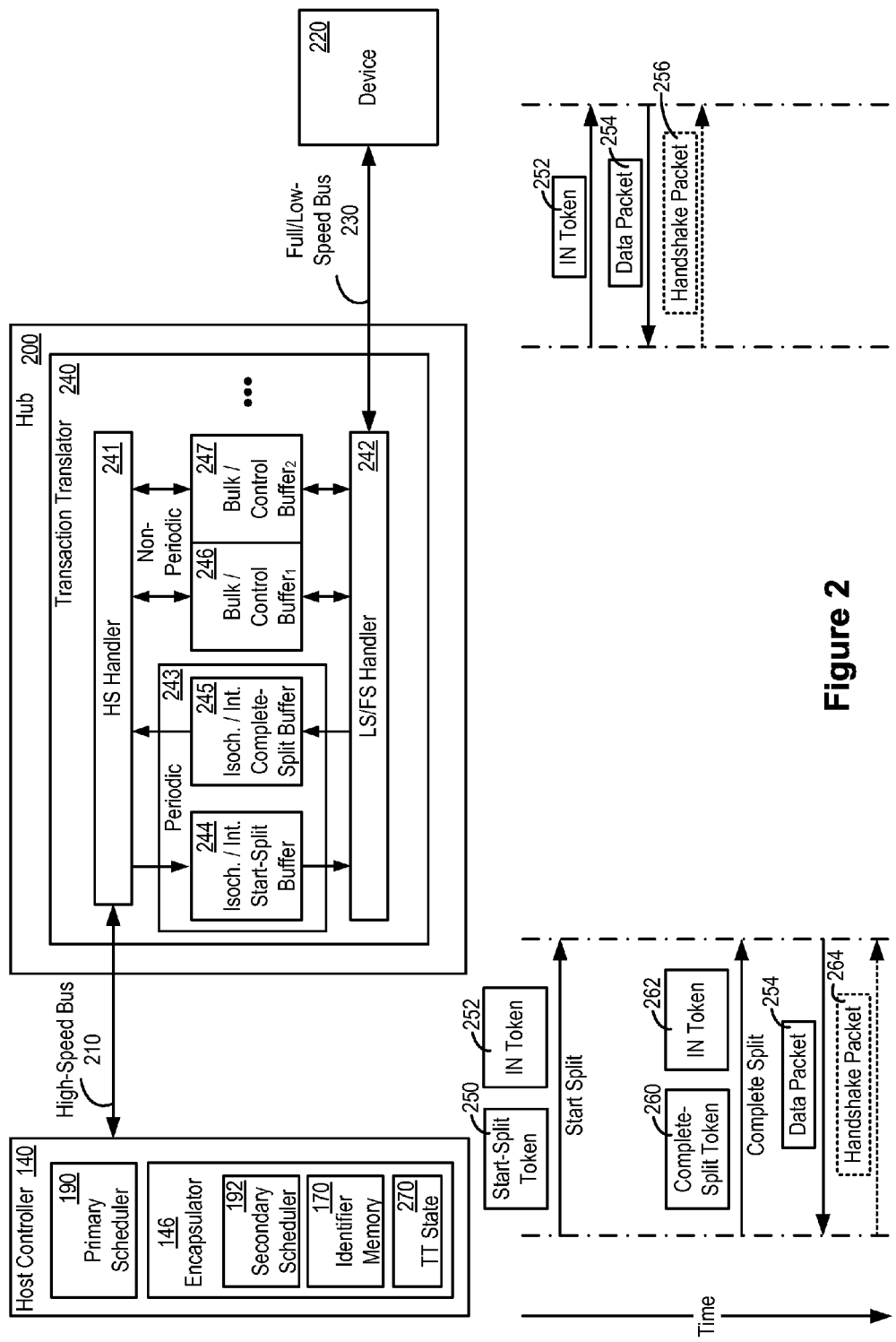
FIG. 2 is block diagram illustrating the interaction between various components within a hub that facilitate speed shifts when the hub communicates with a host controller over a high-speed bus and the hub communicates with a device over a low-speed or full-speed bus, according to one embodiment.

FIG. 2 is block diagram illustrating the interaction between various components within a hub 200 that facilitate speed shifts when the hub 200 communicates with the host controller 140 over a high-speed bus 210 and the hub 200 communicates with a device 220 over a low-speed or full-speed bus 230, according to one embodiment. As described with reference to FIG. 1, the host controller 140 implements a USB protocol, such as one or more of USB 2.0 and USB 3.0. The USB is polled bus in which the host controller 140 initiates data transfers. The data transfers involve the transmission of packets, which are bundles of data organized in a group for transmission. After the primary and secondary schedulers determine when to execute a transaction, the host controller 140 sends a token packet that identifies what transaction is to be performed on the bus. For example, the token packet may describe the type and direction of transaction, the device address, and endpoint number. The device that is addressed (e.g., the device 220) selects itself by decoding the appropriate address fields. In a given transaction, a data payload is transferred either from the host to a device (an OUT transfer) or from a device to the host (an IN transfer). The direction of data transfer is specified in the token packet. The source of the transaction then sends a data packet or indicates it has no data to transfer. The destination (e.g., the device 220) may respond with a handshake packet indicating whether the transfer was successful.

The hub 200 includes one or more transaction translators 240 to facilitate speed shifts at the hub 200. The transaction translator 240 is responsible for participating in high-speed split transactions on the high-speed bus 210 via its upstream facing port and issuing corresponding low-speed or full-speed transactions on its downstream facing ports that are operating at low-speed or full-speed. The transaction translator 240 acts as a high-speed function on the high-speed bus 210 and performs the role of a host controller for its downstream facing ports that are operating at low-speed or full-speed. The transaction translator 240 includes a high-speed handler 241 to handle high-speed transactions. The transaction translator 240 also includes a low-speed/full-speed handler 242 that performs the role of a host controller on the downstream facing ports that are operating at low-speed or full-speed.

The transaction translator 240 includes buffers 244-247 to hold transactions that are in progress. The buffers 244-247 (e.g., first-in, first-out (FIFO) buffers) provide the connection between the high-speed handler 241 and the low-speed/full-speed handler 242. The high-speed handler 241 accepts high-speed start-split transactions or responds to high-speed complete-split transactions. The high-speed handler 241 stores the start-split transactions in one of buffers 244, 246, or 247 so that the low-speed/full-speed handler 242 can execute the transaction on the low-speed or full-speed bus 230. The transaction translator 240 includes a periodic buffer section 243, which includes a start-split buffer 244 and a complete-split buffer 245 for isochronous or interrupt low-speed or full-speed transactions, and two non-periodic buffers 246 and 247 for bulk or control low-speed or full-speed transactions. Transaction translators according to other embodiments may include fewer or additional buffers.

The start-split buffer 244 stores isochronous or interrupt start-split transactions. The high-speed handler 241 fills the start-split buffer 244 and the low-speed/full-speed handler 242 reads data from the start-split buffer 244 to issue corresponding low-speed or full-speed transactions to low-speed or full-speed devices attached on downstream facing ports. The complete-split buffer 245 stores the results (e.g., data or status) of low-speed or full-speed transactions. The low-speed/full-speed handler 242 fills the complete-split buffer 245 with the results of the low-speed or full-speed transactions and the high-speed handler 241 empties the complete-split buffer 245 in response to a complete-split transaction from the host controller 140. The start-split and complete-split buffers 244 and 245 may be sized so that each buffer stores multiple transactions. According to one embodiment, the start-split and complete-split buffers 244 and 245 are sized to accommodate sixteen simultaneous periodic transactions but not necessarily the data for those sixteen transactions at one time. For example, the start-split buffer 244 may be sized to accommodate four data packets (e.g., for OUT transactions) plus sixteen low-speed or full-speed tokens (e.g., for IN or OUT transactions) for four microframes, or approximately 1008 bytes (4*188 bytes for the data packets plus 16*4*4 bytes for the headers). In other words, the start-split buffer 244 is sized to buffer four microframes of data, according to one embodiment. The complete-split buffer 245 may be sized to accommodate two data packets (e.g., for IN transactions) plus sixteen low-speed or full-speed tokens (e.g., for IN or OUT transactions) for two microframes, or approximately 504 bytes (2*188 bytes for the data packets plus 16*2*4 bytes for the headers). In other words, the complete-split buffer 245 is sized to buffer two microframes of data, according to one embodiment. The size of the start-split and complete-split buffers 244 and 245 may be used as a basis for the number of periodic packets to execute in a given frame interval, which will be discussed in more detail below with reference to FIGS. 12, 13, and 14.

The transaction translator 240 illustrated in FIG. 2 includes two non-periodic buffers 246 and 247, each of which is sized to store a single transaction. Thus, the transaction translator 240 can only support two bulk or control low-speed or full-speed transactions concurrently. Transaction translators according to other embodiments may include more than two non-periodic buffers and may be sized to store more than a single transaction. The non-periodic buffers 246 and 247 are configured to store both start-split and complete-split transaction data. The high-speed handler 241 fills one of the non-periodic buffers 246 and 247 with start splits. The low-speed/full-speed handler 242 reads data from the filled buffer to issue corresponding low-speed or full-speed transactions to low-speed or full-speed devices attached on downstream facing ports and then uses the same buffer to hold any results (e.g., data, a handshake, or a timeout). The host controller 140 fetches the results of the transaction from the non-periodic buffer by issuing a complete-split transaction.

When a low-speed or full-speed device (e.g., the device 220) is attached to a high-speed hub (e.g., the hub 200), the encapsulator 146 issues split transactions to facilitate speed shifts between the two signaling environments. Split transactions allow the host controller 140 to initiate a low-speed or full-speed transaction using a high-speed transaction and then continue with other high-speed transactions without having to wait for the low-speed or full-speed transaction to proceed and complete at a slower speed.

An example of the host controller 140 retrieving data from the device 220 (i.e., an IN transfer) is illustrated in FIG. 2. For an IN transaction, the encapsulator 146 sends to the hub 200 via the high-speed bus 210 a preliminary message called a start-split transaction that includes a start-split token 250 and an IN token 252. The IN token 252 is the low-speed or full-speed transaction that will be executed on the low-speed or full-speed bus 230. In other words, the encapsulator 146 encapsulates the low-speed or full-speed transaction so that the low-speed or full-speed transaction can be sent over the high-speed bus 210. After receiving the start-split token 250 and IN token 252, the high-speed handler 241 stores all or a portion of the start-split token 250 and IN token 252 in the start-split buffer 244. According to a preferred embodiment, the start-split token 250 and the IN token 252 are decoded and stored in the hub buffer but the start-split token 250 and the IN token 252 may not be stored exactly as they appear on the high-speed bus 210. For example, the hub address may not be stored after it is verified that the hub address matches the address of the hub 200. Similarly, the five-bit cyclic redundancy check (CRC) may not be stored after the hub 200 has validated the token integrity. The low-speed/full-speed handler 242 pulls the start-split transaction from the buffer 244 and coordinates when the IN token 252 is released onto the low-speed or full-speed bus 230, which transfers the IN token 252 to the device 220 at the appropriate speed (e.g., low-speed or full-speed).

In response to receiving the IN token 252, the device 220 sends an appropriate data packet 254 back over the low-speed or full-speed bus 230 to the hub 200. After receiving the data packet 254, the low-speed/full-speed handler 242 stores the data packet 254 in the complete-split buffer 245. If uncorrupted data is received (and the endpoint type is not isochronous), the low-speed/full-speed handler 242 preferably returns an acknowledgement or handshake packet 256 to the device 220 (e.g., to prevent the device 220 from timing out). If the endpoint type is isochronous, an acknowledgement or handshake packet is not returned.

At an appropriate time after sending the start-split token 250 and the IN token 252 (e.g., after the host controller 140 expects the data packet 254 to have been stored in the compete-split buffer 245), the encapsulator 146 sends to the hub 200 a complete-split transaction that includes a complete-split token 260 and an IN token 262. After receiving the complete-split transaction, the high-speed handler 241 retrieves the data packet 254 from the complete-split buffer 245 and forwards the data packet 254 to the host controller 140 via the high-speed bus 210. The host controller 140 may optionally return an acknowledgement or handshake packet 264 to the hub 200, which is not forwarded beyond the hub 200. The host-generated handshake packet 264 might not arrive at the device 220 before the device 220 times out, so the low-speed/full-speed handler 242 sends its own handshake 256 after receiving the data packet 254 from the device 220 to satisfy the device 220 (e.g., the "true" handshake packet 264 is not forwarded beyond the hub 200).

Before executing transactions, the primary and secondary schedulers 190 and 192 check the state information associated with the transaction translator 240 (e.g., by accessing the identifier memory 170 and a state field 270 that is associated with the transaction translator 240) to help avoid buffer overflows and buffer underflows at the start-split and complete-split buffers 244 and 245. The encapsulator 146 updates state information associated with the transaction translator that will execute the low-speed or full-speed transaction to reflect the split transaction that will be sent to the hub 200. For example, the encapsulator 146 updates the state field 270, which is associated with the transaction translator 240 through the identifier memory 170, to reflect a start-split transaction destined for the transaction translator 240. Likewise, the encapsulator 146 updates the state field 270 to reflect the state of the transaction translator 240 when the encapsulator 146 issues a complete-split transaction. The state information stored in the state field 270 may include, for example, data concerning a total number of periodic or non-periodic packets-in-progress, a total number of bytes-in-progress, and the execution status of the packets (e.g., if multiple complete-splits are used to retrieve the data from the device 220, the state field 270 may indicate whether the transaction translator 240 is in the beginning, middle, or end of the expected data transfer from the device 220). Armed with the tracked state information, the primary and secondary schedulers 190 and 192 can avoid buffer overflows and buffer underflows at the transaction buffers within the transaction translators (e.g., buffers 244-247 within the transaction translator 240).

Figure 3:
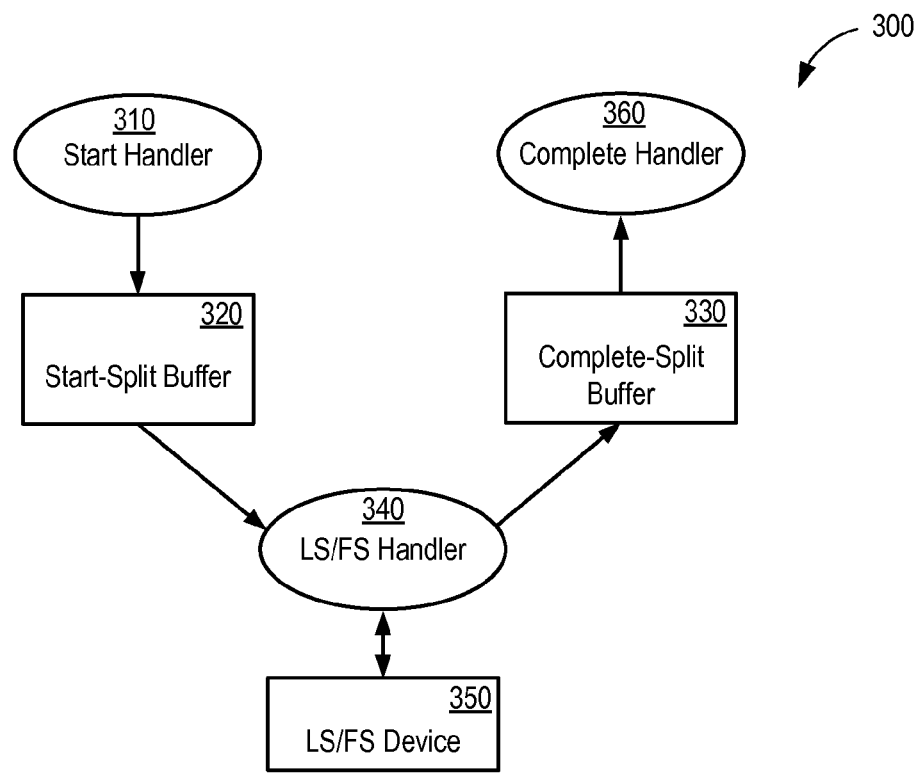
FIG. 3 is a diagram illustrating a periodic transaction pipeline, according to the prior art.

FIG. 3 is a diagram illustrating a periodic transaction pipeline 300, according to the prior art. Periodic transactions have strict timing requirements to meet on a low-speed/full-speed bus and must move across the high-speed bus, through the transaction translator, across the low-speed or full-speed bus, back through the transaction translator, and onto the high-speed bus in a timely manner. A transaction translator implements a pipeline of transactions with its periodic transaction buffers (e.g., start-split and complete-split buffers 320 and 330) to help meet timing requirements of periodic transactions. The size of the start-split and complete-split buffers 320 and 330 determines how many periodic transactions the periodic transaction pipeline 300 can hold. The periodic transaction pipeline 300 includes a start handler 310 and complete handler 360, which form the high-speed handler (e.g., the high-speed handler 241 in FIG. 2), the start-split and complete-split buffers 320 and 330, and a low-speed/full-speed handler 340.

After a start-split packet is executed by a host, the start handler 310 verifies that the start-split packet is intended for its hub by checking the hub address and port number. If the hub associated with the start handler 310 is being targeted by the start-split packet, the start handler 310 accepts and stores the packet in the start-split buffer 320. The start-split buffer 320 holds information from the start-split packet that is used to transmit a low-speed/full-speed packet to a low-speed/full-speed device 350. The information that may be stored in the start-split buffer 320 includes, for example, a destination port number, the speed of the transaction, the transfer type (e.g., isochronous or interrupt), a token packet (e.g., an IN or OUT token), and a data payload for OUT transactions.

When it is time to issue the next periodic low-speed/full-speed transaction on a downstream bus, the low-speed/full-speed handler 340 retrieves the next start-split transaction at the head of the start-split buffer 320 (i.e., the low-speed/full-speed handler 340 performs transactions in the order in which they were received from the host). After the low-speed/full-speed device 350 returns a result (e.g., a handshake packet or data payload), the results are accumulated in the complete-split buffer 330. At the appropriate time, the host transmits a complete-split packet to the transaction translator. The complete handler 360 responds to the complete-split packet by extracting the appropriate response from the complete-split buffer 330 and transmitting the response to the host.

Figure 4:
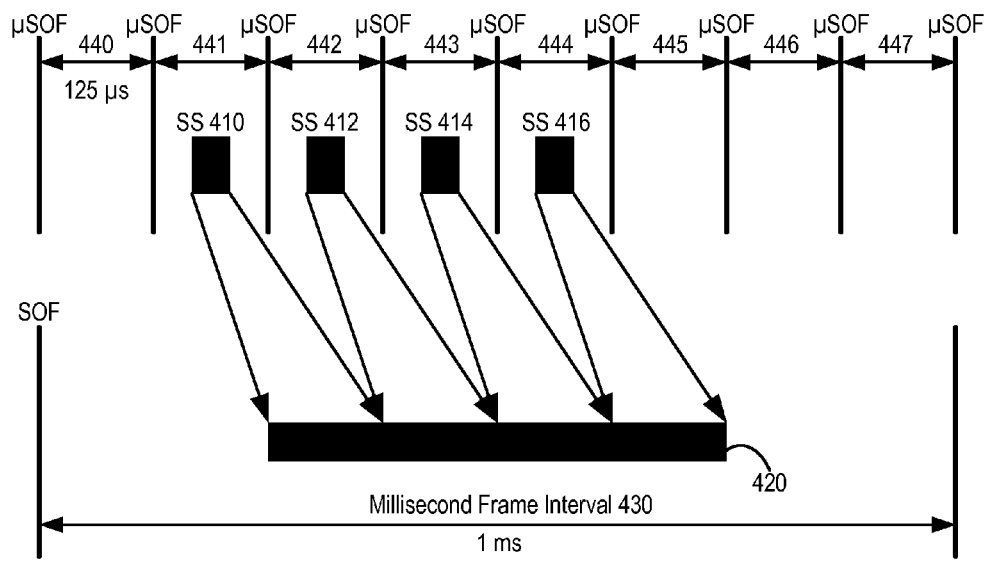
FIG. 4 is a diagram illustrating a sequence of start-split transactions associated with an isochronous OUT transaction, according to the prior art.
Figure 5:
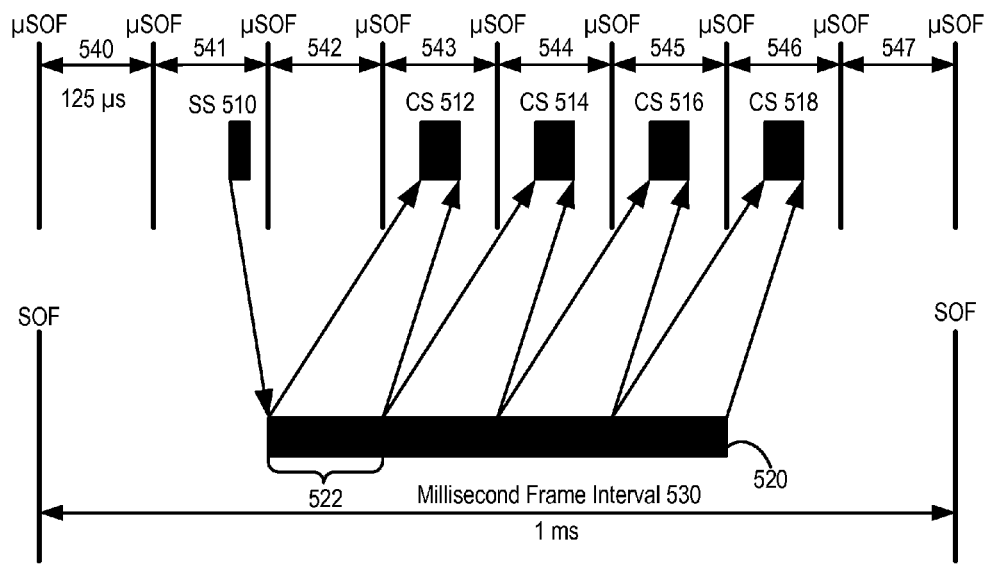
FIG. 5 is a diagram illustrating a sequence of start-split and complete-split transactions associated with an isochronous IN transaction, according to the prior art.

As previously discussed, periodic transactions, such as isochronous transfers with speakers or interrupt transfers with keyboards, have strict timing requirements. The periodic transaction pipeline 300, allows the host to "pipeline" data to or from a transaction translator so that the data moves in a timely manner between the host and the target endpoint (e.g., a uniquely addressable portion of a device that is the source or sink of data between the host and device). The host issues split transactions to convey isochronous, interrupt, control, and bulk transfers across the high-speed bus to hubs that have low-speed or full-speed devices attached to their ports. FIGS. 4 and 5 illustrate the sequence of packets used by the host to perform an isochronous split transaction that has a relatively large data payload.

FIG. 4 is a diagram illustrating a sequence of start-split transactions 410-416 associated with an isochronous OUT transaction 420, according to the prior art. The start-split transactions 410-416 traverse the high-speed bus (e.g., the high-speed bus 210 in FIG. 2) and the isochronous OUT transaction 420 traverses a low-speed or full-speed bus (e.g., the low-speed or full-speed bus 230 in FIG. 2). As illustrated in FIG. 4, a millisecond frame interval 430 is divided into eight sub-frame or microframe intervals 440-447 (eight 125 microsecond intervals). The first start-split transaction 410 initiates the isochronous OUT transaction 420 and delivers the first block of payload data to the hub. Each microframe 441-444 carries data at high-speed to the hub, which delivers the data to the low-speed or full-speed bus during the next microframe interval. The data is preferably delivered to the hub with sufficient time to allow the hub to deliver the data across the low-speed or full-speed bus during the next sequential microframe interval. For example, as illustrated in FIG. 4, the data carried with the start-split transaction 410 traverses the low-speed or full-speed bus during microframe 442. Breaking the isochronous OUT transaction 420 into multiple start-split transactions 410-416 for delivery during multiple microframe intervals 441-444 allows the data buffers (e.g., start-split buffer 244 in FIG. 2) within the hub to be smaller and helps keep the bandwidth evened out across the microframe intervals 441-444, which allows other high-speed transactions to be sent during those microframe intervals.

FIG. 5 is a diagram illustrating a sequence of start-split and complete-split transactions 510-518 associated with an isochronous IN transaction 520, according to the prior art. The start-split and complete-split transactions 510-518 traverse the high-speed bus (e.g., the high-speed bus 210 in FIG. 2) and the isochronous IN transaction 520 traverses a low-speed or full-speed bus (e.g., the low-speed or full-speed bus 230 in FIG. 2). As illustrated in FIG. 5, a millisecond frame interval 530 is divided into eight sub-frame or microframe intervals 540-547 (eight 125 microsecond intervals). The start-split transaction 510 initiates the isochronous IN transaction 520. During microframe 542, the low-speed/full-speed device transfers a first block of payload data 522 to the hub, which stores the first block of payload data 522 in a complete-split buffer (e.g., the complete-split buffer 245 in FIG. 2). A series of complete-split transactions 512-518 are sent to the hub to retrieve the data returned from the—speed/full-speed device. After receiving the complete-split transaction, the hub returns a block of payload data. For example, as illustrated in FIG. 5, after the hub receives the complete-split transaction 512, the hub returns the first block of payload data 522 to the host.

Figure 6:
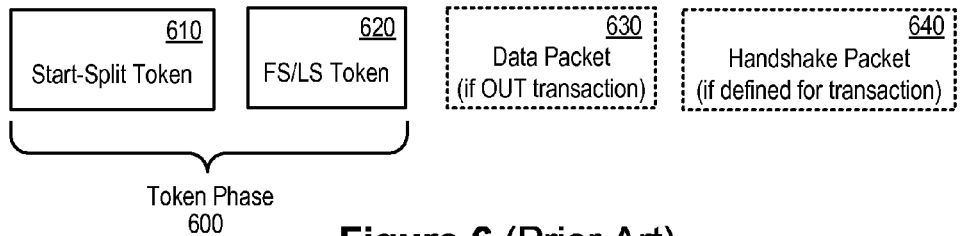
FIG. 6 is a diagram illustrating various packets sent to a hub in a start-split transaction, according to the prior art.
Figure 7:
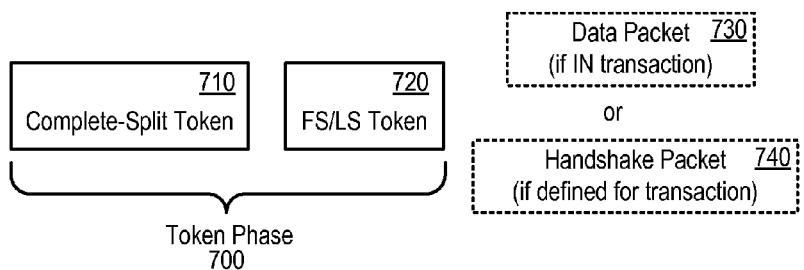
FIG. 7 is a diagram illustrating various packets sent to a hub in a complete-split transaction, according to the prior art.

A high-speed split transaction includes one or more start-split transactions and occasionally includes one or more complete-split transactions. FIG. 6 is a block diagram illustrating various packets sent to a hub in a start-split transaction, according to the prior art. A token phase 600 of a start-split transaction includes a start-split token 610 and a low-speed or full-speed token 620 (e.g., an IN or OUT token). Depending on the direction of data transfer and whether a handshake is defined for the transaction type, the token phase 600 may optionally be followed by a data packet 630 and a handshake packet 640. FIG. 7 is a block diagram illustrating various packets sent to a hub in a complete-split transaction, according to the prior art. A token phase 700 of a complete-split transaction includes a complete-split token 710 and a low-speed or full-speed token 720 (e.g., an IN or OUT token). Depending on the direction of data transfer and the transaction type, a data packet 730 or a handshake packet 740 may optionally follow the token phase 700.

Figure 8:
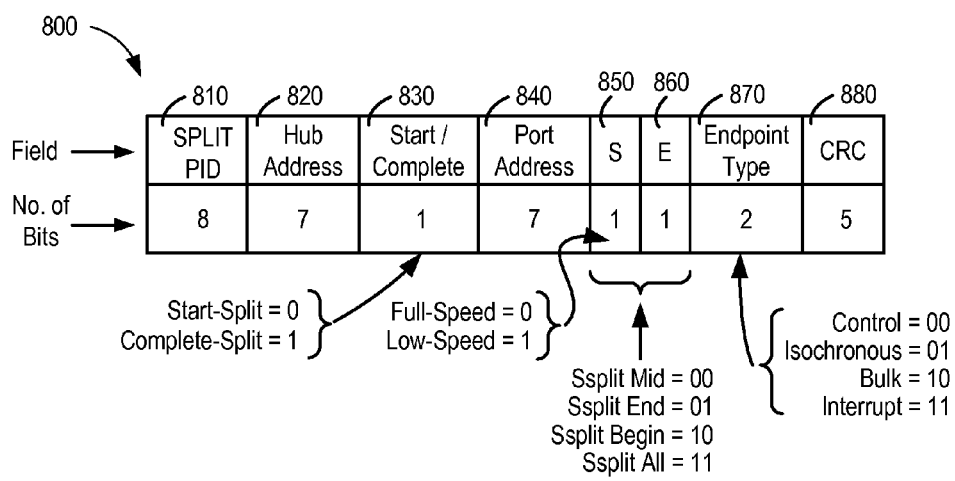
FIG. 8 is a diagram illustrating the various fields of the start-split and complete-split token packets illustrated in FIGS. 6 and 7.

FIG. 8 is a block diagram illustrating the various fields of a SPLIT token packet 800, according to the prior art. The SPLIT token packet 800 is used to start and complete a split transaction and a start/complete field 830 defines whether the SPLIT token packet 800 is a start-split token packet (e.g., packet 610 of FIG. 6) or a complete-split token packet (e.g., packet 710 of FIG. 7). The SPLIT token packet 800 include a number of fields, including a SPLIT PID field 810, a hub address field 820, the start/complete field 830, a hub port number field 840, a speed field 850, a end field 860, an endpoint type field 870, and a cyclic redundancy check (CRC) field 880. The SPLIT RID field 810 is an eight-bit packet identifier field that includes a four-bit code that indicates that a packet is a SPLIT token packet. The hub address field 820 is a seven-bit field that indicates a device address of a hub that should decode and process the split transaction. The start/complete field 830 defines whether a packet is a start-split packet or a complete-split packet. The hub port field 840 indicates a port number of a hub that the split transaction is targeting. Thus, a device can be targeted by the host controller 140 using the hub address field 820 and the hub port field 840.

The speed field 850 indicates the speed of a transaction (e.g., low-speed or full-speed) when a control, interrupt, or bulk transaction is performed with a target endpoint. During isochronous OUT start-split transactions, the speed field 850 and the end field 860 together specify the type of start-split packet being issued by the host controller 140. Different start-split packets are used to indicate whether another start-split transaction will follow. For example, according to one embodiment, the maximum amount of data the host controller 140 delivers during a start-split transaction is 188 bytes, which should be enough data to keep the low-speed/full-speed bus busy for one microframe. In other words, to help ensure that an isochronous OUT transaction runs smoothly, 188 bytes of data should be delivered to the buffer (e.g., buffer 244 in FIG. 2) during each microframe. Data payloads that are larger than 188 bytes may require two or more microframes to complete.

If the start and end fields 850 and 860 specify a start-split all transaction, all data needed to complete the transaction is being delivered in a single start-split transaction (i.e., the data payload is 188 bytes or less). If the start and end fields 850 and 860 specify a start-split begin transaction, the start-split packet is the beginning of a multiple start-split packet sequence and one or more additional start-split packets will follow in subsequent microframes. If the start and end fields 850 and 860 specify a start-split middle transaction, the start-split packet is the middle of a multiple start-split packet sequence and at least one more start-split packet will follow in a subsequent microframe. If the start and end fields 850 and 860 specify a start-split end transaction, the start-split packet is the end of a multiple start-split packet sequence and no additional start-split packets (relating to the same start-split packet sequence) will follow in subsequent microframes.

The endpoint type field 870 is a two-bit field that indicates the endpoint type (e.g., interrupt, isochronous, bulk, or control). Control transfers are used, for example, to configure a device at attach time and can be used for other device-specific purposes, including control of other pipes on the device. Bulk data transfers are generally generated or consumed in relatively large and bursty quantities and have wide dynamic latitude in transmission constraints. Interrupt data transfers are used for timely but reliable delivery of data, such as, for example, characters or coordinates with human-perceptible echo or feedback response characteristics. Interrupt and isochronous data transfers occupy a prenegotiated amount of bus bandwidth. The cyclic redundancy check (CRC) field 580 is a five-bit CRC that corresponds to the nineteen bits of the SPLIT token packet that follow the SPLIT PID field 810.

Figure 9:
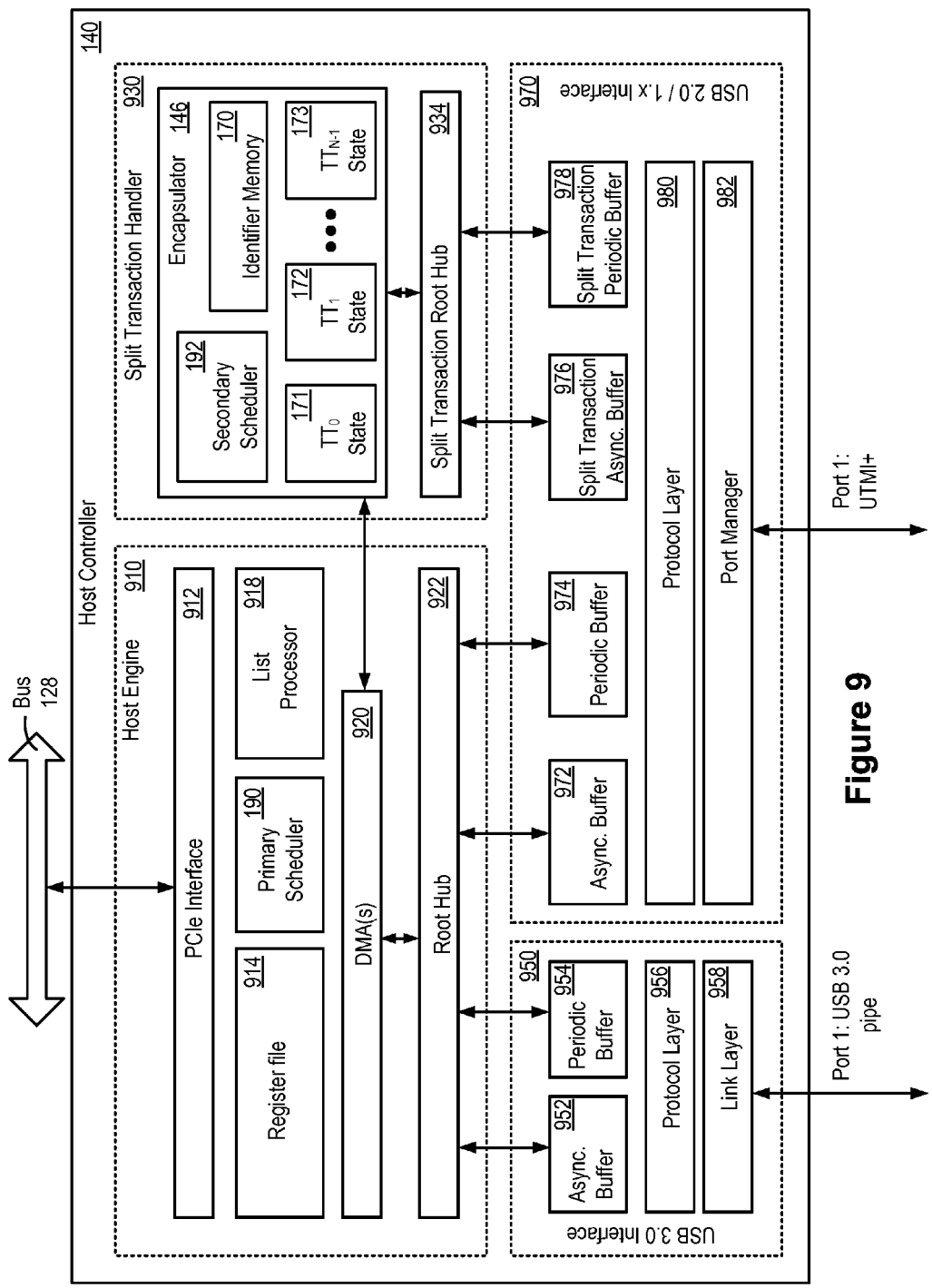
FIG. 9 is a block diagram illustrating additional details of the host controller of FIG. 1, according to one embodiment.

FIG. 9 is a block diagram illustrating additional details of the host controller 140 of FIG. 1, according to one embodiment. The host controller 140 illustrated in FIG. 9 implements the USB 2.0 and USB 3.0 protocols using a host engine 910, a split transaction handler 930, a USB 3.0 interface 950, and a USB 2.0 and 1.x interface 970. Host controllers according to other embodiments may include fewer than all of the components illustrated in FIG. 9, may include other components, or both. In addition, host controllers according to other embodiments may implement any combination of the USB 1.0, USB 2.0, and USB 3.0 protocols or other protocols, such as a future USB version.

The host engine 910 includes a bus interface 912 configured to communicatively couple other components of the host 120 (FIG. 1), such as the processor 122 and the memory 124, to the host controller 140 via the bus 128. According to one embodiment, the bus interface 912 is configured to communicate over the bus 128 using the PCIe protocol. To initiate data transfers to or from a target device (e.g., devices 110-115 in FIG. 1), system software, such as the drivers 126 (e.g., USB device drivers or client drivers) or the OS 125 (FIG. 1), issues transaction requests to the host engine 910 via the bus 128. For example, a USB keyboard driver may issue a transaction request that indicates how often the keyboard should be polled to determine if a user has pressed a key and supplies the location of a memory buffer into which data from the keyboard is stored. According to one embodiment, the system software issues a transaction request by generating or setting up a linked list or ring of data structures in system memory (e.g., the memory 124 in FIG. 1) and writing data to a doorbell register in a register file 914, which alerts the primary scheduler 190 and a transfer ring manager (TRM) or list processor 918 that an endpoint needs servicing. The ring of data structures may include one or more transfer request blocks (TRBs). Individual transfer request blocks may include one or more fields specifying, for example, the device address, the type of transaction (e.g., read or write), the transfer size, the speed at which the transaction should be sent, and the location in memory of the data buffer (e.g., where data from the device should be written or where data destined for the device can be read from). The register file 914 also stores data used to control the operation of the host controller 140, data regarding the state of the various ports associated with interfaces 950 and 970, and data used to connect and establish a link at the port level.

After the doorbell has been rung (i.e., after the data has been written to the doorbell register), the primary scheduler 190 and the list processor 918 work together to move data between the host and the device. The primary scheduler 190 determines when the host controller 140 will move data between the host and the device and the list processor 918 determines what data will be transferred based the information included in the transaction request. The list processor 918 also determines where the data to be transferred is stored, whether the data should be transferred via the USB 3.0 interface 950 or the USB 2.0/1.x interface 970, the speed at which the data should be transferred (e.g., low-speed, full-speed, high-speed, or super-speed), and whether the transaction includes a split transaction. The primary scheduler 190 may also pass that information to the list processor 918. After the primary scheduler 190 determines when the data will be moved, the primary scheduler sends a request to the list processor 918 to service the endpoint.

The list processor 918 processes the transaction request by walking through the ring of transfer request blocks and executing the individual transfer request blocks by handing them off to a direct memory access (DMA) engine(s) 920. The DMA engine 920 pairs up the individual transfer request blocks with any necessary data movement and passes the transaction identified by the transfer request block and any associated data to a root hub 922. According to one embodiment, the DMA engine 920 comprises an inbound DMA engine for inbound data transfers and an outbound DMA engine for outbound data transfers. The root hub 922 routes the transaction and any associated data to an appropriate buffer 952, 954, 972 or 974 for an appropriate port (e.g., port 1-4) depending on which port the device is connected, whether the transaction is a USB 1.x, 2.0, or 3.0 transaction, and whether the transaction is a periodic or asynchronous transfer. For example, if the device to which the transaction relates is connected to port 1 and the transaction involves a high-speed asynchronous transaction, the transaction and any associated data is routed by the root hub 922 into the asynchronous buffer 972. A protocol layer 980 and port manager 982 pull the transaction and any associated data from the asynchronous buffer 972 at the appropriate time for transmission over the downstream bus. After the device responds (e.g., with image data from a scanner or user input data from a keyboard, for example), the response moves back through the host controller 140 in the reverse direction along a similar path. For example, the response moves from the port manager 982 up through the protocol layer 980, into the asynchronous buffer 972, and eventually onto the bus 128 via the root hub 922, the DMA engine 920, the list processor 918, and the bus interface 912. After the list processor 918 receives the response, the list processor 918 inspects the results and handles any actions specified in the transaction ring, such as asserting an interrupt.

While the host controller 140 only illustrates a single port (port 1) in the USB 3.0 interface 950 and a single port (port 1) in the USB 2.0/1.x interface 970, the interfaces 950 and 970 include multiple ports (e.g., ports 1-4). Each port of the USB 3.0 interface 950 may include asynchronous and periodic buffers 952 and 954 (e.g., FIFO buffers) to store transactions and any associated data and a protocol layer 956 and a link layer 958 to implement the USB 3.0 protocol. Each port of the USB 2.0/1.x interface 970 may include asynchronous and periodic buffers 972 and 974 (e.g., FIFO buffers) for non-split transactions and asynchronous and periodic buffers 976 and 978 (e.g., FIFO buffers) for split transactions. Each port of the USB 2.0/1.x interface 970 may also include the protocol layer 980 and port manager 982 to implement the USB 2.0 and USB 1.0 protocols.

Split transactions take a different path through the host controller 140. After the system software sets up the transfer request block rings and rings the doorbell, the primary scheduler 190 initiates a transaction request by sending a request to the list processor 918 to service the endpoint. If the list processor 918 determines that the transaction request involves a split transaction destined for a full-speed or low-speed device attached to a hub operating at high-speed, the list processor 918 executes the split transaction by generating a split packet request (e.g., from state and/or data information fields stored in a control memory associated with the list processor 918) and handing the split packet request off to the DMA engine 920, which pairs the split packet request up with the necessary data movement and passes the split packet request and any associated data to the encapsulator 146. The split packet request generated by the list processor 918 generally includes more data information fields (e.g., that are pulled from the control memory) than the transfer request block. The fields that make up a split packet request according to one embodiment are shown in Table 3, below. The split packet request is sometimes not paired up with the necessary data movement (e.g., the split packet request may be paired up with data movement for asynchronous OUT transactions but not for periodic OUT transactions). According to one embodiment, the encapsulator 146 (e.g., split transaction controllers within the encapsulator 146) requests, at the appropriate time, the list processor 918 to resend the split packet request so that the DMA engine 920 can pair the split packet request up with the necessary data movement at the correct instant (e.g., timing the delivery of payload data helps minimize storing paired up data in the encapsulator 146). Additional details regarding re-requesting the split packet request are described with reference to FIG. 16.

After the encapsulator 146 receives the split packet request and any associated data, a lookup is performed in the identifier memory 170 to determine whether the identifier memory 170 includes an entry for the downstream transaction translator to which the split transaction is addressed. If the identifier memory 170 includes an entry corresponding to the downstream transaction translator that will receive the split transaction, the secondary scheduler 192 may check the state of that transaction translator as reflected in the state fields 171-173, for example, so that the secondary scheduler 192 can determine in which microframe to send the split transaction to the downstream transaction translator. Additional details regarding the operation of the secondary scheduler 192 are described with reference to FIGS. 11-23.

After the secondary scheduler 192 determines that it is time to send the split transaction, the encapsulator 146 passes the split packet request and any associated data to a split transaction root hub 934. The root hub 934 routes the split packet request and any associated data to an appropriate buffer 976 or 978 for an appropriate port (e.g., port 1-4) depending on which port the downstream hub that includes the targeted transaction translator is connected and whether the split transaction is a periodic or asynchronous split transaction. For example, if the split transaction is destined for a full-speed device attached to a high-speed hub and the split transaction includes asynchronous data, the split transaction and any associated data is routed by the root hub 934 into the asynchronous buffer 976. The protocol layer 980 and port manager 982 generate and/or pull the necessary packets from the data stored in the asynchronous buffer 976 for transmission to the hub over the downstream bus at the appropriate time. The protocol layer 980 generates the appropriate split tokens (e.g., start-split or complete-split tokens) and dispatches the tokens on the downstream bus at the appropriate time (e.g., generates the timing between the split token and an OUT token or between the split token and an IN token). The encapsulator 146 passes a wide bus of information that the protocol layer 980 uses to generate the split token. For example, the encapsulator 146 may provide the protocol layer 980 with the hub address, the port number on the hub to which the targeted device is attached, the speed of the transaction, the type of transaction (e.g., a control, interrupt, isochronous, or bulk transaction), the type of start-split packet being issued by the host controller 140 (e.g., a start-split all, start-split begin, start-split mid, or start-split end transaction), and the endpoint type (e.g., control, isochronous, bulk, or control).

After the hub responds (e.g., with a handshake or the data payload from the targeted device, such as image data from a scanner or input data from a keyboard, for example), the response moves back through the host controller 140 in the reverse direction along a similar path. For example, the response moves from the port manager 982 up through the protocol layer 980, into the asynchronous buffer 976, and eventually onto the bus 128 via the root hub 934, the DMA engine 920, the list processor 918, and the bus interface 912.

As illustrated in FIG. 9, the host controller 140 according to one embodiment includes the primary scheduler 190 and the secondary scheduler 192. When a split transaction is destined for a full-speed or low-speed device attached to a high-speed hub, transactions traverse the bus between the hub and device at a full-speed or low-speed data rate during one millisecond intervals. Thus, the hub sends scheduled or periodic packets either every one millisecond or some power-of-two multiplier of every one millisecond. The primary scheduler 190 is configured to determine what millisecond interval a split transaction should be executed by a downstream hub and posts the split transaction to the secondary scheduler 192 preceding the target one-millisecond frame. Between the host controller 140 and the high-speed hub, the framing is 125 microseconds (e.g., the frame rate on the high-speed bus is eight times faster than the frame rate on the low-speed or full-speed bus), according to one embodiment. The secondary scheduler 192 is configured to break a split transaction (which may take one millisecond to execute) into multiple sub-packets and determine which 125 microsecond frames to transmit those sub-packets.

Data stored in the transaction translator state fields 171-173 helps ensure that the targeted downstream transaction translator does not overflow or underflow. According to a preferred embodiment, the data stored in the transaction translator state fields 171-173 includes a value or count reflecting the number of bytes-in-progress to a particular transaction translator. The count is used by the secondary scheduler 192 to throttle the rate at which start-split transactions are dispatched in real time, which helps prevent overflow of the buffers (e.g., the start-split and complete-split buffers 244 and 245 in FIG. 2) within the downstream transaction translators.

One or more transaction lists are preferably stored in the transaction translator state fields 171-173. The one or more transaction lists are generated by the primary scheduler 190 and sent to the secondary scheduler 192, which executes transactions from a transaction list during an appropriate millisecond frame interval. In other words, the one or more transaction lists are one of the secondary scheduler's inputs. According to one embodiment, the individual transaction lists are configured to store a plurality of split packet requests (e.g., 15 or 16 split packet requests) that are executed by the secondary scheduler 192 in a particular microframe interval. The individual split packet requests include contextual information used by the secondary scheduler 192 to execute a transaction. For example, the contextual information may specify the type of transaction (e.g., interrupt or isochronous), the total size of the data payload to be transferred, the speed of the transaction (e.g., low-speed or full-speed), and the direction of the transfer (e.g., IN or OUT). Additional details of the data that may be stored in the state fields are described with reference to FIGS. 12-14.

Due to the pipelined nature of the transaction translators (e.g., the periodic transaction pipeline 300 in FIG. 3), there may be overlap between packets executing the complete phase for a previous one-millisecond frame interval and the start phase for the current one-millisecond frame interval. Additional details of the overlap are described with reference to FIGS. 17 and 18. According to one embodiment, two transactions lists (e.g., "even" and "odd" transactions lists) are maintained to manage the scheduling overlap. According to other embodiments, a single transaction list is maintained or more than two transaction lists are maintained to manage the scheduling overlap. For example, a single transaction list may be used to manage the scheduling overlap by tagging entries in the list with an "odd/even" bit to create two virtual lists from one memory array. By way of another example, a single transaction list may be used if the primary scheduler 190 prevents an overlap from executing (i.e., by measurement). Preventing an overlap from executing at the primary scheduler 190 would limit the overall maximal low-speed/full-speed bus utilization downstream. Providing more than two transaction lists to manage the scheduling overlap may be particularly well suited for a firmware implementation. For example, four to eight transaction lists should provide sufficient buffer time (e.g., monitor a buffer for a sufficient time) for a firmware implemented primary and secondary scheduler operating in a coordinated manner to construct a one-millisecond list with a sub-frame schedule.

According to one embodiment, the host controller 140 performs a bandwidth check for transactions used to service an endpoint before the primary or secondary schedulers 190 and 192 determine in which frame or sub-frame to execute those transactions. For example, when the host 120 tries to set up a pipe (e.g., a logical abstraction representing the association between an endpoint on a device and software on the host) with an endpoint (e.g., a uniquely addressable portion of a device that is the source or sink of data between the host and device), the host controller 140 performs a bandwidth check to help ensure that the transactions used to service the endpoint can be scheduled by the primary and secondary schedulers 190 and 192. In other words, if the pipe passes the bandwidth check, the primary and secondary schedulers 190 and 192 should, in theory, be able to execute transactions used to service the endpoint in the appropriate millisecond frame interval.

The secondary scheduler 192, according to one embodiment, dynamically determines, every millisecond frame interval, which transactions to transmit in each sub-frame or microframe. In other words, the secondary scheduler 192 re-computes the one-millisecond frame interval every single time. Re-computing the one-millisecond frame interval every single time allows periodic pipes (e.g., pipes carrying periodic transactions) to be serviced by the primary and secondary schedulers 190 and 192 without interrupting periodic transactions associated with other periodic pipes to rebuild or rebalance a schedule. Re-computing the one-millisecond frame interval every single time also allows the microframes to be packed, which may translate into power savings by allowing the transceiver associated with transmitting the transactions to remain idle for longer periods of time.

Figure 10:
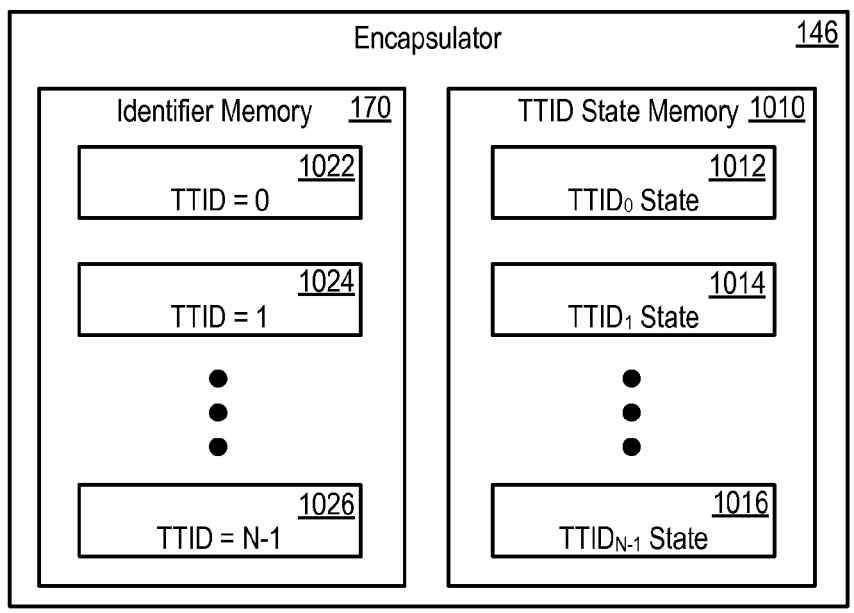
FIG. 10 is a block diagram illustrating additional details of the encapsulator of FIG. 1, according to one embodiment.

FIG. 10 is a block diagram illustrating additional details of the encapsulator 146 illustrated in FIGS. 1, 2, and 9, according to one embodiment. The encapsulator 146 illustrated in FIG. 10 includes the identifier memory 170 and a TTID state memory 1010, which may be implemented in any suitable machine readable medium, such as registers (flip-flops or latches), RAM, flash memory, and EEPROM. The identifier memory 170 includes a plurality of transaction translator identifiers (TTIDs) 1022-1026, each of which has a state field associated therewith. For example, $TTID_0$ 1022 and $TTID_0$ state field 1012 are associated with each other, $TTID_1$ 1024 and $TTID_1$ state field 1014 are associated with each other, and $TTID_{N-1}$ 1026 and $TTID_{N-1}$ state field 1016 are associated with each other. The state fields 1012-1016 are configured to store data concerning the state of a downstream transaction translator, such as the number of outstanding transactions and the number of bytes-in-progress to downstream transaction translators (e.g., the number of bytes sent in each frame interval). The number of outstanding transactions may be tracked by transaction type, such as by tracking asynchronous and periodic transactions. Because the state fields 1012-1016 are associated with a respective TTID 1022-1026, each transaction translator element ID 1022-1026 effectively tracks the state of a downstream transaction translator.

The identifier memory 170 may include any number N of transaction translator element IDs 1022-1026. According to one embodiment, the transaction translator element IDs 1022-1026 span the full range of possible transaction translators identified by the number of possible addresses multiplied by the number of possible ports (e.g., N=128*128=16, 384). However, fewer transaction translator element IDs 1022-1026 may be provided. For example, the number of transaction translator element IDs may correspond to the number of devices that the host controller is designed to support (which helps reduce the amount of hardware used to implement the host controller). According to another embodiment, the identifier memory 170 is provided with 32 transaction translator element IDs 1022-1026 (i.e., N=32). According to yet another embodiment, the identifier memory 170 is provided with 64 transaction translator element IDs 1022-1026 (i.e., N=64).

The TTIDs 1022-1026 are allocated to downstream transaction translators within high-speed hubs (e.g., high-speed hubs having full-speed or low-speed device attached thereto) that are connected to the host 120 (FIG. 1). If the hub has a single transaction translator that is shared by all of the hub's ports, a single transaction translator element ID may be allocated to the hub. If, on the other hand, the hub includes multiple transaction translators (e.g., a transaction translator for each port), multiple transaction translator element Ds may be allocated to the hub (e.g., one TTID for each transaction translator). According to one embodiment, the identifier memory 170 is configured such that each TTID 1022-1026 can be marked unused when there are no active entries and reused at another time by a different transaction translator thereby making the identifier memory 170 dynamic.

The secondary scheduler 192 (FIGS. 1, 2, and 9) accesses data stored in state fields 1012-1016 to help determine when to execute a split transaction. For example, according to one embodiment, the secondary scheduler 192 includes a periodic execution engine and a completion engine, both of which have access (e.g., read/write access) to state fields 1012-1016. The periodic execution engine is configured to determine in which sub-frames (e.g., microframes) to execute the split transaction. After the periodic execution engine fully executes or partially executes the split transaction (e.g., sends a start-split token), the periodic execution engine updates the data stored in one or more of the state fields 1012-1016 to reflect the state of the downstream transaction translator. After a response from the split transaction is received from the hub, the completion engine is configured to update the data stored in one or more of the state fields 1012-1016 to reflect the state of the downstream transaction translator. For example, if a start-split transaction occurs and a response comes back from the hub that the start-split transaction was acknowledged, the complete engine updates the state information so that the stored state information moves from a start phase to a complete phase.

According to one embodiment, the identifier memory 170 comprises an associative array. The associative array may include, for example, a management state machine configured to control the operation of the associative array and data, such as a set of table entries. The data is preferably organized in an array such that a unique key can be used to find its associated value. In other words, the array is indexed by something other than an incrementing numerical index. For example, as shown in Table 1, below, the key used to index the array may comprise transaction translator identifying data, such as the hub address, the hub port, and a multi transaction translator indicator. A lookup performed in the array using the key returns a unique identifier, such as a TTID. The unique identifier maps into the TTID state memory 1010, which may include an array of resources, such as state information associated with a downstream transaction translator and the packet collection for each transaction translator. The array in the TTID state memory 1010 may comprise a standard array that uses an incrementing numerical index.

Table 1 illustrates an example array into which the data of an associative array is organized. The key used to index the array illustrated in Table 1 comprises a number of fields, including a hub address field that stores the address of the hub containing the target transaction translator, a hub port field that stores the physical port number of the hub port to which the target slow-speed or full-speed device is connected, and a multi transaction translator (multi TT) field that stores an indication of the number of transaction translators that are within the hub (e.g., a "1" may indicate that the hub supports one transaction translator per port and a "0" may indicate that the hub supports one transaction translator that is shared by all ports of the hub). The key may include additional or fewer fields. As shown in Table 1, each key is associated with a TTID. Thus, the hub address, hub port, and multi TT fields can be used to find an associated transaction translator identifier, which has associated therewith state information regarding the transaction translator. The array may also have associated with each TTID a valid indicator that indicates whether a particular TTID is allocated to a transaction translator. Additional details regarding implementing the identifier memory 170 as an associative array, including additional details regarding performing lookups in the associative array to find an identifier and allocating an identifier to a downstream transaction translator, are described in U.S. Application No. 13/015,392, filed Jan. 27, 2011, entitled "Method And Apparatus For Tracking Transactions In A Multi-Speed Bus Environment," which is hereby incorporated by reference in its entirety.

TABLE 1

| | | Key Used To Index Array | | |
|---|---|---|---|---|
| Value | Valid | Hub Address | Hub Port Number | Multi TT |
| TTID = 0 | 1 | 0000101 | 0000001 | 1 |
| TTID = 1 | 1 | 0001010 | 0000010 | 0 |
| TTID = 2 | 0 | — | — | — |
| . | . | . | . | . |
| . | . | . | . | . |
| . | . | . | . | . |
| TTID = N − 1 | 0 | — | — | — |

Figure 11:
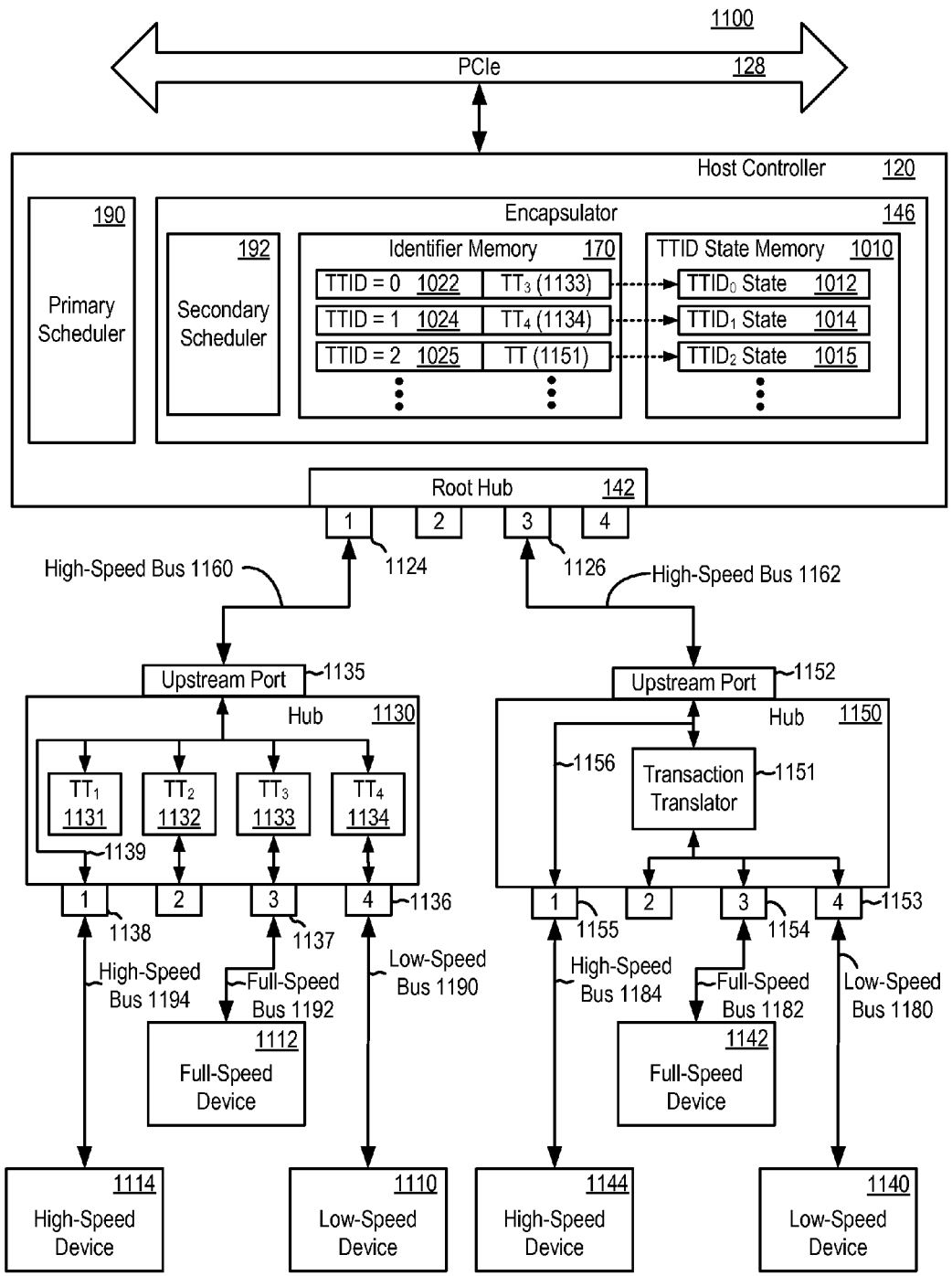
FIG. 11 is a block diagram illustrating low-speed, full-speed, and high-speed devices attached to a host via an intermediate high-speed hub incorporating multiple transaction translators and an intermediate high-speed hub incorporating a single transaction translator, according to one embodiment.

An example of the primary scheduler 190 posting a split packet request to a transaction list is described with reference to FIGS. 11 and 12. Before providing the example, a multi-speed bus environment will be described with reference to FIG. 11. FIG. 11 is a block diagram illustrating a system 1100 in which a low-speed device 1110, a full-speed device 1112, and a high-speed device 1114 are attached to the host 120 via an intermediate high-speed hub 1130 incorporating multiple transaction translators 1131-1134. The system 1100 also includes a low-speed device 1140, a full-speed device 1142, and a high-speed device 1144 attached to the host 120 via an intermediate high-speed hub 1150 incorporating a single transaction translator 1151. An upstream port 1135 of the hub 1130 is connected to port 1 (1124) of the root hub 142 via a high-speed bus 1160. An upstream port 1152 of the hub 1150 is connected to port 3 (1126) of the root hub 142 via a high-speed bus 1162.

A low-speed bus 1180 (e.g., having a USB low-speed data transfer rate of approximately 1.5 megabits per second) couples the low-speed device 1140 to port 4 (1153) of the hub 1150. A full-speed bus 1182 (e.g., having a USB full-speed data transfer rate of approximately 12 megabits per second) couples the full-speed device 1142 to port 3 (1154) of the hub 1150. The low-speed and full-speed devices 1140 and 1142 share the transaction translator 1151, which converts high-speed split transactions to low-speed transactions for the low-speed device 1140 and converts high-speed split transactions to full-speed transactions for the full-speed device 1142, so that data can be transferred between the host controller 1120 and the hub 1150 at high-speed (e.g., a USB high-speed data transfer rate of approximately 480 megabits per second). A high-speed bus 1184 (e.g., having a USB high-speed data transfer rate of approximately 480 megabits per second) couples the high-speed device 1144 to port 1 (1155) of the hub 1150. Because high-speed buses 1162 and 1184 operate at the same or similar speeds, the transaction translator 1151 is not needed to perform a speed translation. Thus, the hub 1150 routes data between the upstream port 1152 and port 1 (1155) via path 1156, which bypasses the transaction translator 1151.

In a similar vein, a low-speed bus 1190 (e.g., having a USB low-speed data transfer rate of approximately 1.5 megabits per second) couples the low-speed device 1110 to port 4 (1136) of the hub 1130. A full-speed bus 1192 (e.g., having a USB full-speed data transfer rate of approximately 12 megabits per second) couples the full-speed device 1112 to port 3 (1137) of the hub 1130. The hub 1130 routes data communication between the host controller 1120 and the low-speed device 1110 through the transaction translator 1134, which converts high-speed split transactions to low-speed transactions (and vice versa) so that data can be transferred between the host controller 1120 and the hub 1130 at high-speed. Similarly, the hub 1130 routes data communication between the host controller 1120 and the full-speed device 1112 through the transaction translator 1133, which converts high-speed split transactions to full-speed transactions (and vice versa) so that data can be transferred between the host controller 1120 and the hub 1130 at high-speed. A high-speed bus 1194 (e.g., having a USB high-speed data transfer rate of approximately 480 megabits per second) couples the high-speed device 1114 to port 1 (1138) of the hub 1130. Because high-speed buses 1160 and 1194 operate at the same or similar speeds, the transaction translator 1131 is not needed to perform a speed translation. Thus, the hub 1130 routes data between the upstream port 1135 and port 1 (1138) via path 1139, which bypasses the transaction translator 1131.

Table 2, below, illustrates example entries in the identifier memory 170, which comprises an associative array that is used to track the transaction translators of FIG. 11, according to one embodiment. Table 2 assumes that the host 120 (e.g., via the OS) assigned a hub address of 1 to the hub 1130, a hub address of 2 to the hub 1150, a device address of 3 to the high-speed device 1114, a device address of 4 to the full-speed device 1112, a device address of 5 to the low-speed device 1110, a device address of 6 to the high-speed device 1144, a device address of 7 to the full-speed device 1142, and a device address of 8 to the low-speed device 1140. The host 120 generally assigns addresses from the top down and then from left to right with respect to incrementing ports.

TABLE 2

|  |  | Key Used To Index Array | | |
|---|---|---|---|---|
| Value | Valid | Hub Address | Hub Port Number | Multi TT |
| TTID = 0 | 1 | 0000001 (1) | 0000011 (3) | 1 |
| TTID = 1 | 1 | 0000001 (1) | 0000100 (4) | 1 |
| TTID = 2 | 1 | 0000010 (2) | X | 0 |
| TTID = 3 | 0 | — | — | — |
| . | . | . | . | . |
| . | . | . | . | . |
| . | . | . | . | . |
| TTID = N − 1 | 0 | — | — | — |

As illustrated in Table 2, $TTID_0$ is allocated to the transaction translator 1133, $TTID_1$ is allocated to the transaction translator 1134, and $TTID_2$ is allocated to the transaction translator 1151. The transaction translator 1151 is shared by the low-speed and full-speed devices 1140 and 1142, so the corresponding hub port number in Table 2 is marked with an "X" (representing a don't-care condition). Each time the host controller 120 communicates with a low-speed or full-speed device connected to hubs 1130 or 1150 (e.g., for each split packet request), a lookup is performed against the associative array (Table 2) using information fields carried with the split packet request (e.g., the address of the hub that contains the target transaction translator, the port number on the hub to which the low-speed or full-speed device is connected, and an indication of whether the hub includes a single transaction translator or multiple transaction translators). If the lookup fails because there is no match against any of the entries in the table, any unused entry can be written. If a match is found (or after a TTID is allocated), the associative array (Table 2) returns the TTID value that has been allocated to the target transaction translator. As illustrated in the identifier memory and TTID state memory blocks 170 and 1010 in FIG. 11, the returned TTID value maps into the state memory 1010 (FIGS. 10 and 12).

Figure 12:
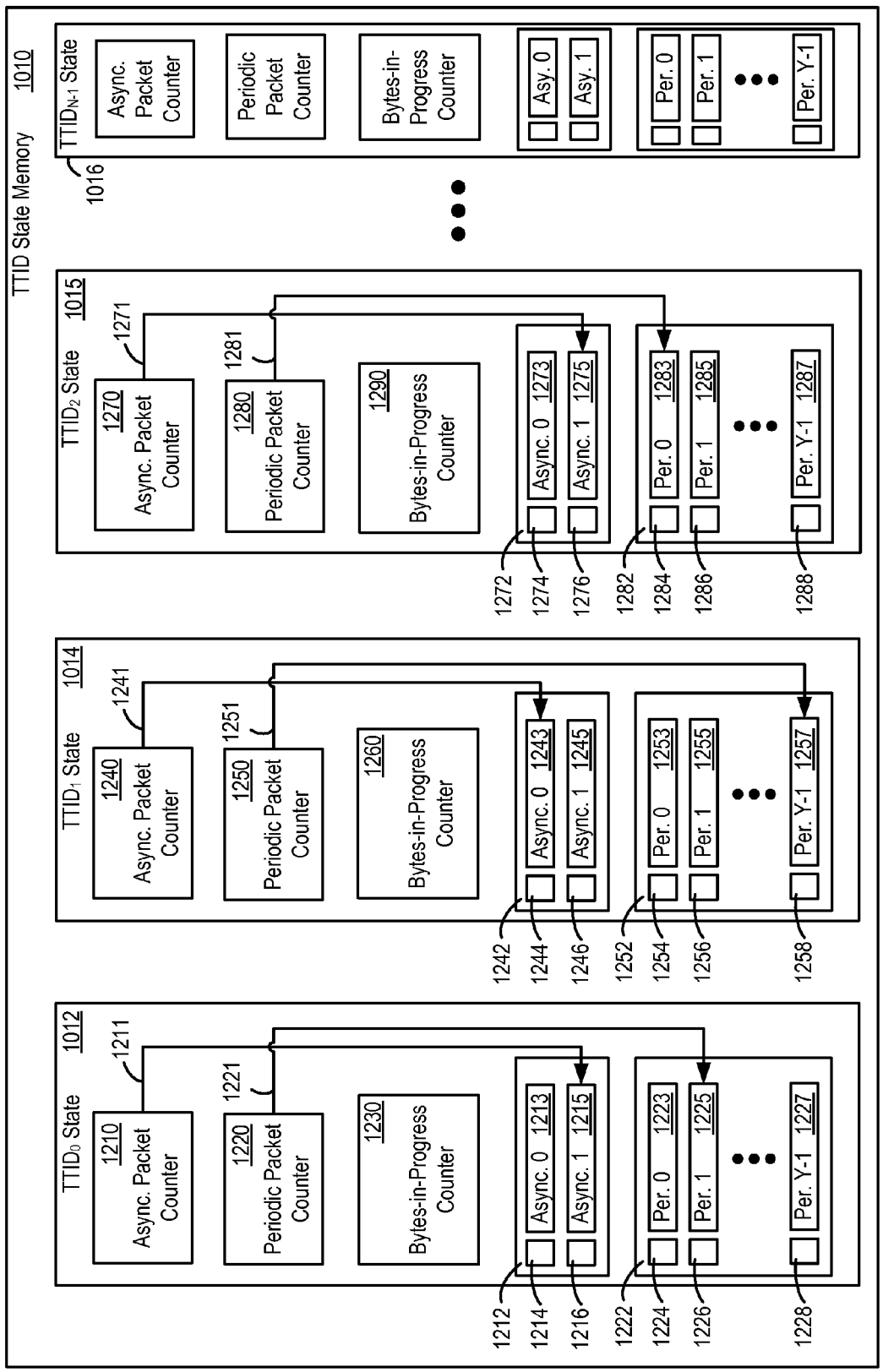
FIGS. 12, 13, and 14 are block diagrams illustrating additional details of the state memory of FIG. 10, according to various embodiments.

Referring now to FIGS. 11 and 12, the primary scheduler 190 posts split packet requests to a transaction list at a predetermined time. According to one embodiment, a split packet request is tagged with a transaction translator identifier (e.g., TTID) and posted to an appropriate transaction list. For example, if the split packet request relates to a transaction that is destined for the low-speed device 1110 via the transaction translator 1134 (FIG. 11), a lookup may be performed against the associative array (Table 2) using a hub address of 1, a port number of 4, and a multi-TT indicator of 1, all of which are carried with the split packet request. The associative array (Table 2) returns a TTID value of 1 ($TTID_1$), which has been allocated to the target transaction translator 1134. Because the transaction translator 1134 is associated with the state field 1014 through transaction translator identifier 1024, the split packet request is stored in the next available memory location in a periodic packet list 1252 in the state field 1014 (FIG. 12). In other words, as illustrated in the identifier memory and TTID state memory blocks 170 and 1010 in FIG. 11, the transaction translator 1134 is associated with the state field 1014 through the transaction translator identifier 1024 (TTID=1). Likewise, the transaction translator 1133 is associated with the state field 1012 through the transaction translator identifier 1022 (TTID=0) and the transaction translator 1151 is associated with a state field 1015 through a transaction translator identifier 1025 (TTID=2).

FIG. 12 is a block diagram illustrating additional details of the state memory 1010 of FIG. 10, according to one embodiment. The state memory 1010 illustrated in FIG. 12 includes a plurality of state fields 1012-1016, each of which is associated with a corresponding transaction translator identifier (e.g., TTIDs 1022-1026 in FIGS. 10 and 11). The state fields 1012-1016 are configured to store data concerning the state of a downstream transaction translator, such as the number of packets-in-progress (e.g., the number of transactions with the transaction translator) and the number of bytes-in-progress to downstream transaction translators (e.g., the number of bytes transmitted to or from the transaction translator in a given frame interval). According to one embodiment, the state memory 1010 is indexed by a transaction translator identifier (e.g., TTIDs 1022-1026 in FIG. 10) combined with a packet number.

The example state fields 1012-1016 illustrated in FIG. 12 are configured to track the number of asynchronous and periodic packets that have been sent to the respective transaction translator, the state of those asynchronous and periodic packets, and the amount of data that has been sent to the respective transaction translator (e.g., data that has been sent during each microframe). State fields according to other embodiments may track additional information or less information regarding the state of an associated transaction translator and/or the state of one or more transactions sent to an associated transaction translator.

As discussed with reference to FIGS. 10 and 11, the identifier memory 170 may include any number N of transaction translator element IDs 1022, 1024, 1025, and 1026, each of which has a corresponding state field 1012, 1014, 1015, and 1016 associated therewith. Thus, the state memory 1010 may include any number N of state fields 1012-1016. To track the state of a downstream transaction translator, each of the state fields 1012, 1014, and 1015 includes one or more asynchronous packet counters 1210, 1240, and 1270, one or more periodic packet counters 1220, 1250, and 1280, and one or more bytes-in-progress counters 1230, 1260, and 1290. The state field 1016 also includes one or more asynchronous packet counters, periodic packet counters bytes-in-progress counters.

The one or more asynchronous packet counters 1210, 1240, and 1270 are configured to track the number of asynchronous packets that have been sent to a respective transaction translator. According to one embodiment, the asynchronous packet counters 1210, 1240, and 1270 comprise sequence packet counters configured to count to a maximum number M. According to one embodiment, M is set to two, which is the maximum number of asynchronous packets that can generally be sent to a transaction translator (e.g., based on the number of non-periodic buffers included in the transaction translators in the downstream hub). According to other embodiments, M may be less than or greater than two (e.g., if the host controller determines that the non-periodic buffer(s) within a downstream transaction translator can accommodate more than two transactions or fewer than two transactions, the asynchronous packet counters may be adjusted accordingly).

The asynchronous packet counters 1210, 1240, and 1270 may include pointers 1211, 1241, and 1271, which point to the last packet that was posted to a respective asynchronous packet list or transaction list 1212, 1242, or 1272. Each of the asynchronous transaction lists 1212, 1242, and 1272 include M memory locations or slots (e.g., two or any other number as discussed above) that store for each packet header information (e.g., information in the IN or OUT token that follows a start-split token, such as the target device and endpoint addresses) and state information (e.g., whether the packet has been sent to the downstream transaction translator or whether the hub has received an acknowledgment from the hub that the packet has been sent to the downstream low-speed or full-speed device). The transaction lists 1212, 1242, and 1272 may also include valid bits or flags 1214, 1216, 1244, 1246, 1274, and 1276 that indicate whether an associated memory location is occupied.

Each time an asynchronous packet is to be dispatched to a downstream transaction translator, the appropriate asynchronous packet counter is incremented, header and state information associated with that packet are stored in the next available memory location in the transaction list, and the valid bit associated with that memory location is updated. For example, as illustrated in FIG. 12, the pointer 1211 is pointing to the memory location 1215 in the transaction list 1012, which indicates that two asynchronous packets have been dispatched to the transaction translator associated with the state memory 1012 (i.e., the transaction translator 1133 in FIG. 11). Thus, valid bits 1214 and 1216 in the transaction list 1212 are set to indicate that each of memory locations 1213 and 1215 are occupied and store header and state information associated with an asynchronous packet. Similarly, the pointer 1271 is pointing to the memory location 1275 in the transaction list 1272, which indicates that two asynchronous packets have been dispatched to the transaction translator associated with the state memory 1015 (i.e., the transaction translator 1151 in FIG. 11). Thus, valid bits 1274 and 1276 in the transaction list 1272 are set to indicate that each of memory locations 1273 and 1275 are occupied and store header and state information associated with an asynchronous packet. The pointer 1241, on the other hand, is pointing to the memory location 1243 in the transaction list 1242, which indicates that only one asynchronous packet has been dispatched to the transaction translator associated with the state memory 1014 (i.e., the transaction translator 1134 in FIG. 11). Thus, the valid bit 1244 is set to indicate that the memory locations 1243 is occupied and stores header and state information associated with an asynchronous packet and valid bit 1246 is set to indicated that the memory location 1245 is unoccupied and does not store header and state information associated with an asynchronous packet.

If an asynchronous packet counter indicates that two asynchronous packets are already in progress (e.g., the pointer points to the last memory location in the transaction list), additional asynchronous packets will not be dispatched until at least one of the pending asynchronous packets have completed execution. Accordingly, if the host controller receives another asynchronous transaction request that is destined for one of the transaction translators associated with the state memories 1012-1016, a scheduler (e.g., the primary scheduler 190 or secondary scheduler 192 in FIG. 9) can check an appropriate asynchronous packet counter to determine whether the new transaction can be dispatched or whether the new transaction should be delayed until one of the pending asynchronous packets has completed execution. For example, after checking asynchronous packet counters 1210 and 1270 (which indicate that two asynchronous packets are already in progress with the transaction translators associated with state memories 1012 and 1015), the host controller will not dispatch any new asynchronous transactions to those transaction translators until at least one of the pending asynchronous packets has completed execution. On the other hand, after checking the asynchronous packet counter 1240 (which indicates that only one asynchronous packet is already in progress with the transaction translator associated with the state memory 1014), the host controller can dispatch a new asynchronous transactions to that transaction translator.

One or more periodic packet counters 1220, 1250, and 1280 are configured to track the number of periodic packets that have been sent to a respective transaction translator in a given one-millisecond frame. According to one embodiment, the periodic packet counters 1220, 1250, and 1280 comprise sequence packet counters configured to count to a maximum number Y. According to one embodiment, Y is set to sixteen, which is the maximum number of periodic packets that can generally be sent to a transaction translator in a given one-millisecond frame. It may be possible to send more than sixteen periodic packets in a given one-millisecond frame if, for example, a complete-split clears one of the token entries before a start-split is sent and a memory location within a transaction list is re-occupied. In other words, according to one embodiment, a periodic frame list supports more than sixteen periodic packets but no more than sixteen periodic packets are pending at a given time. According to another embodiment, Y is set to fifteen, which may be easier to implement in memory if the state memory tracks two asynchronous packet states and two sets of fifteen periodic packet states for a total of thirty-two packet states. Providing two or more sets of fifteen periodic packet states in state memories 1012-1016 (e.g., even and odd transaction lists) allows periodic packets in two consecutive one-millisecond frames to be tracked, which helps manage scheduling overlaps as will be described in more detail with reference to FIGS. 17 and 18. If two or more sets of fifteen periodic packet states are provided in state memories 1012-1016, a corresponding number of periodic packet counters may also be provided. According to still another embodiment, the number of packets is not fixed per transaction translator identifier and instead is dynamically allocated to each transaction translator identifier from a global pool. Thus, Y may be dynamically allocated to each transaction translator identifier. Dynamically allocating the number of packets to each transaction translator identifier may be particularly well suited for a firmware implementation.

The periodic packet counters 1220, 1250, and 1280 may include pointers 1221, 1251, and 1281, which point to the split packet request to be executed by the secondary scheduler 192. Each of the periodic packet lists or transaction lists 1222, 1252, and 1282 include a total of Y memory locations or slots (e.g., fifteen, sixteen, or any other number), each of which stores a split packet request. The split packet request may include header information, such as information used to form the IN or OUT tokens that follow a start-split token (e.g., the target device, endpoint address, direction of data transfer), information used to form the start-split or complete-split tokens (e.g., the hub address, port number, transaction speed, byte count, type of transaction), and state information, such as start/complete state field that indicate whether the split transaction is in the start state or complete state, a time stamp field indicating when a start-split transaction has been executed by the secondary scheduler 192 (e.g., so that corresponding complete-split transactions can be executed a predetermined number of microframes after the start-split transaction was dispatched), and an indication of how much payload data has already been transmitted (e.g., if multiple start-split transactions are used to deliver a large isochronous OUT transaction, for example). The fields that make up a split packet request according to one embodiment are shown in Table 3, below. The transaction lists 1222, 1252, and 1282 may also include valid bits or flags 1224-1228, 1254-1258, and 1284-1288 that indicate whether an associated memory location is occupied.

When the primary scheduler 190 posts a periodic packet to a transaction list, header and state information associated with that packet are stored in the next available memory location in the transaction list and the valid bit associated with that memory location is updated to reflect that the memory location is occupied. The primary scheduler 190 determines the next available memory location by checking, for example, the valid bits associated with the memory locations in sequential order until an unoccupied memory location is found. When a periodic transaction is dispatched to a downstream transaction translator, the state information associated with that transaction is updated (e.g., a start/complete state field is updated to indicate that the split packet request is in the complete phase) and the appropriate periodic packet counter is incremented (e.g., assuming that additional payload data does not need to be transmitted). For example, as illustrated in FIG. 12, the pointer 1221 is pointing to the memory location 1225 in the transaction list 1222, which indicates that start-split transactions corresponding to the split packet requests stored in memory locations 1223 and 1225 have been dispatched (or will be dispatched in the case of memory location 1225) to the transaction translator associated with the state field 1012. The pointer 1251 is pointing to memory location 1257 in the transaction list 1252, which indicates that start-split transactions corresponding to the split packet requests stored in memory locations 1253 and 1257 have been dispatched (or will be dispatched in the case of memory location 1257) to the transaction translator associated with the state field 1014. The pointer 1281 is pointing to the memory location 1283 in the transaction list 1282, which indicates that a start-split transaction corresponding to the split packet request stored in the memory location 1283 has been or will dispatched to the transaction translator associated with the state field 1015.

The one or more bytes-in-progress counters 1230, 1260, and 1290 are configured to track the amount of data that has been or will be transmitted to a respective transaction translator. According to one embodiment, the secondary scheduler 192 utilizes the counters 1230, 1260, and 1290 to throttle the rate at which start-split transactions are dispatched, which may, for example, help prevent an overflow of the periodic buffers within a downstream transaction translator. Additional details regarding using the number of bytes-in-progress to a downstream transaction translator are described with reference to FIG. 17-22.

Figure 13:
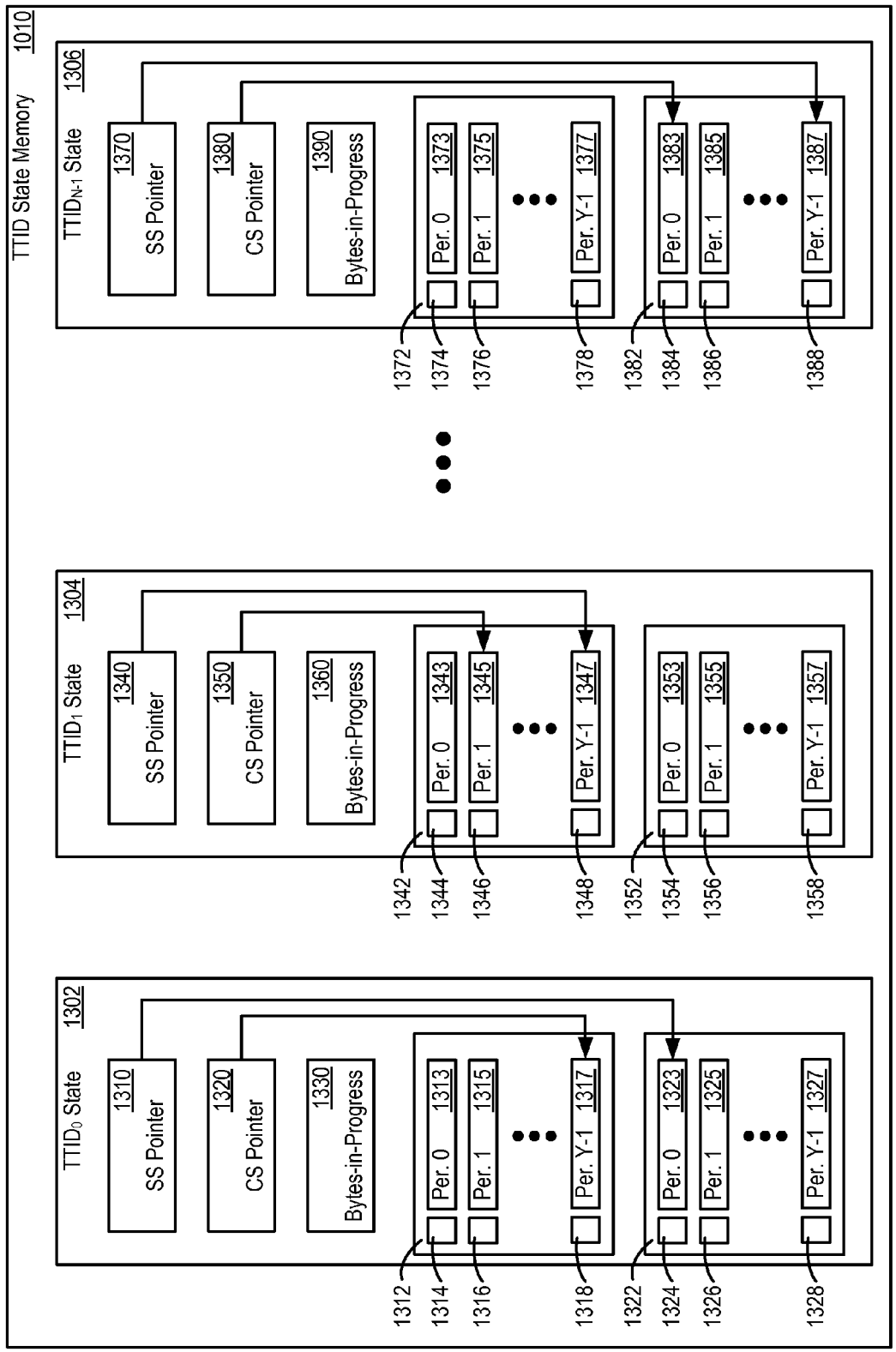

FIG. 13 is a block diagram illustrating additional details of the state memory 1010 of FIG. 10 for tracking periodic transactions, according to another embodiment. The state memory 1010 illustrated in FIG. 13 includes a plurality of state fields 1302-1306, each of which is associated with a corresponding transaction translator identifier (e.g., TTIDs 1022-1026 in FIG. 10). The state fields 1302-1306 are similar to the state fields 1012-1016 illustrated in FIG. 12, but the state fields 1302-1306 include two sets of periodic transaction lists 1312 and 1322, 1342 and 1352, and 1372 and 1382 (e.g., even and odd transaction lists), which allow periodic packets in two consecutive one-millisecond frames to be tracked and helps manage scheduling overlaps as will be described in more detail with reference to FIGS. 17 and 18. The state fields 1302-1306 are configured to store data concerning the state of a downstream transaction translator, such as the number of packets-in-progress (e.g., the number of transactions with the transaction translator) and the number of bytes-in-progress to downstream transaction translators (e.g., the number of bytes transmitted to or from the transaction translator in a given frame interval). According to one embodiment, the state memory 1010 is indexed by a transaction translator identifier (e.g., TTIDs 1022-1026 in FIG. 10) combined with a packet number and transaction list number.

The example state fields 1302-1306 include start-split pointers 1310, 1340, and 1370, complete-split pointers 1320, 1350, and 1380, and bytes-in-progress counters 1330, 1360, and 1390. The start-split pointers, complete-split pointers, and bytes-in-progress counters are shared by the transaction lists. For example, instead of including two start-split pointers (one for each of the transaction lists 1312 and 1322), the start-split pointer 1310 is shared by the transaction lists 1312 and 1322. As will be discussed in more detail with respect to FIGS. 17 and 18, there generally is no overlap between start-split transactions in adjacent millisecond frame intervals. Thus, after the secondary scheduler 192 dispatches the last start-split transaction from the transaction list 1312, the start-split pointer 1310 is set to point to the first split packet request in the transaction list 1322. Likewise, there generally is no overlap between complete-split transactions in adjacent millisecond frame intervals, so the complete-split pointer 1320 can be shared by the transaction lists 1312 and 1322 instead of including two complete-split pointers (one for each of the transaction lists 1312 and 1322). After the secondary scheduler 192 dispatches the last complete-split transaction from the transaction list 1312, the complete-split pointer 1320 is set to point to the first split packet request in the transaction list 1322.

The start-split pointers 1310, 1340, and 1370 are configured to store a value referring to a next one of the split packet requests in an appropriate transaction list 1312 or 1322 for which a start-split transaction is to be executed by the secondary scheduler 192. In a similar vein, the complete-split pointers 1320, 1350, and 1380 are configured to store a value referring to a next one of the split packet requests in an appropriate transaction list 1312 or 1322 for which a complete-split transaction is to be executed by the secondary scheduler 192. The bytes-in-progress counters 1330, 1360, and 1390 are configured to store a value or count reflecting the amount of data that has been or will be transmitted to a respective transaction translator. As will be described in more detail with reference to FIG. 17-22, the secondary scheduler 192 utilizes the counters 1330, 1360, and 1390 to throttle the rate at which transactions are dispatched, which may, for example, help prevent an overflow of the periodic buffers within a downstream transaction translator. Although not illustrated in FIG. 13, the state fields 1302-1306 may include one or more asynchronous packet counters (e.g., similar or identical to asynchronous packet counters 1210, 1240, and 1270) that are configured to track the number of asynchronous packets that have been sent to a respective transaction translator.

Each of the periodic packet lists or transaction lists 1312, 1322, 1342, 1352, 1372, and 1382 include a total of Y memory locations or slots (e.g., fifteen, sixteen, or any other number), each of which stores a split packet request. The split packet request may include header information, such as information used to form the IN or OUT tokens that follow a start-split token (e.g., the target device, endpoint address, direction of data transfer), information used to form the start-split or complete-split tokens (e.g., the hub address, port number, transaction speed, byte count, type of transaction), and state information, such as start/complete state field that indicate whether the split transaction is in the start state or complete state, a time stamp field indicating when a start-split transaction has been executed by the secondary scheduler 192 (e.g., so that corresponding complete-split transactions can be executed a predetermined number of microframes after the start-split transaction was dispatched), and an indication of how much payload data has already been transmitted (e.g., if multiple start-split transactions are used to deliver a large isochronous OUT transaction, for example). The fields that make up a split packet request according to one embodiment are shown in Table 3, below. The transaction lists 1312, 1322, 1342, 1352, 1372, and 1382 may also include valid bits or flags 1314-1318, 1324-1328, 1344-1348, 1354-1358, 1374-1378, and 1384-1388 that indicate whether an associated memory location is occupied.

When the primary scheduler 190 posts a periodic packet to a transaction list, header and state information associated with that packet are stored in the next available memory location in the transaction list and the valid bit associated with that memory location is updated to reflect that the memory location is occupied. The primary scheduler 190 determines the next available memory location by checking, for example, the valid bits associated with the memory locations in sequential order until an unoccupied memory location is found. In another embodiment, a fill location counter is used instead of valid bits. When a periodic transaction is dispatched to a downstream transaction translator, the state information associated with that transaction is updated (e.g., a start/complete state field is updated to indicate that the split packet request is in the complete phase) and the appropriate start-split or complete-split pointer is incremented (e.g., assuming that additional payload data does not need to be transmitted). For example, as illustrated in FIG. 13, the start-split pointer 1310 is pointing to the memory location 1323 in the transaction list 1322 and the complete-split pointer 1320 is pointing to the memory location 1317 in the transaction list 1312, which indicates that the secondary scheduler 192 is executing complete-split transactions from the transaction list 1302 (e.g., for a previous millisecond frame interval) and is executing start-split transactions from the transaction list 1322 (e.g., for the next sequential millisecond frame interval). The start-split and complete-split pointers 1340 and 1350 are pointing to memory locations 1347 and 1345, respectively, within the transaction list 1342, which indicates that start-split transactions corresponding to the split packet requests stored in memory locations preceding memory location 1347 have been dispatched to the transaction translator associated with the state field 1304 and that complete-split transactions corresponding to the split packet request stored in memory location 1343 have been dispatched to the transaction translator associated with the state field 1304. The start-split and complete-split pointers 1370 and 1380 are pointing to memory locations 1387 and 1383, respectively, within the transaction list 1382, which indicates that start-split transactions corresponding to the split packet requests stored in memory locations preceding memory location 1387 have been dispatched to the transaction translator associated with the state field 1306 and that complete-split transactions corresponding to the split packet request stored in memory location 1383 are still being dispatched to the transaction translator associated with the state field 1306.

Figure 14:
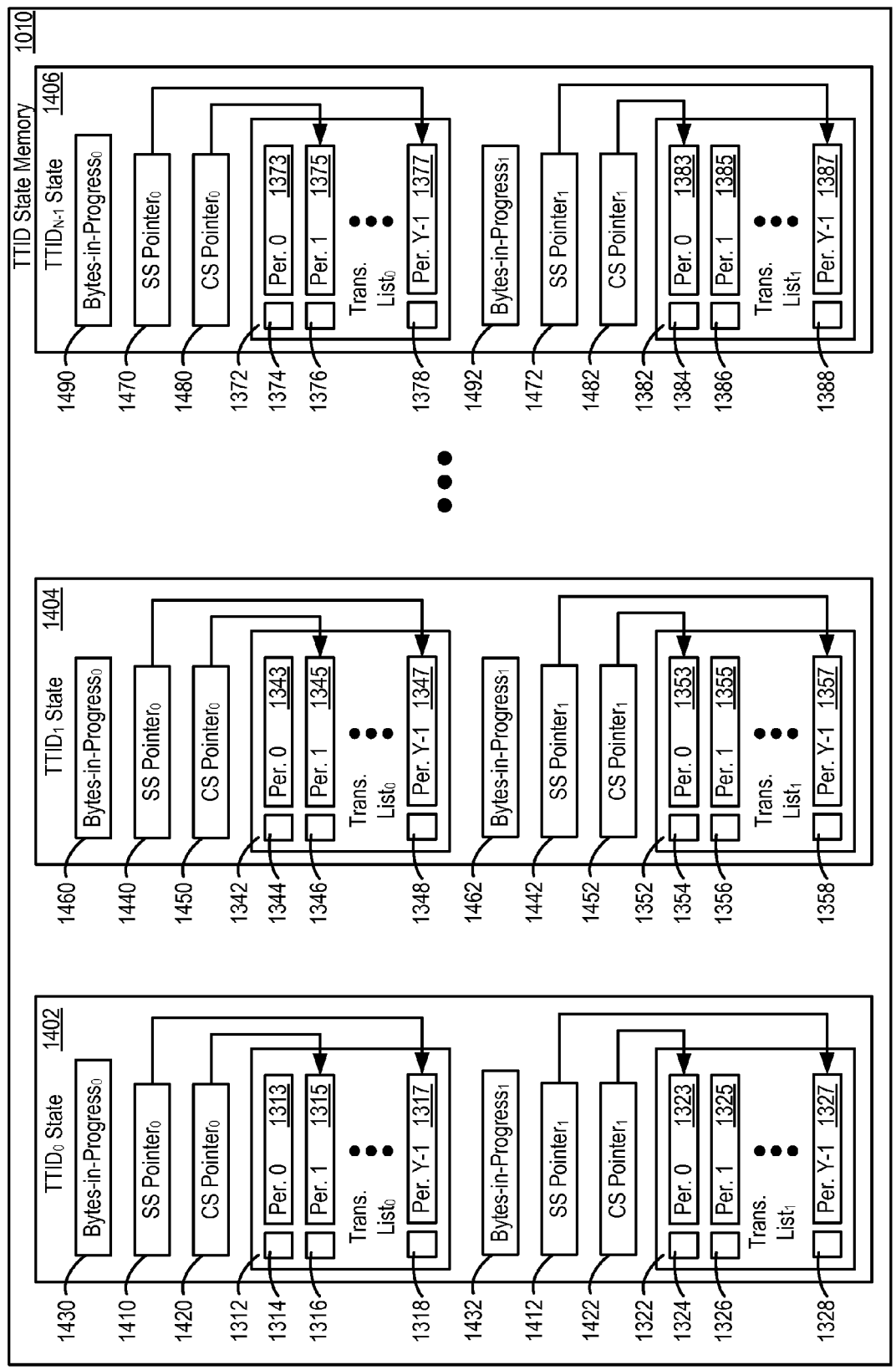

FIG. 14 is a block diagram illustrating additional details of the state memory 1010 of FIG. 10, according to yet another embodiment. The state fields 1402-1406 illustrated in FIG. 14 substantially mirror the state fields 1302-1306 in FIG. 13, but a set of start-split pointers, complete-split pointers, and bytes-in-progress counters are provided for each of the transaction lists. For example, a start-split pointer 1410, a complete-split pointer 1420, and a bytes-in-progress counter 1430 are provided for the transaction list 1312 and a start-split pointer 1412, a complete-split pointer 1422, and a bytes-in-progress counter 1432 are provided for the transaction list 1322. Likewise, start-split pointer 1440, complete-split pointer 1450, and counter 1460 are provided for the transaction list 1342, start-split pointer 1442, complete-split pointer 1452, and counter 1462 are provided for the transaction list 1352, start-split pointer 1470, complete-split pointer 1480, and counter 1490 are provided for the transaction list 1372, and start-split pointer 1472, complete-split pointer 1482, and counter 1492 are provided for the transaction list 1382. The start-split pointers 1410, 1412, 1440, 1442, 1470, and 1472 are configured to store a value referring to a next one of the split packet requests in an appropriate transaction list for which a start-split transaction is to be executed by the secondary scheduler 192. In a similar vein, the complete-split pointers 1420, 1422, 1450, 1452, 1480, and 1482 are configured to store a value referring to a next one of the split packet requests in an appropriate transaction list for which a complete-split transaction is to be executed by the secondary scheduler 192. The bytes-in-progress counters 1430, 1432, 1460, 1462, 1490, and 1492 are configured to store a value or count reflecting the amount of data that has been or will be transmitted to a respective transaction translator. Although not illustrated in FIG. 13, the state fields 1402-1406 may include one or more asynchronous packet counters (e.g., similar or identical to asynchronous packet counters 1210, 1240, and 1270) that are configured to track the number of asynchronous packets that have been sent to a respective transaction translator.

Figure 15:
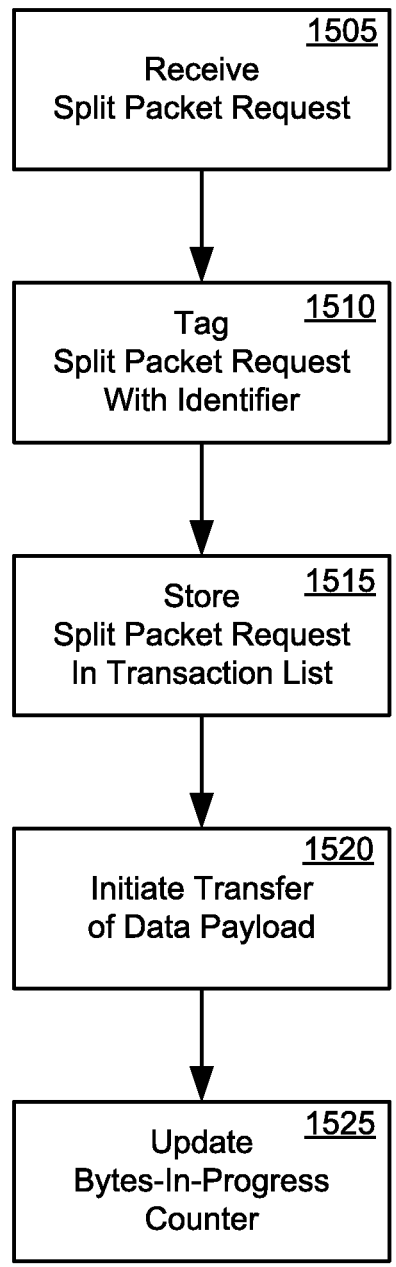
FIG. 15 is a flow chart of a method of transferring data over a multi-speed bus, according to one embodiment.

FIG. 15 is a flow chart of a method 1500 of transferring data over a multi-speed bus, according to one embodiment. System software, such as the OS, device drivers, or client drivers, initiates transfers to or from a target device by issuing transaction requests to the host engine. For example, a keyboard driver may poll a low-speed or full-speed keyboard (e.g., to check if a key has been depressed) by generating a transaction request and supplying a memory buffer into which any keyboard data should be stored. The system software may issue a transaction request by generating one or more transfer request block rings and ringing a doorbell. After the system software sets up the transfer request block rings and rings the doorbell, the primary scheduler 190 (FIG. 9) initiates a transaction request by sending a request to the list processor 918 to service the endpoint. If the list processor 918 determines that the transaction request involves a split transaction destined for a full-speed or low-speed device attached to a hub operating at high-speed, the list processor 918 executes the split transaction by generating a split packet request (e.g., from state and/or data information fields stored in a control memory associated with the list processor 918) and handing the split packet request off to the DMA engine 920, which pairs the split packet request up with the necessary data movement and passes the split packet request and any associated data to the encapsulator 146.

Figure 16:
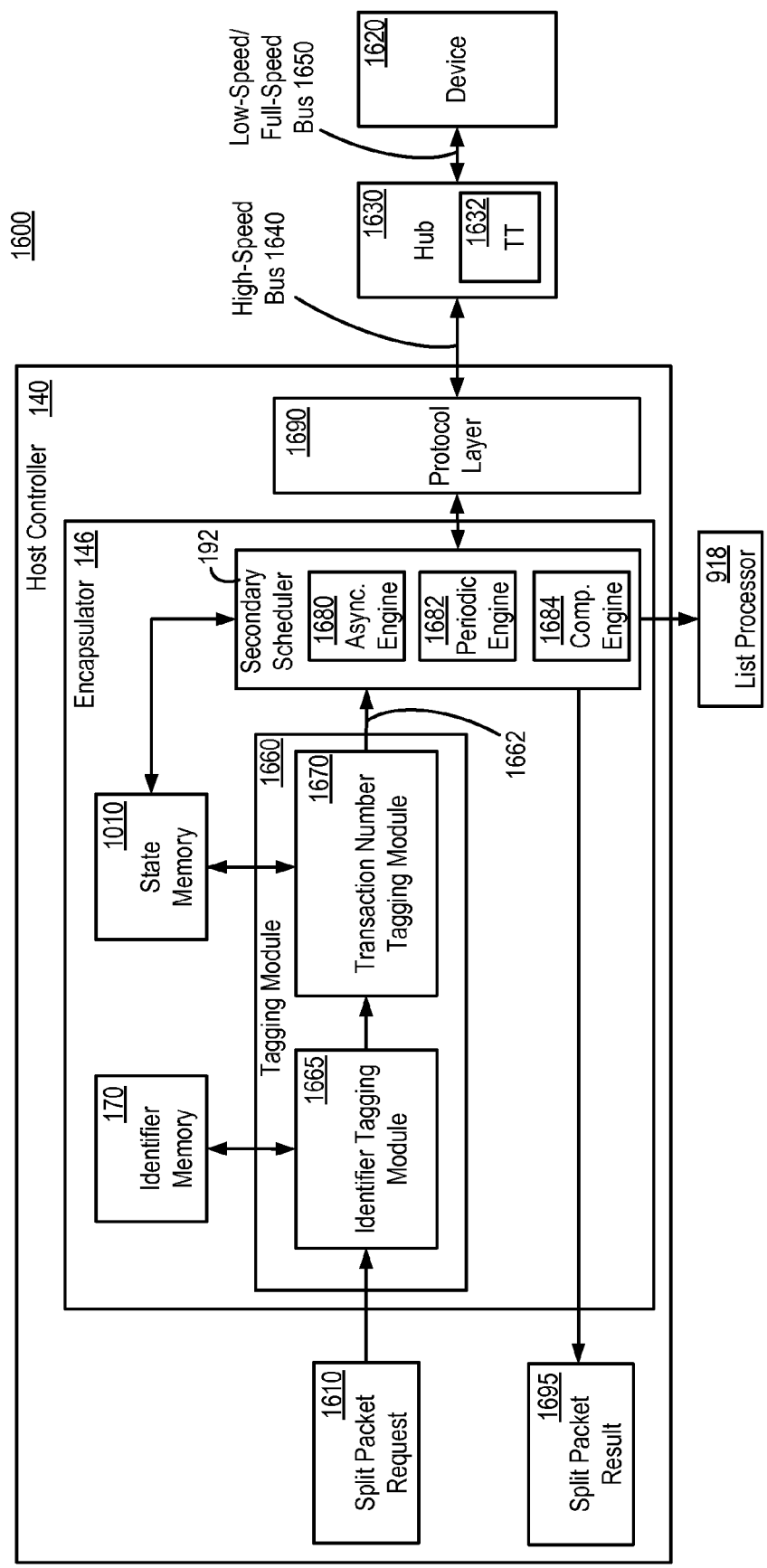
FIG. 16 is a block diagram illustrating the flow of a split packet request through a host controller and the interaction between various host controller components during the execution of a split packet request, according to one embodiment.

At step 1505, a split packet request is received (e.g., the encapsulator 146 receives or accesses a split packet request that was generated by the list processor 918). The split packet request includes information the host controller uses to communicate with the target device, such as the device address, endpoint address, endpoint direction (e.g., IN or OUT), byte count, hub address, hub port number, and an indication of whether the hub to which the target device is attached includes a single transaction translator or multiple transaction translators. One or more of the encapsulator 146, the tagging module within the encapsulator 146, or the identifier tagging module within the encapsulator 146 may be configured to receive the split packet request as illustrated in FIG. 16.

After receiving the split packet request, the split packet request is tagged with an identifier at step 1510. For example, the encapsulator may perform a lookup in the identifier memory 170 (which may be implemented as an associative array) to retrieve an identifier (e.g., TTID) associated with a downstream transaction translator or other speed translation component that handles the conversion of high-speed packets to low-speed or full-speed packets destined for the target low-speed or full-speed device. The lookup may be performed using the address of the hub that contains the transaction translator, the port number on the hub to which the target low-speed or full-speed device is connected, and an indication of whether the hub includes a single transaction translator or multiple transaction translators (e.g., a multi-TT indicator). If an identifier associated with the downstream transaction translator is found, the split packet request is tagged with the returned identifier, which is used to determine the appropriate state field (e.g., state fields 1012-1016 in FIGS. 10 and 12, state fields 1302-1306 in FIG. 13, and state fields 1402-1406 in FIG. 14) to access. The identifier becomes part of the information tag throughout the execution of the split packet request. If an identifier associated with the downstream transaction translator is not found in the identifier memory 170, an identifier is allocated to the transaction translator. Additional details regarding tagging the split packet request with an identifier are described with reference to FIG. 16. One or more of the encapsulator 146, the tagging module within the encapsulator 146, or the identifier tagging module within the encapsulator 146 may be configured to tag the split packet request with an identifier.

After the split packet request has been tagged with an identifier, the split packet request is stored in transaction list associated with that identifier. For example, with reference to FIG. 12, the split packet request may be stored in the next available memory location in the transaction list 1252 (e.g., assuming the identifier is associated with the state field 1014) and a valid bit associated with that memory location may be updated to reflect that the memory location is occupied. The next available memory location may be found by checking, for example, the valid bits associated with the memory locations in order until an unoccupied memory location is found. For example, if five periodic packets have already been scheduled for dispatch during an upcoming one-millisecond frame (e.g., five periodic packets have already been stored in the transaction list 1252), the split packet request is stored in the next sequential memory location. One or more of the primary scheduler 190, the encapsulator 146, the tagging module within the encapsulator 146, the transaction number tagging module within the encapsulator 146, or the secondary scheduler 192 may be configured to tag the split packet request with an identifier.

Because the transaction lists include a certain number of memory locations (e.g., 15 or 16 memory locations), storing the split packet request into one of the memory locations effectively allocates a packet execution resource (e.g., a packet number, packet pointer, resource handle, or other resource identifier) to the split packet request. For each downstream transaction translator, a specific number of ongoing packets-in-progress are reserved per identifier instance (e.g., TTID instance). For example, due to system resource constraints (e.g., bus bandwidth and transaction translator buffer size) only a finite number of transactions (e.g., low-speed or full-speed transactions) are dispatched to a downstream transaction translator. According to a preferred embodiment, the number of packets-in-progress that are reserved per instance is set to satisfy the split transaction scheduling requirements for transaction translators specified in the Universal Serial Bus Specification Revision 2.0, dated Apr. 27, 2000. For example, the number of periodic packets-in-progress that are reserved per instance may be set to not exceed 16 periodic packets-in-progress and the number of asynchronous packets-in-progress that are reserved per instance may be set to not exceed 2 asynchronous packets-in-progress. Additional or fewer packets-in-progress may be reserved per instance. If, for example, full host capability is not needed, fewer packets-in-progress may be reserved per instance.

According to one embodiment, the identifier associated with the downstream transaction translator (e.g., the TTID) and the packet execution resource associated with the transaction (e.g., the packet number) form the address in the state memory (e.g., the state memory is indexed by the identifier and the packet execution resource).

At step 1520, a transfer of all or a portion of a data payload associated with the transaction defined by the split packet request is initiated. For example, the secondary scheduler 192 may send start-split transactions using the split packet requests stored in the various memory locations of the transaction list. During the first microframe, for example, the start-split pointer may be initialized to the first active split packet request in the transaction list (e.g., the top of the list) and increment thereafter until start-split transactions corresponding to all active split packet requests have been dispatched. The bytes-in-progress counter is used by the secondary scheduler 192 to throttle the rate at which the start-splits are dispatched in real time. For example, if a predetermined amount of data has already been sent the secondary scheduler 192 in a given microframe interval, the secondary scheduler 192 may wait until a subsequent microframe interval before executing any additional start-split transactions. Additional details regarding executing transactions from transaction lists are described with reference to FIGS. 17-23. One or more of the secondary scheduler 192, the execution engine within the secondary scheduler 192, the completion engine within secondary scheduler 192, or the encapsulator 146 may be configured to tag the split packet request with an identifier.

At step 1525, the bytes-in-progress counter associated with the identifier is updated to reflect an amount of payload data for which transfer was initiated. For example, if the transaction associated with the split packet request is an isochronous OUT transaction and 188 bytes of the data payload was transmitted to the transaction translator as a result of step 1520, the bytes-in-progress counter may incremented by 188 bytes. If the less than 188 bytes of the data payload was transmitted to the transaction translator as a result of step 1520, the bytes-in-progress counter is incremented by actual number of bytes sent. By way of another example, if the transaction associated with the split packet request is an isochronous IN transaction and the transfer of 940 bytes of the payload data was initiated as a result of step 1520 (e.g., 940 bytes of data was requested to be sent to the host by the device), the bytes-in-progress counter may be incremented by 940 bytes. Additional details regarding updating the bytes-in-progress counter are described with reference to FIGS. 17-23. One or more of the secondary scheduler 192, the execution engine within the secondary scheduler 192, the completion engine within secondary scheduler 192, or the encapsulator 146 may be configured to update the bytes-in-progress counter.

FIG. 16 is a block diagram of a system 1600 illustrating the dataflow of a split packet request 1610 through the host controller 140 and the interaction between various host controller components during the execution of the split packet request 1610, according to one embodiment. To initiate a transfer between a target low-speed or full-speed device 1620 that is attached to a high-speed hub 1630, system software, such as the OS, device drivers, or client drivers, generates a transaction request and rings a doorbell to alert the primary scheduler 190 (FIG. 9) that an endpoint needs servicing. After the primary scheduler 190 determines when to execute the transaction and requests the list processor 918 to service that transaction, the list processor 918 generates a split packet request and transmits the split packet request to the encapsulator 146 via the DMA engine 920. As described in more detail below, the secondary scheduler 192 can also post a request to the list processor 918 to resend the split packet request. The hub 1630 includes a transaction translator 1632 that converts high-speed split transactions to low-speed or full-speed transactions for the device 1620. The hub 1630 is coupled to the host controller 140 via a high-speed bus 1640 (e.g., having a USB high-speed data transfer rate of approximately 480 megabits per second). The device 1620 is coupled to the hub 1630 via a low-speed or full-speed bus 1650 (e.g., having a USB low-speed data transfer rate of approximately 1.5 megabits per second or a USB full-speed data transfer rate of approximately 12 megabits per second).

The encapsulator 146 illustrated in FIG. 16 includes a tagging module or agent 1660 that is configured to tag the split packet request 1610 with a unique identifier (e.g., TTID) from the identifier memory 170 and tag the split packet request 1610 with a packet execution resource (e.g., a packet number, packet pointer, resource handle, or other resource identifier) based on data stored in the state memory 1010. After the encapsulator 146 receives or accesses the split packet request 1610, an identifier tagging module or agent 1665 requests a lookup in the identifier memory 170 to determine the unique identifier or TTID that has been allocated to the downstream transaction translator 1632. If a unique identifier has not been allocated to the transaction translator 1632, a unique identifier will be allocated. After the identifier memory 170 returns the TTID, the identifier tagging module 1665 tags the split packet request 1610 with the returned TTID, which becomes part of the information tag throughout the execution of the split packet request 1610. It should be noted that the TTID is not sent across buses 1640 and 1650.

The split packet request 1610 includes information the host controller 140 uses to communicate with the target device 1620, such as the address of the device 1620, the endpoint address (e.g., the uniquely addressable portion of the device 1620 that is the source or sink of data), the endpoint direction (e.g., IN or OUT), and the byte count. To facilitate a lookup in the identifier memory 170, the split packet request 1610 may include the address of the hub 1630, the port number on the hub 1630 to which the device 1620 is attached, and an indication of whether the hub 1630 includes a single transaction translator or multiple transaction translators.

According to one embodiment, the split packet request 1610 comprises a wide word that includes a plurality of bits that describe the information the host controller 140 uses to communicate with the target device 1620. Table 3 illustrates the various fields of a wide word that makes up the split packet request 1610, according to one embodiment. Split packet requests according to other embodiments may omit one or more of the fields illustrated in Table 3, include additional fields, or both.

TABLE 3

| Field | Width (Bits) | Brief Description |
| --- | --- | --- |
| Device Address | 7 | A seven-bit value representing the address of a device (e.g., the device 1620 in FIG. 16) on the bus. |
| Endpoint Number | 4 | A four-bit value associated with an endpoint on a device. |
| Byte Count | 11 | An eleven-bit value reflecting the number of bytes associated with the split transaction. |
| Endpoint Type | 2 | A two-bit value specifying the endpoint type (e.g., interrupt, isochronous, bulk, or control). |
| Endpoint Direction | 2 | A two-bit value specifying the direction of data transfer (e.g., IN, OUT, SETUP, or PING). |
| Set Address | 1 | A one-bit value indicating whether the transaction includes a set address packet (e.g., a request that sets the device address for all future device accesses). |
| Control Status | 1 | A one-bit value indicating a control status phase. |
| Data Sequence | 2 | A two-bit value indicating a data packet sequence (e.g., DATA0, DATA1, DATA2, and MDATA). |
| Speed | 4 | A four-bit value indicating xHCI speed (e.g., full-speed, low-speed, high-speed, or super-speed). |
| Hub Address | 7 | A seven-bit value representing a device address of the target hub (e.g., the hub 1630) on the bus. |
| Port Number | 7 | A seven-bit value representing a port number of the hub that the split transaction is targeting. |
| Multi-TT | 1 | A one-bit value indicating the number of transaction translators that are within the hub (e.g., one transaction translator per port or one transaction translator that is shared by all ports). |

TABLE 3-continued

| Field | Width (Bits) | Brief Description |
|---|---|---|
| Start/Complete State | 1 | A one-bit value indicating whether the split transaction is in the start state or complete state. |
| S-Bit | 1 | A one-bit value indicating the split S-bit (e.g., the speed field in FIG. 8 indicating a low-speed or full-speed transaction). The S-bit value is added to the wide word by the encapsulator 146 and is place holder in the split packet request. |
| EU-Bit | 1 | A one-bit value indicating the split EU-bit (e.g., the end field 860 in FIG. 8). The EU-bit value is added to the wide word by the encapsulator 146 and is place holder in the split packet request. The S-bit and EU-bit may be used together to designate the start, beginning, middle, or end of an isochronous OUT transaction. The EU-bit is generally "0" except for isochronous OUT transactions. |
| MaxPacketSize | 11 | An eleven-bit value reflecting the maximum packet size the endpoint is capable of sending or receiving. |
| TTID | N | The TTID value is added to the wide word by the identifier tagging module 1665 and is place holder in the split packet request. The TTID value is generally not valid when the split packet request is received by the encapsulator (e.g., all bits may be set to "0"). The width of the TTID may vary depending on the number of TTIDs provided in the associative array (e.g., 5 bits for 32 TTIDs). |
| Split Packet Request Source | 1 | A one-bit value indicating the source of the split packet request. A "0" indicates that the primary scheduler 190 (FIG. 9) made the request. A "1" indicates that the secondary scheduler 192 made the request, such as when the secondary scheduler 192 requests the transaction to be resent (additional details of which are discussed below). |
| Overlap Flag | 1 | A one-bit value used to flag special handling of IN split transaction with one-millisecond timing. For example, the overlap flag may be used to indicate that the data sequence number DATA0/DATA1 may not be correct in the split packet request because there may be a request in the opposite bank of odd/even packet lists (INs only) that may affect the sequence number. Until the packet with the same EP/ADDR finishes in the previous packet list, the data sequence number generally cannot be determined. When the overlap flag is set to "1," the encapsulator 146 verifies the data sequence number against what is passed in the re-request phase (after a complete-split) instead of the primary phase. |
| Split Phase Request | 1 | A one-bit value indicating a start or complete phase request. A zero indicates that the transaction should start from the start-split state. A one indicates that the transaction should start directly from the complete-split state. |

After the encapsulator 146 receives the split packet request 1610 (e.g., from the DMA engine 920 in FIG. 9), the split packet request 1610 is handed to the identifier tagging module 1665, which holds the split packet request 1610 for one or more clock cycles while a lookup is performed in the identifier memory 170. After the split packet request 1610 is tagged with the TTID, the identifier tagging module 1665 presents the tagged split packet request 1610 to a transaction number tagging module 1670, which tags the split packet request 1610 with a packet execution resource, such as a packet number. The packet execution resource becomes part of the information tag throughout the execution of the split packet request 1610. It should be noted that the TTID and packet execution resource are not sent across buses 1640 and 1650.

For each downstream transaction translator, a specific number of packets-in-progress are reserved per identifier instance (e.g., TTID instance). For example, two asynchronous and fifteen periodic packet execution resources may be reserved per transaction translator. According to one embodiment, the transaction number tagging module 1670 tags the split packet request 1610 with a packet number by storing all or a portion of the split packet request 1610 in the state memory 1010. For example, if the split packet request 1610 involves a periodic transaction, packet information associated with the split packet request 1610 is stored in the next available memory location in an appropriate periodic packet list (e.g., one of the memory locations 1223 through 1227 in packet list 1222 of FIG. 12, for example). Because the state memory 1010 is indexed by the unique identifier (e.g., TTID) and the packet execution resource (e.g., packet number), the TTID assigned to the split packet request 1610 helps determine the appropriate packet list in which to store the packet information.

The packet information stored in the state memory 1010 may include one or more of the device address, endpoint address, endpoint direction (e.g., IN or OUT), byte count, hub address, hub port number, single or multiple transaction translator indicator, packet phase (e.g., start-split or complete-split), isochronous OUT packet phase (e.g., start-split all, begin, mid, or end as indicated in the S&E fields), and fraction of packet length remaining to be transferred. According to one embodiment, the TTID and packet number are not stored in the state memory 1010 along with the packet information. Instead, the TTID and packet number form the address of the memory location in the state memory 1010. However, certain embodiments may store the TTID and packet number along with the packet information in the state memory 1010.

After the split packet request 1610 is tagged with an identifier by the identifier tagging module 1665 and tagged with the packet execution resource (e.g., stored in an appropriate packet list in state memory 1010), the tagging module 1660 sends a trigger 1662 to the secondary scheduler 192 so that the secondary scheduler 192 can execute a split transaction (e.g., start-split or complete-split transaction) corresponding to the split packet request 1610 (e.g., in a subsequent one-millisecond frame for periodic transactions). In other words, the TTID and packet number tagged split packet request 1610 does not flow directly from the tagging module 1660 to the secondary scheduler 192. Instead, the split packet request 1610 is routed through the state memory 1010, which is shared by the tagging module 1660 and the secondary scheduler 192. In other words, the split packet request 1610 is stored in the state memory 1010 and is later retrieved by the secondary scheduler 192. According to one embodiment, the secondary scheduler 192 includes an asynchronous execution engine 1680, a periodic execution engine 1682, and a completion engine 1684.

At an appropriate microframe interval (e.g., for periodic transactions), one of the asynchronous, periodic, or completion engines 1680, 1682, or 1684 accesses the state memory 1010 to execute the split transactions (including the split transaction corresponding to the split packet request 1610) stored in the transaction lists in the state memory 1010. The split transaction corresponding to the split packet request 1610 is provided to a protocol layer 1690 (e.g., buffers 976 or 978, the protocol layer 980, and the port manager 982 in FIG. 9), which causes the split transaction to move across the high-speed bus 1640, through the transaction translator 1632, across the low-speed or full-speed bus 1650, and to the device 1620. The device 1620 may then send an acknowledgment (e.g., an ACK or NAK packet) or data (e.g., if the split packet request 1610 was an IN transaction) across the low-speed or full-speed bus 1650, through the transaction translator 1632, onto the high-speed bus 1640, and to the protocol layer 1690.

After the protocol layer 1690 receives the acknowledgment (or data), one of the asynchronous, periodic, or completion engines 1680, 1682, or 1684 may update state information stored in the state memory 1010 to reflect the full or partial execution of the split packet request 1610. For example, if an acknowledgement from a start-split transaction for the split packet request 1610 is received, the state information stored in the state memory 1010 is updated to indicate that a complete-split transaction can be sent. By way of another example, if an acknowledgment from a complete-split transaction for the split packet request 1610 is received, the state information associated with the split packet request 1610 may be cleared from the state memory 1010. The TTID and packet number, which were passed down to secondary scheduler 192, are used to access the appropriate memory location in the state memory 1010 (i.e., the TTID and packet number form the address in state memory 1010). In other embodiments, the hub address, port number, and multi-TT indicator are passed down to the secondary scheduler 192 (instead of the TTID and packet number) and another lookup is performed after the acknowledgment or data is received from the hub 1630.

After the acknowledgment or data is received (and possibly after state information is updated), a split packet result 1695 is provided to the system software (e.g., the data from the device 1620 is posted to the buffer designated by the device driver or a confirmation that an OUT packet was sent successfully is provided to the device driver).

According to one embodiment, the secondary scheduler 192 is configured to post a request to the TRM or list processor 918 requesting the list processor 918 to resend or repeat the split packet request 1610. Requesting the split packet request 1610 to be resent helps minimize the amount of data that is stored in the state memory 1010 and, thus, helps keep the amount of memory used to implement the state memory 1010 to a minimum. For example, by re-requesting the split packet request 1610, all of the header fields and the data payload associated with the split packet request 1610 do not need to be stored in the state memory 1010 (or elsewhere, such as in the DMAs 920 in FIG. 9). Data storage alone may require the use of a relatively large amount of memory, particularly when there are many active transaction translator identifiers.

Thus, with reference to FIGS. 9 and 16, the split packet request 1610 may be initiated by the primary scheduler 190 or the secondary scheduler 192. The split packet request source field (see Table 3) included in the split packet request 1610 indicates the source of the split packet request 1610. If the primary scheduler 190 initiates the split packet request 1610, the list processor 918 gathers the data used to form the split packet request 1610 and passes the split packet request 1610 to the encapsulator 146 via the DMA engine 920. After the encapsulator 146 receives the split packet request 1610, the identifier tagging module 1665 tags the split packet request 1610 with a TTID and the transaction number tagging module 1670 tags the split packet request 1610 with a packet execution resource. If the secondary scheduler 192 initiates the split packet request 1610, the list processor 918 again gathers the data used to form the split packet request 1610 (which may involve request the transfer request block from the system memory again) and passes the re-requested split packet request 1610 to the encapsulator 146 via the DMA engine 920. The tagging module 1660 preferably does not tag the re-requested split packet request 1610 with a new TTID and a new packet execution resource. Instead, the tagging module 1660 may pair the re-requested split packet request 1610 with the previously stored split packet request.

The dataflow through the host controller 140 may vary depending on the whether the transaction involves an asynchronous IN, asynchronous OUT, periodic IN, or periodic OUT transaction. If the split packet request 1610 relates to an asynchronous OUT transaction, there typically is no need to re-request the split packet request 1610. Instead, the primary scheduler 190 makes an initial request for the split packet request 1610 and an outbound DMA engine pairs the split packet request 1610 up with the necessary data movement. After the encapsulator 146 receives the split packet request 1610, the tagging module 1660 tags the split packet request 1610 with a TTID and packet execution resource and stores all or a portion of the split packet request 1610 in the state memory 1010, and a start-split transaction for the split packet request 1610 is dispatched along with the outbound data (e.g., by the asynchronous execution engine 1680 in response to a trigger). At some later point in time, a complete-split transaction is dispatched and the response to the complete-split transaction is sent to the list processor 918 along a return path.

If the split packet request 1610 relates to an asynchronous IN transaction, the primary scheduler 190 makes an initial request for the split packet request 1610 and an inbound DMA engine forwards the split packet request 1610 to the encapsulator 146 but does not store the data buffer pointer (e.g., one or more pointers to a host memory buffer into which inbound data from the device is stored). After the encapsulator 146 receives the split packet request 1610, the tagging module 1660 tags the split packet request 1610 with a TTID and packet execution resource and stores all or a portion of the split packet request 1610 in the state memory 1010, and a start-split transaction for the split packet request 1610 is dispatched (e.g., by the asynchronous execution engine 1680 in response to a trigger). At some later point in time, a complete-split transaction is dispatched and the split packet request 1610 is re-requested. For example, the completion engine 1684 may post a request to the list processor 918 to resend the split packet request 1610. After the list processor 918 gathers the data used to form the re-requested split packet request 1610, the re-requested split packet request 1610 is passed to the encapsulator 146 via the inbound DMA engine, which preferably stores the data buffer pointer (e.g., within local storage of the inbound DMA, which may be sized to store N pointers per root port plus N pointers for the encapsulator). After the encapsulator 146 receives the re-requested split packet request 1610, the tagging module 1660 preferably does not tag the re-requested split packet request 1610 with a new TTID and a new packet execution resource because the initial split packet request 1610 should already be stored in the state memory 1010. After a response is received from the complete-split transaction, the response is sent along with the inbound data to the list processor 918 via a return path (e.g., with reference to FIG. 9, the response moves from the port manager 982 up through the protocol layer 980, into the asynchronous buffer 976, and eventually onto the bus 128 via the root hub 934, the inbound DMA engine, the list processor 918, and the bus interface 912).

If the split packet request 1610 relates to a periodic OUT transaction, the primary scheduler 190 makes an initial request for the split packet request 1610 and an outbound DMA engine forwards the split packet request 1610 to the encapsulator 146 without the outbound data. After the encapsulator 146 receives the split packet request 1610, the tagging module 1660 tags the split packet request 1610 with a TTID and packet execution resource and stores all or a portion of the split packet request 1610 in the state memory 1010. At the appropriate time, the periodic execution engine 1682 posts a request to the list processor 918 to resend the split packet request 1610. If the data packet is more than 188 bytes (e.g., an isochronous transfer), the periodic execution engine 1682 preferably only requests the data packet fragment(s) that will be sent during the microframe. The periodic execution engine 1682 can request additional data fragments at some later point with one or more additional repeat requests until the entire data packet is dispatched in subsequent microframes. After the list processor 918 gathers the data used to form the re-requested split packet request 1610, the re-requested split packet request 1610 is passed to the encapsulator 146 via the outbound DMA engine, which pairs the re-requested split packet request 1610 up with the necessary data movement. After the encapsulator 146 receives the re-requested split packet request 1610, the tagging module 1660 preferably does not tag the re-requested split packet request 1610 with a new TTID and a new packet execution resource because the initial split packet request 1610 should already be stored in the state memory 1010. Instead, one or more of the fields in the re-requested split packet request 1610 (e.g., one or more of the fields illustrated in Table 3) may be inspected (e.g., by the tagging module 1660) and the data in the inspected field(s) may be used to update the data stored in the state memory 1010 (e.g., the data in the state memory 1010 associated with the initial split packet request 1610). For example, in an overlap case, the data packet sequence number (DATA0/DATA1) may not be reliable on first request but should be reliable in the re-requested split packet request 1610 because the previous packet should be executed. After the encapsulator 146 receives the re-requested split packet request 1610 and the outbound data, the periodic execution engine 1682 causes a start-split transaction for the split packet request 1610 to be dispatched along with the outbound data. At some later point in time, a complete-split transaction is dispatched and the response to the complete-split transaction is sent to the list processor 918 along a return path (e.g., with reference to FIG. 9, the response moves from the port manager 982 up through the protocol layer 980, into the periodic buffer 978, and eventually onto the bus 128 via the root hub 934, the outbound DMA engine, the list processor 918, and the bus interface 912).

If the split packet request 1610 relates to a periodic IN transaction, the primary scheduler 190 makes an initial request for the split packet request 1610 and an inbound DMA engine forwards the split packet request 1610 to the encapsulator 146 but does not store the data buffer pointer (e.g., one or more pointers to a host memory buffer into which inbound data from the device is stored). After the encapsulator 146 receives the split packet request 1610, the tagging module 1660 tags the split packet request 1610 with a TTID and packet execution resource and stores all or a portion of the split packet request 1610 in the state memory 1010 and a start-split transaction for the split packet request 1610 is dispatched at the appropriate time (e.g., by the periodic execution engine 1682). At some later point in time, a complete-split transaction is dispatched and the split packet request 1610 is re-requested. For example, the completion engine 1684 may post a request to the list processor 918 to resend the split packet request 1610. After the list processor 918 gathers the data used to form the re-requested split packet request 1610, the re-requested split packet request 1610 is passed to the encapsulator 146 via the inbound DMA engine, which preferably stores the data buffer pointer (e.g., within local storage of the inbound DMA, which may be sized to store N pointers per root port plus N pointers for the encapsulator). Because the inbound data packet may come back in fragments, the periodic execution engine 1682 may post multiple requests to the list processor 918 to resend the split packet request 1610 multiple times to prime the inbound DMA engine with the appropriate data buffer pointer after the data packet(s) arrives with the complete-split token. After the encapsulator 146 receives the re-requested split packet request 1610, the tagging module 1660 preferably does not tag the re-requested split packet request 1610 with a new TTID and a new packet execution resource because the initial split packet request 1610 should already be stored in the state memory 1010. Instead, one or more of the fields in the re-requested split packet request 1610 (e.g., one or more of the fields illustrated in Table 3) may be inspected (e.g., by the tagging module 1660) and the data in the inspected field(s) may be used to update the data stored in the state memory 1010 (e.g., the data in the state memory 1010 associated with the initial split packet request 1610). For example, in an overlap case, the data packet sequence number (DATA0/DATA1) may not be reliable on first request but should be reliable in the re-requested split packet request 1610 because the previous packet should be executed. After a response is received from the complete-split transaction, the response is sent along with the inbound data to the list processor 918 via a return path (e.g., with reference to FIG. 9, the response moves from the port manager 982 up through the protocol layer 980, into the periodic buffer 978, and eventually onto the bus 128 via the root hub 934, the inbound DMA engine, the list processor 918, and the bus interface 912).

Figure 17:
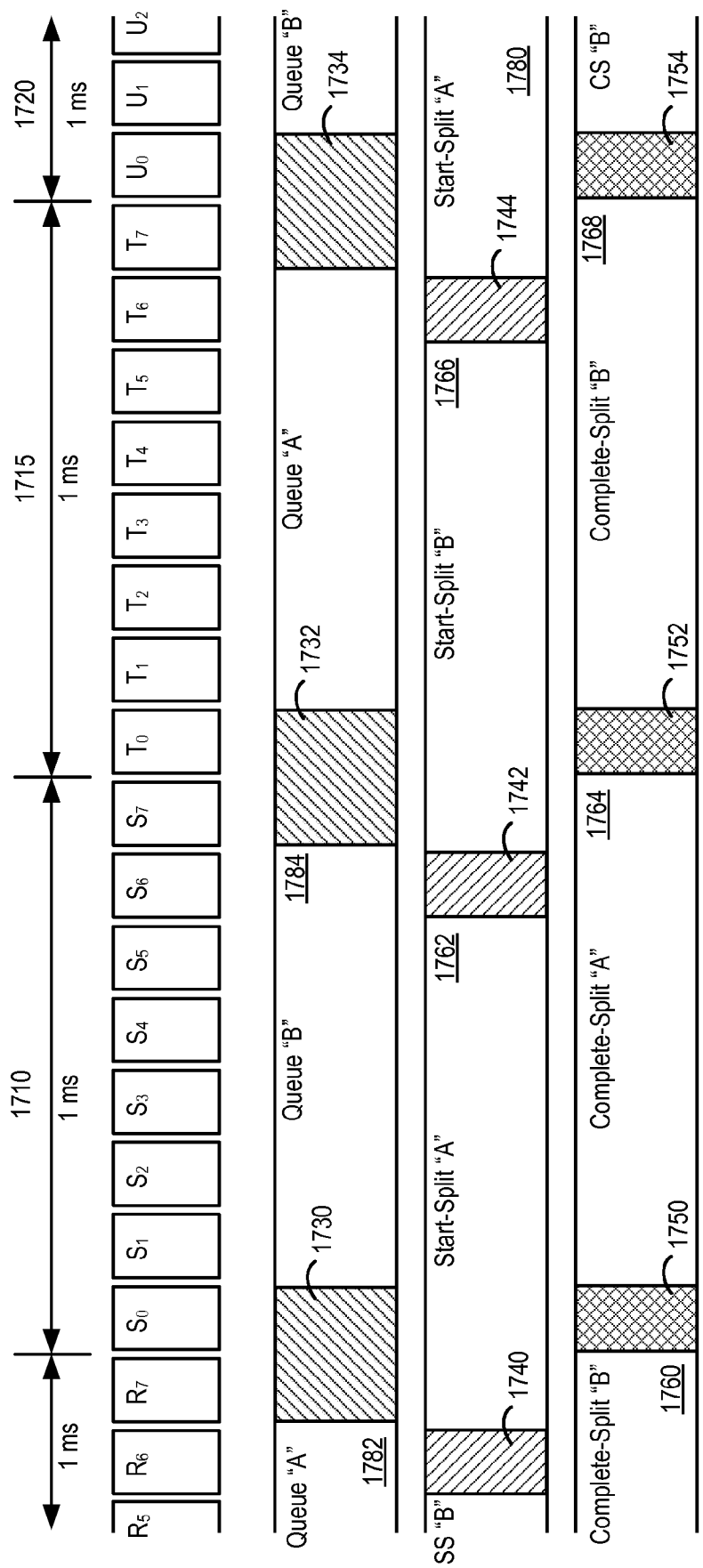
FIG. 17 is a diagram illustrating three phases of packet execution, according to one embodiment.

FIG. 17 is a diagram illustrating three phases of packet execution, according to one embodiment. The three phase of packet execution include posting or queuing split packet requests to an appropriate transaction list, dispatching start-split transactions, and dispatching complete-split transactions. In FIG. 17, each block $R_5$-$R_7$, $S_0$-$S_7$, $T_0$-$T_7$, and $U_0$-$U_2$ represents a sub-frame or microframe. For example, each block may represent a 125 microsecond (μsec) block of time aligned with a start of frame, such as a USB start of frame (SOF). A USB SOF is the first transaction in each millisecond frame interval and microframe interval and allows endpoints to identify the start of the millisecond frame or microframe. The sub-frame blocks are grouped into frame intervals (e.g., one millisecond blocks of time). For example, sub-frame blocks $S_0$-$S_7$ are grouped into a frame interval 1710 and sub-frame blocks $T_0$-$T_7$ are grouped into a frame interval 1715. In other words, the frame intervals 1710 and 1715 are each divided into eight microframes or sub-frames (e.g., eight 125 microsecond intervals). According to one embodiment, the subscripted number noted on the sub-frame blocks represents the lowest three bits of a microframe counter value. For example, for sub-frame $S_5$, the subscripted "5" represents the lowest three bits of the microframe counter value of 0101, as illustrated in Table 4.

TABLE 4

| Frame Interval | Bit 3 | Bit 2 | Bit 1 | Bit 0 | Sub-frame |
|---|---|---|---|---|---|
| 1710 | 0 | 0 | 0 | 0 | $S_0$ |
|  | 0 | 0 | 0 | 1 | $S_1$ |
|  | 0 | 0 | 1 | 0 | $S_2$ |
|  | 0 | 0 | 1 | 1 | $S_3$ |
|  | 0 | 1 | 0 | 0 | $S_4$ |
|  | 0 | 1 | 0 | 1 | $S_5$ |
|  | 0 | 1 | 1 | 0 | $S_6$ |
|  | 0 | 1 | 1 | 1 | $S_7$ |
| 1715 | 1 | 0 | 0 | 0 | $T_0$ |
|  | 1 | 0 | 0 | 1 | $T_1$ |
|  | 1 | 0 | 1 | 0 | $T_2$ |

TABLE 4-continued

| Frame Interval | Bit 3 | Bit 2 | Bit 1 | Bit 0 | Sub-frame |
|---|---|---|---|---|---|
|  | 1 | 0 | 1 | 1 | $T_3$ |
|  | 1 | 1 | 0 | 0 | $T_4$ |
|  | 1 | 1 | 0 | 1 | $T_5$ |
|  | 1 | 1 | 1 | 0 | $T_6$ |
|  | 1 | 1 | 1 | 1 | $T_7$ |
| 1720 | 0 | 0 | 0 | 0 | $U_0$ |
|  | . | . | . | . | . |
|  | . | . | . | . | . |
|  | . | . | . | . | . |
|  | 0 | 1 | 1 | 1 | $U_7$ |

According to one embodiment, two transactions lists are maintained, each of which is used to build a schedule for a particular frame interval. For example, one of the transactions lists may be reused between frame intervals 1710 and 1720 (e.g., the transaction lists alternate between non-adjacent frame intervals). According to another embodiment, a transaction list is maintained for each frame interval (e.g., each of the frame intervals 1710, 1715, and 1720) and the transaction list is used to build a schedule for that frame interval. According to yet another embodiment, a single transaction list is used (e.g., if scheduling overlap is restricted, which limits bandwidth). The primary scheduler 190 performs a credit check before posting a split packet request to a transaction list. The credit check verifies that there is at least one remaining entry available in the appropriate transaction list and that there is sufficient bandwidth remaining for the designated transaction translator instance. If the credit check fails (e.g., there are no remaining entries in the transaction list and/or there is not sufficient bandwidth remaining), the primary scheduler 190 retries at the next appropriate time (e.g., a subsequent frame interval). Additional details of the primary scheduler 190 performing a credit check are described with reference to FIG. 19.

If, on the other hand, the credit check does not fail, the split packet request is tagged with an appropriate transaction translator identifier and the primary scheduler 190 posts the split packet request to the appropriate transaction list at a predetermined time, such as microframe 6 (e.g., $R_6$, $S_6$, and $T_6$). Split packet requests may be posted to a transaction list between the 1st and 6th microframes (e.g., between $S_1$ and $S_6$ and between $T_1$ and $T_6$) of the millisecond frame preceding the scheduled execution frame. For example, as illustrated in FIG. 17, if a split packet request is being posted to transaction list "B", the split packet request may be queued or posted between microframe blocks $S_1$ and $S_6$. According to one embodiment, the primary scheduler 190 is prohibited from posting in the 0th and 7th microframes (e.g., $R_7$, $S_0$, $S_7$, $T_0$, $T_7$, and $U_0$). Thus, as illustrated in FIG. 17, the primary scheduler 190 is blocked from performing credit checks in the shaded blocks 1730, 1732, and 1734. If the primary scheduler 190 violates the credit check prohibition in the 0th and 7th microframes, the split packet request is queued to a previous packet list. For example, if the primary scheduler 190 performs a credit check during microframe block $S_7$ or $T_0$, the split packet request is queued to transaction list "B" (e.g., if there is delay between a credit check in microframe block $S_6$ and the packet header arriving at the port, the packet will be queued in transaction list "B" after the packet header arrives late in microframe blocks $S_7$ or $T_0$, for example). Additional details regarding tagging a split packet request and posting a split packet request to a transaction list are described with reference to FIGS. 15, 16, and 19.

As illustrated in FIG. 17, the secondary scheduler 192 may execute or dispatch start-split transactions from a transaction list between the 7th microframe preceding the scheduled execution frame and the 5th microframe of the scheduled execution frame (e.g., between $R_7$ and $S_5$ and between $S_7$ and $T_5$). In other words, a start-split execution window is formed between microframe blocks $R_7$ and $S_5$ and between microframe blocks $S_7$ and $T_5$. According to one embodiment, the secondary scheduler 192 is prohibited from executing a start-split transaction during the 6th microframe ($R_6$, $S_6$, and $T_6$). If the secondary scheduler 192 did not execute all of the transactions from a given transaction list during the execution window, the unexecuted start-split transactions are purged during the 6th microframe and a start-split transaction error is flagged (e.g., an error condition is asserted to the host 120) as illustrated by shaded blocks 1740, 1742, and 1744. Additional details of dispatching start-split transactions from a transaction list, including the rate at which start-split transactions are dispatched from a transaction list, are described with reference to FIGS. 20, 21A, 21B, and 21C.

The secondary scheduler 192 may execute or dispatch complete-split transactions from a transaction list between the 1st microframe of the scheduled execution frame and the 0th microframe following the scheduled execution frame (e.g., between $S_1$ and $T_0$ and between $T_1$ and $U_0$) as illustrated in FIG. 17. In other words, a complete-split execution window is formed between microframe blocks $S_1$ and $T_0$ and between microframe blocks $T_1$ and $U_0$. In addition, a complete-split transaction may execute no sooner than the final start-split phase. For periodic transactions, a complete-split transaction may execute at least one sub-frame after the final start-split phase (e.g., there is at least one full sub-frame between the last start-split and the first complete-split). According to one embodiment, the split packet request stored in the transaction list includes a time stamp field or marker indicating when the final start-split transaction has been executed by the secondary scheduler 192 (e.g., so that corresponding complete-split transactions can be executed a predetermined number of microframes after the final start-split transaction was dispatched). For isochronous OUT transactions, there is no complete-split phase. Thus, split packet requests associated with isochronous OUT transactions may be marked done in the transaction list after the start-split phase is executed. According to one embodiment, the final complete-transaction is dispatched during the 0th microframe (e.g., $S_0$, $T_0$, and $U_0$). If the hub responds with a MDATA or NYET handshake packet in the 0th microframe, the complete-split transactions are purged from the transaction list and a split transaction error or standard transaction error is flagged (e.g., an error condition is asserted to the host 120) as illustrated by shaded blocks 1750, 1752, and 1754. For example, if the transaction translator is still receiving data on the downstream facing bus during the 0th microframe, the transaction translator will respond with either an MDATA or NYET handshake packet in response to the corresponding complete-split transaction. Additional details regarding dispatching complete-split transactions from a transaction list are described with reference to FIG. 22.

Due to the pipelined nature of the transaction translators (e.g., the periodic transaction pipeline 300 in FIG. 3), there may be overlap between packets executing the complete phase for a previous one-millisecond frame interval and the start phase for the current one-millisecond frame interval (e.g., between complete-split "B" window 1760 and start-split "A" window 1762, between complete-split "A" window 1764 and start-split "B" window 1766, and between complete-split "B" window 1768 and start-split "A" window 1780). According to one embodiment, two transactions lists (e.g., "even" and "odd" transactions lists or "A" and "B" transaction lists) are maintained to manage the scheduling overlap. For example, when the microframe counter is even (e.g., bit 3 of the microframe counter, as illustrated in Table 4), the secondary scheduler 192 is executing transactions from the "even" list (e.g., transaction list "A"). In other words, when the microframe counter is even the secondary scheduler 192 executes start-split transactions during the start-split "A" window 1762, for example, and executes complete-split transactions during the complete-split "A" window 1764, for example. The primary scheduler 190 posts or queues split packet requests to transaction list "A" for execution during windows 1762 and 1764 during queue "A" window 1782. When the microframe counter is odd (e.g., bit 3 of the microframe counter, as illustrated in Table 4), the secondary scheduler 192 is executing transactions from the "odd" list (e.g., transaction list "B"). In other words, when the microframe counter is odd the secondary scheduler 192 executes start-split transactions during the start-split "B" window 1766, for example, and executes complete-split transactions during the complete-split "B" window 1768, for example. The primary scheduler 190 posts or queues split packet requests to transaction list "B" for execution during windows 1766 and 1768 during queue "B" window 1784. The secondary scheduler 192 alternates between the "even" and "odd" transaction lists (e.g., transaction lists "A" and "B") as time progresses. Maintaining two separate transaction lists may help avoid contention while there is overlap in the scheduling pipeline.

According to one embodiment, the primary and secondary schedulers 190 and 192 decode the lowest four bits of a microframe counter value when posting or queuing split packet requests to an appropriate transaction list, dispatching start-split transactions, and dispatching complete-split transactions, as summarized in Table 5, below. For conciseness, Table 5 only illustrates the sub-frames that make up the frame intervals 1710 and 1715 in FIG. 17.

Figure 18:
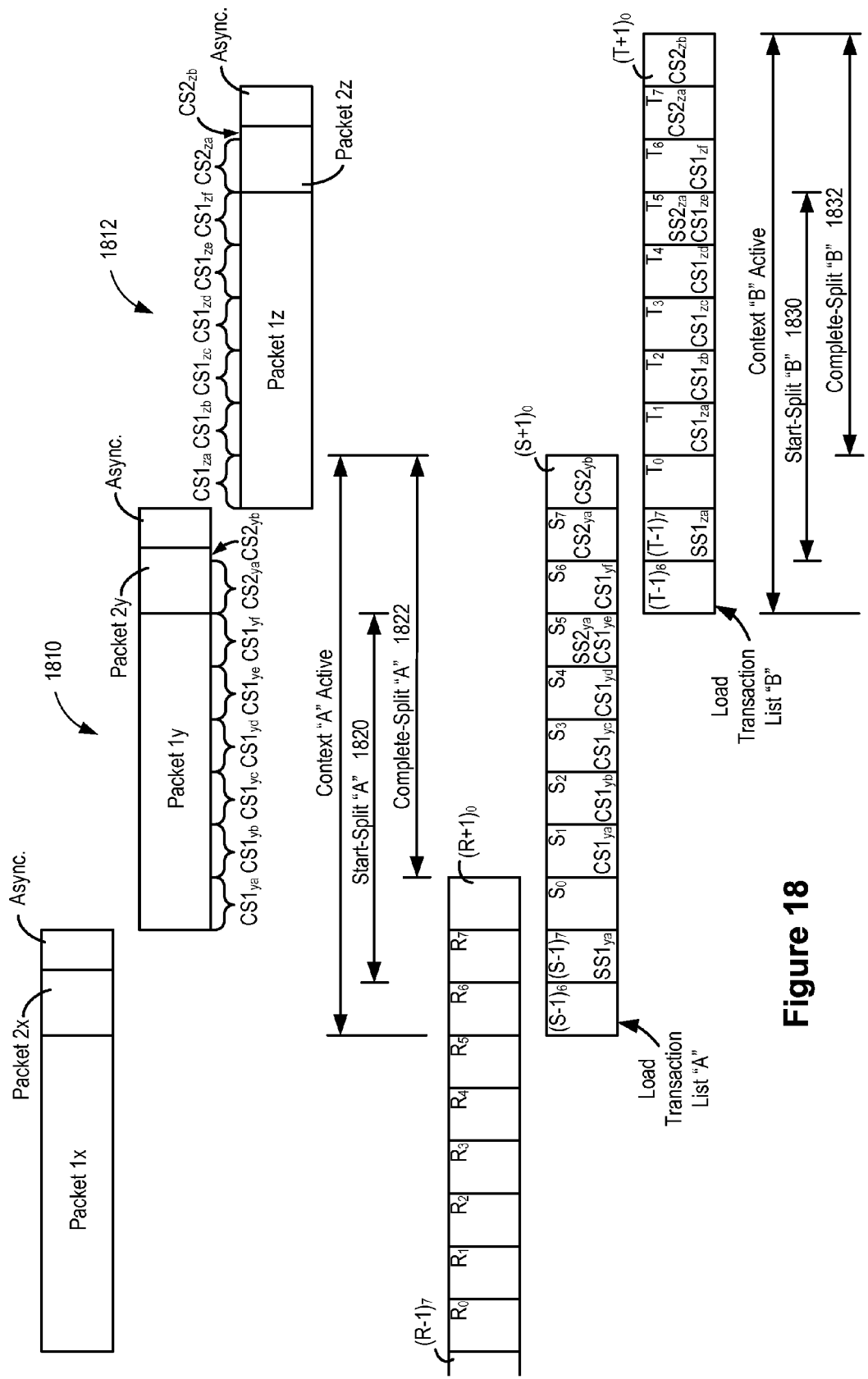
FIG. 18 is a diagram illustrating an overlap between packets executing a complete phase during a first interval and packets executing a start phase during the next sequential interval, according to one embodiment.

FIG. 18 is a diagram illustrating an overlap between packets executing a complete phase during a first interval and packets executing a start phase during the next sequential interval, according to one embodiment. FIG. 18 illustrates two frame intervals 1810 and 1812 that appear downstream from a hub. Packet 1$y$ and 1$z$ in the frame intervals 1810 and 1812 represent, for example, an isochronous video IN transaction that has a data payload of approximately 940 bytes. Packet 2$y$ and 2$z$ in the frame intervals 1810 and 1812 represent, for example, an interrupt IN transaction for a high-performance gaming keyboard or mouse. For purposes of this example, the isochronous and interrupt IN transactions have a request interval of every one-millisecond (e.g., the devices need to send data to the host during each one-millisecond frame interval). Upstream from the hub, the frame intervals 1810 and 1812 are divided into eight microframes or sub-frames. For example, the frame interval 1810 is divided into sub-frames or microframes $S_0$-$S_7$ and the frame interval 1812 is divided into sub-frames or microframes $T_0$-$T_7$.

As shown in FIG. 18, in microframe $(S-1)_6$, the primary scheduler 190 sends to the secondary scheduler 192 a transaction list for transactions to be executed during the frame interval 1810 (e.g., transaction list "A"). Likewise, in microframe $(T-1)_6$, the primary scheduler 190 sends to the secondary scheduler 192 a transaction list for transactions to be executed during the frame interval 1812 (e.g., transaction list "B"). According to one embodiment, the primary scheduler 190 sends the entire transaction list to the secondary scheduler 192 in the microframe $(S-1)_6$. According to other embodiments, the primary scheduler 190 sends the split packet requests for the transaction list one at a time (e.g., as the primary scheduler 190 determines what one-millisecond frame the split packet requests should be dispatched).

To account for the pipelined nature of the transaction translator within the hub, the secondary scheduler 192 executes a start-split transaction in the microframe before the target frame interval. For example, the secondary scheduler 192 dispatches a start-split transaction ($SS1_{ya}$) in microframe

TABLE 5

| μframe | $S_0$ | $S_1$ | $S_2$ | $S_3$ | $S_4$ | $S_5$ | $S_6$ | $S_7$ | $T_0$ | $T_1$ | $T_2$ | $T_3$ | $T_4$ | $T_5$ | $T_6$ | $T_7$ |
|---|---|---|---|---|---|---|---|---|---|---|---|---|---|---|---|---|
| Post to List "A" or "B"? | A | B | B | B | B | B | B | B | B | A | A | A | A | A | A | A |
| Valid μframe to Post? | N | Y | Y | Y | Y | Y | Y | N | N | Y | Y | Y | Y | Y | Y | N |
| First μframe for Posting? | N | Y | N | N | N | N | N | N | N | Y | N | N | N | N | N | N |
| Last μframe for Posting? | N | N | N | N | N | Y | Y | N | N | N | N | N | N | N | Y | N |
| Issue Start-Split from List "A" or "B"? | A | A | A | A | A | A | B | B | B | B | B | B | B | B | A | A |
| Valid μframe to Issue SS? | Y | Y | Y | Y | Y | Y | N | Y | Y | Y | Y | Y | Y | Y | N | Y |
| First μframe to Issue SS? | N | N | N | N | N | N | N | Y | N | N | N | N | N | N | N | Y |
| Last μframe to Issue SS? | N | N | N | N | N | Y | N | N | N | N | N | N | N | Y | N | N |
| Issue Complete-Split from List "A" or "B"? | B | A | A | A | A | A | A | A | A | B | B | B | B | B | B | B |
| Valid μframe to Issue CS? | Y | Y | Y | Y | Y | Y | Y | Y | Y | Y | Y | Y | Y | Y | Y | Y |
| First μframe to Issue CS? | N | Y | N | N | N | N | N | N | N | Y | N | N | N | N | N | N |
| Last μframe to Issue CS? | Y | N | N | N | N | N | N | N | Y | N | N | N | N | N | N | N | interval $(S-1)_7$, as shown in FIG. 18. Likewise, the secondary scheduler 192 dispatches a start-split transaction $(SS1_{za})$ in microframe interval $(T-1)_7$.

The hub starts receiving the data payload (e.g., packet 1y) from the device during microframe interval $S_0$, so the secondary scheduler 192 starts dispatching complete-split transactions during microframe interval $S_1$ and continues to send complete-split transactions through microframe interval $S_6$. In other words, the host controller receives chunks or portions of the packet 1y during each of microframe intervals $S_1$-$S_6$ (note the $CS1_{ya}$-$CS1_{yf}$ annotations to the frame interval 1810). Likewise, the hub starts receiving the data payload (e.g., packet 1z) from the device during microframe interval $T_0$, so the secondary scheduler 192 starts dispatching complete-split transactions during microframe interval $T_1$ and continues to send complete-split transactions through microframe interval $T_6$. In other words, the host controller receives chunks or portions of the packet 1z during each of microframe intervals $T_1$-$T_6$ (note the $CS1_{za}$-$CS1_{zf}$ annotations to the frame interval 1812).

As illustrated in FIG. 18, the secondary scheduler 192 waits to send a start-split transaction $(SS2_{ya})$ for the packet 2y until microframe interval $S_5$ and sends complete-split transactions for the packet 2y during microframe intervals $S_7$ and $(S+1)_0$. Likewise, the secondary scheduler 192 dispatches a start-split transaction $(SS2_{za})$ for the packet 2z in microframe interval $T_5$ and sends complete-split transactions for the packet 2z during microframe intervals $T_7$ and $(T+1)_0$.

Context "A" is active from microframe interval $(S-1)_6$ through $(S-1)_0$, or from when the transaction list "A" was loaded until the last complete-split transaction is dispatched (e.g., context "A" may be active from microframe interval $(S-1)_1$ if the transaction list is loaded in microframe interval $(S-1)_1$). The secondary scheduler 192 can dispatch start-split transactions from the transaction list "A" during the start-split "A" window 1820 and complete-split transactions from the transaction list "A" during the complete-split "A" window 1822. In other words, the transaction list "A" survives (e.g., transactions are dispatched from the transaction list) while context "A" is active. Likewise, as shown in FIG. 18, context "B" is active from microframe interval $(T-1)_6$ through $(T+1)_0$, or from when the transaction list "B" was loaded until the last complete-split transaction is dispatched. The secondary scheduler 192 can dispatch start-split transactions from the transaction list "B" during the start-split "B" window 1830 and complete-split transactions from the transaction list "B during the complete-split "B" window 1832. In other words, the transaction list "B" survives (e.g., transactions are dispatched from the transaction list) while context "B" is active.

From the point of view of the periodic execution engine that dispatches the start-split transactions, there is no overlap between the start-split window "A" 1820 and the start-split window "B" 1830 as the periodic execution engine alternates between transaction lists "A" and "B". Likewise, from the point of view of the completion engine that dispatches the complete-split transactions, there is no overlap between the complete-split window "A" 1822 and the complete-split window "B" 1832 as the completion engine alternates between transaction lists "A" and "B".

However, there is overlap when context "A" and context "B" are active (e.g., there is overlap between the complete-split "A" window 1822 and the start-split "B" window 1830). Using the "even" and "odd" transaction lists (e.g., transaction lists "A" and "B") allows the secondary scheduler to account for the overlap between when context "A" is active and when context "B" is active. In other words, by alternating between two transaction lists, each transaction list can continue to track the execution status of the split packet requests stored in the list. For example, with reference to transaction list "A", if the secondary scheduler 192 dispatches a start-split transaction in microframe $S_5$, the secondary scheduler 192 may still be issuing complete-split transactions corresponding to that start-split transaction in microframes $S_7$ and $(S+1)_0$. In other words, the transaction list "A" may still be tracking the status of complete-split transactions when start-split transactions are dispatched from transaction list "B". Because the transaction list "A" is still being used to track the execution status of transactions dispatched from that list, the primary scheduler 190 preferably does not delete or overwrite transaction list "A" and preferably does not wait until the complete-split transactions for the transaction list have finished executing. Instead, the primary scheduler 190 sends another transaction list (e.g., transaction list "B") to the secondary scheduler 192 so that start-split transactions can be dispatched from that transaction list beginning in microframe $(T-1)_7$ while the complete-split transactions from transaction list "A" finish executing in microframes $S_7$ and $(S+1)_0$.

Figure 19:
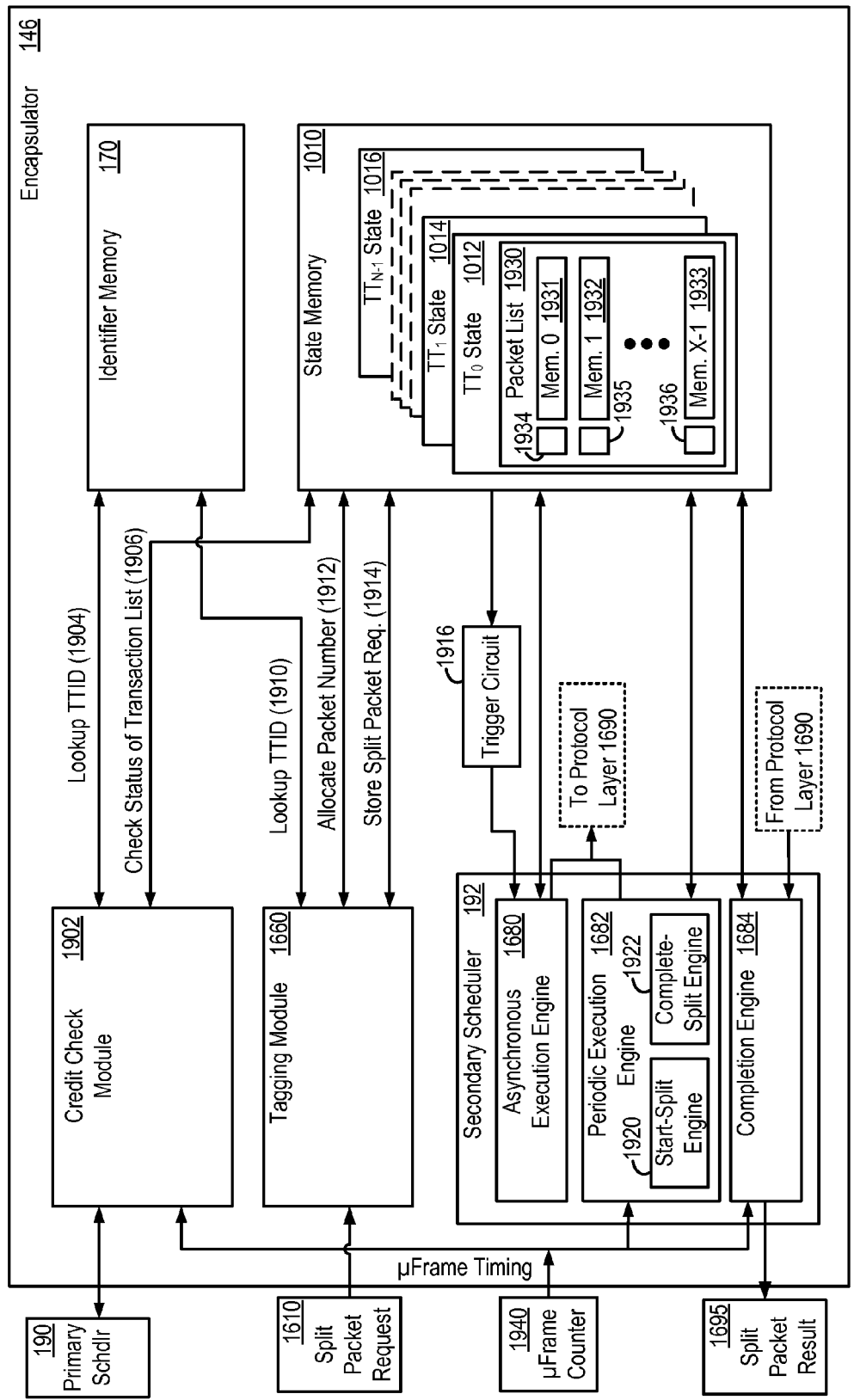
FIG. 19 is a block diagram illustrating additional details of the encapsulator of FIG. 16, according to one embodiment.

FIG. 19 is a block diagram illustrating additional details of the encapsulator 146 of FIG. 16, according to one embodiment. As described with reference to FIGS. 17 and 18, a transaction list is used to build a schedule of transactions to be dispatched in a particular frame interval (e.g., frame intervals 1710, 1715, and 1720 in FIG. 17). The primary scheduler 190 dynamically generates the transaction list before the target frame interval in which the transactions are to be executed by the secondary scheduler 192 (e.g., the transaction list is generated during the one-millisecond frame preceding the target frame). Before posting a split packet request to a transaction list, the primary scheduler 190 performs a credit check. The credit check verifies that there is at least one remaining entry available in the appropriate transaction list and that there is sufficient bandwidth remaining for the designated transaction translator instance.

As illustrated in FIG. 19, a credit check module 1902 is included in the encapsulator 146. Before posting a split packet request to a transaction list, the primary scheduler 190 issues a request to the credit check module 1902 to determine whether there is at least one available memory location in that transaction list. In response to receiving the request from the primary scheduler 190, the credit check module 1902 sends a lookup request (1904) to the identifier memory 170 to lookup a TTID that has been allocated to the transaction translator targeted by the split packet request (i.e., the split packet request to be posted to the transaction list). The lookup request (1904) may include the address of the hub that contains the transaction translator, the address of the port to which the target low-speed or full-speed device is connected, and a single or multiple transaction translator indicator (e.g., a multi-TT indicator). If a TTID is allocated to the transaction translator targeted by the split packet request, the identifier memory 170 returns that TTID. If, on the other hand, a TTID has not yet been allocated to the transaction translator targeted by the split packet request, the identifier memory 170 may return an indication that a TTID is not allocated to that transaction translator and the credit check module 1902 assumes that there is at least one remaining entry available in an appropriate transaction list (i.e., if a TTID is not allocated to a transaction translator, there should be no entries in the transaction list associated with that TTID). The identifier memory 170 may optionally allocate a TTID to the transaction translator if it is determined that a TTID has not yet been allocated.

After the identifier memory 170 returns the TTID, the credit check module 1902 accesses the state memory associated with the returned TTID and checks (1906) the status of the transaction list stored therein to determine whether there is at least one remaining entry available in the transaction list. For example, the credit check module 1902 may inspect the valid bits associated with the memory locations to determine whether there is at least one remaining entry available.

The credit check module 1902 also determines whether there is sufficient bandwidth remaining to execute the transaction with the transaction translator targeted by the split packet request. For example, the credit check module 1902 may compute the packet execution time (e.g., the amount of time required to move the transaction between the host controller and the device). After computing the packet execution time, the credit check module 1902 may determine whether there is sufficient bandwidth available to execute the transaction within the required packet execution time. Factors considered in computing the packet execution time include one or more of the bus duration for a token packet and handshake packet, the worst case bit stuff of the maximum data payload, the maximum inter-packet delay (e.g., the time between the end of a dispatched packet and the beginning of the next packet), and the transaction translator "think time" (e.g., the time the transaction translator needs to proceed to the next low-speed/full-speed transaction). Each packet in the transaction list contributes to the bandwidth and the new packet is checked to ensure it does not exceed a programmable maximum, such as 90% of any frame. By way of example, the packet execution time may be calculated as follows: packet execution time=token+data (e.g., worst case bit stuff)+handshake+2 maximum gaps (for isochronous, the last gap+handshake may be left out). The data execution time may be determined as follows: data execution time=1 byte sync+1 byte PID+7/6(X+2) bytes+2 bits EOP, where X is the maximum packet size, +2 bytes is 16-bit CRC, and 7/6 is the worst case bit stuff overhead. According to one embodiment, the procedural details for the bandwidth computation are consistent with the required packet execution time specified in the USB 2.0 specification.

If the credit check module 1902 determines that there is not at least one remaining entry available in the transaction list, there is not sufficient bandwidth remaining to execute the transaction with the transaction translator targeted by the split packet request, or both (i.e., the credit check fails), the primary scheduler 190 retries posting the split packet request at the next appropriate time (e.g., a subsequent millisecond frame). If, on the other hand, the credit check does not fail, the primary scheduler 190 is allowed to post the split packet request by, for example, sending a task processing request to the list processor 918 (FIG. 9), which accesses the transfer request block (TRB), for example, generates the split packet request, and hands the split packet request off to the DMA engine 920. The DMA engine 920 coordinates any necessary payload data movement and passes the split packet request along with any associated payload data to the encapsulator 146.

After the tagging module 1660 within the encapsulator 146 receives or accesses the split packet request 1610, the tagging module 1660 sends a request (1910) to the identifier memory 170 to lookup the TTID. After the identifier memory 170 returns the TTID, the tagging module 1660 accesses an appropriate state memory using the returned TTID (e.g., one of the TT state memories 1012 through 1016) and allocates (1912) a packet number to the split packet request 1610. For example, the tagging module 1660 may check an appropriate packet counter or search for the next available memory location in an appropriate packet list (e.g., one of the memory locations 1223 through 1227 in packet list 1222 of FIG. 12, for example). After the tagging module 1660 allocates a packet number to the split packet request 1610, the tagging module 1660 stores (1914) all or a portion of the split packet request 1610 in the appropriate memory location (e.g., one of the memory locations 1931 through 1933). In other words, after the tagging module 1660 receives the split packet request 1610 and allocates a TTID and packet number, the tagging module 1660 posts the split packet request 1610 to a list of transactions (e.g., transaction list 1930) to be executed by the secondary scheduler 192.

The encapsulator 146 illustrated in FIG. 19 includes the asynchronous execution engine 1680, periodic execution engine 1682, and completion engine 1684 in the secondary scheduler 192, which execute transactions included in the packet or transaction lists (e.g., transaction list 1930) stored in the state memory 1010. The periodic execution engine 1682 executes periodic transactions from the transaction lists during a predetermined time interval (e.g., an upcoming microframe). According to one embodiment, the periodic execution engine 1682 includes a start-split engine 1920 and a complete-split engine 1922. The start-split engine 1920 is configured to execute start-split transactions from the split packet requests stored in the transaction lists. For example, during the seventh microframe preceding the scheduled execution frame (e.g., $R_7$, $S_7$, and $U_7$ in FIG. 17), the start-split pointer (e.g., start-split pointers 1310, 1340, or 1370 in FIG. 13) is initialized to the beginning or top of the appropriate transaction list and the start-split engine 1920 begins executing start-split transactions. Additional details regarding executing start-split transactions are described with reference to FIGS. 20, 21A, 21B, and 21C. The complete-split engine 1922 is configured to execute complete-split transactions from the split packet requests stored in the transaction lists. For example, in the first microframe (e.g., $S_1$, $T_1$, and $U_1$ in FIG. 17), the complete-split pointer (e.g., complete-split pointers 1320, 1350, or 1380 in FIG. 13) is initialized to the beginning or top of the appropriate transaction list. Before the complete-split engine 1922 executes complete-split transactions from the transaction list, the complete-split engine 1922 verifies that the split packet request pointed to by the complete-split pointer is in the complete-split phase (e.g., by checking the start/complete state field in the split packet request) and verifies that the last start-split transaction corresponding to the complete-split transaction was executed a predetermined number of microframes (e.g., 2 microframes) beforehand. Additional details regarding executing complete-split transactions are described with reference to FIGS. 20 and 22. A microframe count from a microframe counter 1940 is provided to the periodic execution engine 1682 so that the start-split and complete-split engines 1920 and 1922 can execute start-split and complete-split transactions during appropriate microframe intervals. According to one embodiment, the microframe counter 1940 is configured to increment the microframe count after an oscillator running at 60 MHz increments a counter that produced a carry output after 7,500 clock cycles (e.g., at 125 microsecond intervals). The asynchronous execution engine 1680 is opportunistic. After a split packet request is posted to an asynchronous packet list in one of the state memories 1012 through 1016, the asynchronous execution engine 1680 receives a trigger from a trigger circuit 1916 and executes the asynchronous transaction. Additional details regarding executing asynchronous transactions are described with reference to FIG. 23.

The TT state memories 1012 through 1016 include valid flags or bits 1934 through 1936 that are associated with the memory locations 1931 through 1933. In other words, valid flag 1934 is associated with memory location 1931, valid flag 1935 is associated with memory location 1932, and valid flag 1936 is associated with memory location 1933. When the split packet request 1610 is stored in one of the memory locations 1931 through 1933, for example, the tagging module 1660 sets the valid flag associated with that memory location to indicate that a split packet request is stored in that memory location (e.g., the valid flag is set to a logical "1"). When the asynchronous and periodic execution engines 1680 and 1682 read the transaction lists in the state memories 1012 through 1016, the valid flags are examined to determine which memory locations contain valid transactions. Because the TTID and packet number form the address of the memory locations 1931 through 1933, the execution engines 1680 and 1682 transmit to the protocol layer 1690 the TTID and packet number along with the contents of a particular memory location. In other words, the TTID and packet number are known by virtue of accessing a particular memory location. Pairing the TTID and packet number with the contents of a particular memory location allows the return response to the completion engine 1684 to point directly to the related element in the transaction list memory and the valid bit (e.g., the completion engine 1684 does not need to perform a lookup).

After the protocol layer 1690 transmits a given transaction to the downstream hub and receives a response (e.g., an acknowledgement handshake) back from that hub, the protocol layer 1690 transmits to the completion engine 1684 the acknowledgment along with the TTID and packet number. Because the TTID and packet number were previously transmitted to the protocol layer 1690 from the execution engines 1680 and 1682, the protocol layer 1690 is able to send the correct TTID and packet number associated with the received acknowledgment. In other words, after transmitting a given transaction to a downstream hub, the protocol layer 1690 waits for a response from the hub. Because the protocol layer 1690 sends a request and waits for a response to that request (e.g., only one request is sent at a time), the response coming back from the hub is assumed to be from the last-sent request.

After receiving the response, TTID, and packet number, the completion engine 1684 can update state information in an appropriate state memory 1012 through 1016 to reflect the full or partial execution of the split packet request. For example, if an acknowledgement from a start-split transaction is received, the state information is updated to indicate that a complete-split transaction can be sent. By way of another example, if the protocol layer 1690 transmits a complete-split token along with an IN token to the downstream hub and receives a data packet back, the state memory (which is indexed by the TTID and packet number associated with the complete-split transaction) can be updated to indicate that the data packet was received.

Figure 20:
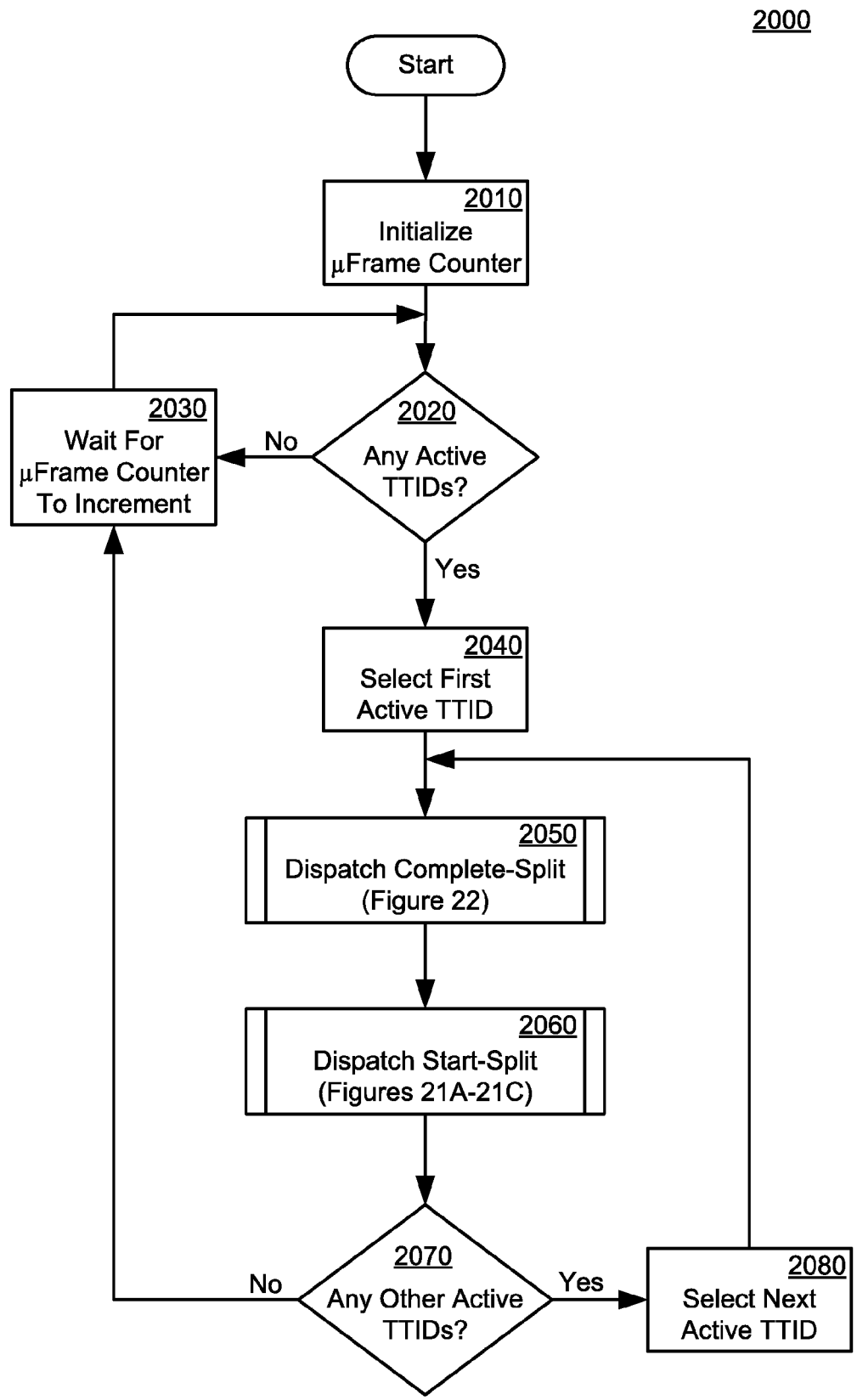
FIG. 20 is a flow chart of a method of executing periodic transactions from one or more transactions lists, according to one embodiment.

FIG. 20 is a flow chart of a method 2000 of executing periodic transactions from one or more transactions lists, according to one embodiment. After a split packet request is posted to a transaction list, a start/complete state bit (e.g., in the start/compete state field of the split packet request illustrated in Table 3 above) is initialized to the start state and an active bit (e.g., valid bits or flags 1224-1228, 1254-1258, and 1284-1288 in FIG. 12) is set indicating that the transaction list entry is occupied. According to a preferred embodiment, the secondary scheduler loops through each active identifier (e.g., TTID) every microframe (e.g., every 125 microseconds) and sends start-split transactions from the split packet requests (e.g., the header information in the split packet request that is used to form the start-split transactions) that are pointed to by the start-split pointer (e.g., start-split pointers 1310, 1340, or 1370 in FIG. 13). For example, during the first microframe (e.g., $R_7$, $S_7$, and $U_7$ in FIG. 17) of the start-split window (e.g., start-split windows 1762 and 1766 in FIG. 17), the start-split pointer for each identifier (e.g., TTID) is initialized to the first active split packet request in the associated transaction list and increments thereafter until all of the start-split transactions have been dispatched from the split packet requests in the transaction list. It may not be possible in the first microframe (e.g., $R_7$, $S_7$, and $U_7$) to send start-split transactions from every split packet request in the transaction list, so the start-split pointer may iterate through the transaction list as each of the start-split transactions are dispatched.

For outbound transactions (e.g., transactions destined for a device), the secondary scheduler 192 coordinates with the data movement engine (e.g., DMA 920 in FIG. 9) to fetch the necessary data payload, which is assembled with the start-split transaction. For example, the secondary scheduler 192 may post a request to the list processor 918 to resend the split packet request as described with reference to FIG. 16. After the list processor 918 (FIG. 9) gathers the data used to form the re-requested split packet request, the re-requested split packet request is passed to the encapsulator 146 via the outbound DMA engine, which pairs the re-requested split packet request up with the necessary data movement.

A bytes-in-progress counter (e.g., the rolling offset counter or bytes-in-progress counters 1230, 1260, and 1290 in FIG. 12) are maintained for each identifier (e.g., TTID) to help prevent overflow of the downstream transaction translator. In other words, secondary scheduler 192 may use the bytes-in-progress counter to throttle the rate at which the start-split transactions are dispatched in real time.

Referring now to FIG. 20, at step 2010 a microframe counter is initialized. For example, the microframe counter 1940 in FIG. 19 may be set or reset to zero. At step 2020, the method 2000 determines whether there are any active identifiers (e.g., TTIDs). For example, the identifier memory 170 may be checked to determine whether there are any identifiers allocated to downstream transaction translators. If there are no active identifiers (e.g., there are no periodic transactions to execute), the method 2000 proceeds to step 2030, where the method 2000 waits for the microframe counter to increment to the next microframe. After the microframe counter increments (e.g., during the next microframe), the method 2000 returns to step 2020 and again determines whether there are any active identifiers.

If it is determined that there is at least one active identifier at step 2020, the method 2000 proceeds to step 2040 and selects one of the active identifiers so that periodic transactions can be executed from a transaction list associated with the selected identifier. At step 2050, the complete-split engine 1922 in the secondary scheduler 192 (FIG. 19) executes or dispatches complete-split transactions from the transaction list associated with the selected identifier. Additional details of dispatching complete-split transactions are described with reference to FIG. 22.

At step 2060, the start-split engine 1920 in the secondary scheduler 192 executes or dispatches start-split transactions from the same transaction list for which complete-split transactions were executed or the opposite list in overlap situations (e.g., the complete-split and start-split engines are working from opposite lists during sub-frames $R_7$ and $S_0$, $S_7$ and $T_0$, and $T_7$ and $U_0$ in FIG. 17). The following is sample pseudo code that may be used to dispatch start-split transactions. © 2010 Fresco Logic, Inc. The process may be repeated for each identifier (e.g., TTID), every microframe (e.g., every 125 microseconds).

```
***************************************************************************
if (valid_start_split_window) {
    if (first_start_split_microframe) {
        start_pointer(TTID) = 0
        rolling_offset_counter(TTID) =  0
    } else {
        rolling_offset_counter(TTID) =  rolling_offset_counter(TTID) > 188 ?
                                        rolling_offset_counter(TTID) - 188 :
                                        0;
    }
    while (rolling_offset_counter(TTID) < 188) {
        // Packet length pointer (for INs - maximum expected)
        lenptr  = &packet_list[TTID][start_split_odd][start_pointer(TTID)].len
        // Packet length pointer already complete
        xlenptr = &packet_list[TTID][start_split_odd][start_pointer(TTID)].xlen
        // OUT Packets
        // Send start-split fragment or all if < 188 bytes
        if (packet_list[TTID][start_split_odd][start_pointer(TTID)].out) {
            if (*lenptr-*xlenptr > 188) {
                send_start_split_out188(
                    packet_list[TTID][start_split_odd][start_pointer(TTID)]);
                rolling_offset_counter(TTID)+= 188;
                *xlenptr += 188;
            } else {
                send_start_split_out_remainder(
                    packet_list[TTID][start_split_odd][start_pointer(TTID)]);
                rolling_offset_counter(TTID)+= (*lenptr-*xlenptr);
                *xlenptr = *lenptr;
                start_pointer(TTID)++;
            }
        // IN Packets
        // Send start-split entirety and increment rolling offset
        } else {
            send_start_split_in(
                packet_list[TTID][start_split_odd][start_pointer(TTID)]);
            rolling_offset_counter(TTID)+= (*lenptr);
            start_pointer(TTID)++;
        }
    }
}
***************************************************************************
```

The above pseudo code may be implemented by the start-split engine 1920 to dispatch start-split transactions and illustrates how the secondary scheduler 192 uses the rolling offset counter (e.g., bytes-in-progress counters 1230, 1260, and 1290 in FIG. 12) to throttle the rate at which the start-split transactions are dispatched in real time. Each time data is transmitted to a transaction translator, the data payload size is added to the rolling offset counter for the respective TTID. For each new microframe interval (e.g., 125 microsecond interval), the rolling offset counter is decremented by 188 bytes and whenever that counter is less than 188 bytes, additional split packet requests can be executed.

The pseudo code also demonstrates how inbound and outbound transactions are treated differently. For example, for inbound transactions (e.g., IN packets), the packet length referenced in the pseudo code (i.e., the "lenptr" variable) may be the maximum expected length whereas the packet length for outbound transactions (e.g., OUT packets) may be the actual data length to be sent. Moreover, for inbound transactions (e.g., IN packets), the entire start-split transaction is executed at once. For outbound transactions (e.g., OUT packets), if a packet exceeds 188 bytes in length (e.g., a USB 2.0 full-speed isochronous transaction), the data payload may be sent 188 bytes at a time until the entire data payload is transferred. The packet xlength variable (i.e., the "xlenptr" variable) in the pseudo code represents the number of bytes already transmitted for start-split OUT transactions and may be useful when the entire packet length exceeds 188 bytes and cannot be transmitted in a single microframe interval. The 188-byte threshold is derived from the USB 2.0 specification (e.g., 187.5 bytes is the maximum number of bytes that can be sent in a 125 microsecond period at the full-speed data rate with no bit stuffing and considering no PID, tokens, or gaps, which is rounded to 188 bytes). A hub incorporating transaction translators having a buffer size as specified by the USB 2.0 specification (e.g., a start-split buffer sized to accommodate four data packets plus sixteen low-speed or full-speed tokens for four microframes and a complete-split buffer sized to accommodate two data packets plus sixteen low-speed or full-speed tokens for two microframes) should have sufficient FIFO depth so that the above pseudo code and transaction list storage limits (e.g., 15 or 16 entries) do not exceed the buffer capacity of transaction translator. According to other embodiments, the threshold may be greater or less than 188 bytes (e.g., if the buffer has more or less storage capacity).

It should be noted that for clarity and conciseness, some details are left out of the above pseudo code, such as checking for valid entries in the odd/even transaction lists and not exceeding the bound of the list. In addition, details such as changing packet state from start to complete (e.g., updating the start/compete state field in the split packet request) and updating the S/E fields in split packet request (e.g., the S-bit and EU-bit fields of the split packet request illustrated in Table 3 above) are not illustrated.

Additional details of dispatching start-split transactions are described with reference to FIGS. 21A, 21B, and 21C.

Referring again to FIG. 20, complete-split transactions are dispatched from the transaction list before start-split transactions are dispatched. Other embodiments may dispatch start-split transactions before complete-split transactions or dispatch start-split and complete-split transactions in parallel (e.g., at the same time). Dispatching complete-split transactions before start-split transactions allows the buffer within the hub (e.g., the complete-split buffer 245 in FIG. 2) to be drained before it is filled with new data. Referring to FIGS. 17 and 18, if current microframe is the seventh microframe (e.g., $S_7$), the complete-split engine 1922 may still be executing complete-split transactions from transaction list "A" while the start-split engine 1920 begins executing start-split transactions from transaction list "B".

After the complete-split and start-split transactions have been dispatched from the transaction list associated with the selected identifier, the method 2000 determines whether there are any other active identifiers at step 2070. For example, the identifier memory 170 may be checked to determine whether there are any other identifiers allocated to downstream transaction translators. If there are no other active identifiers (e.g., there are no other periodic transactions to dispatch to other transaction translators), the method 2000 proceeds to step 2030, where the method 2000 waits for the microframe counter to increment to the next microframe. After the microframe counter increments (e.g., during the next microframe), the method 2000 returns to step 2020 and again determines whether there are any active identifiers.

If it is determined that there is at least one other active identifier at step 2070, the method 2000 proceeds to step 2080 and selects another one of the active identifiers (e.g., the next sequential active identifier) so that periodic transactions can be executed from a transaction list associated with the next selected identifier. After the next identifier is selected, the method dispatches complete-split and start-split transactions at steps 2050 and 2060.

Figure 21A:
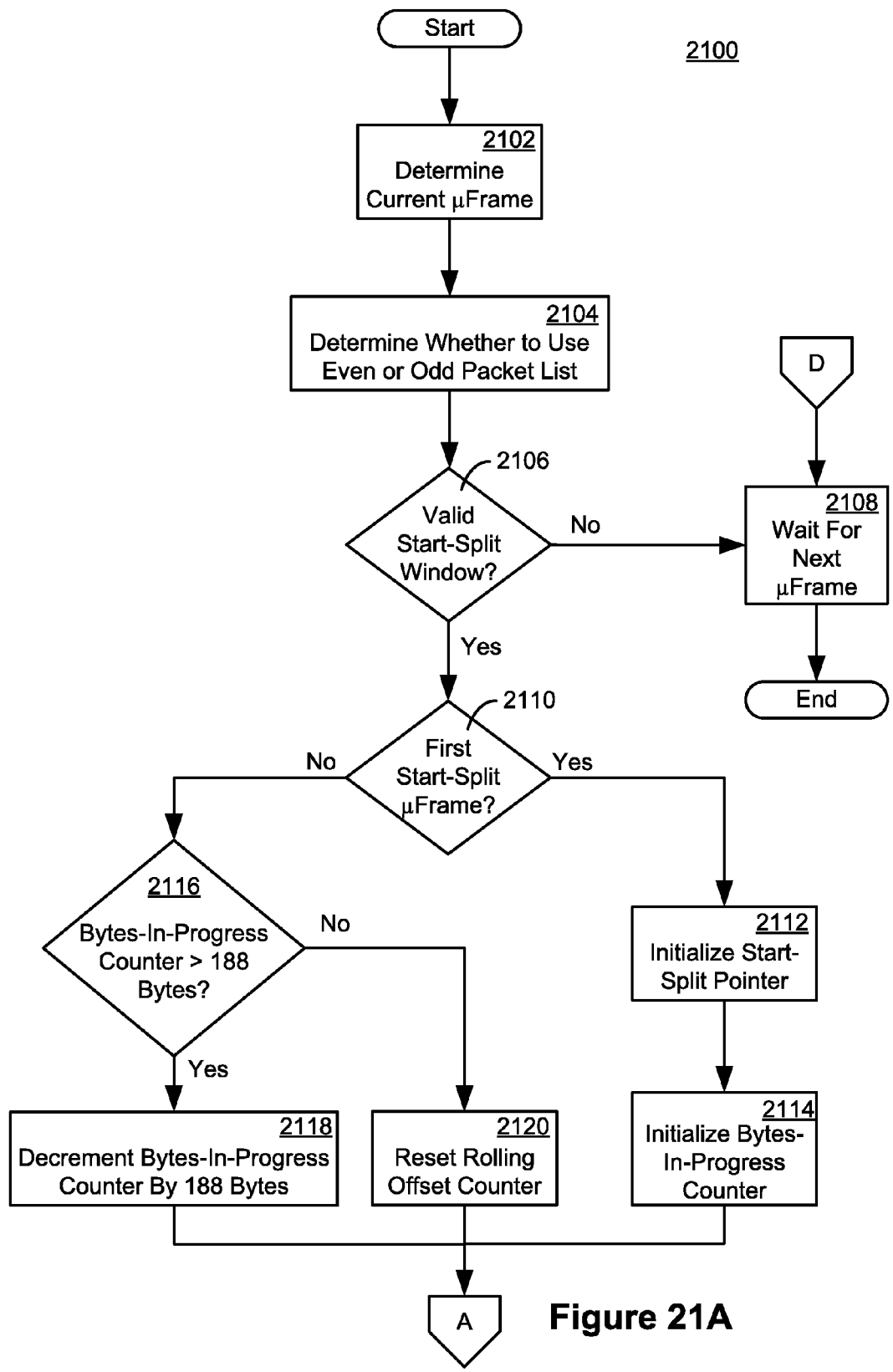
FIGS. 21A-21C are flow charts of a method of dispatching start-split transactions, according to one embodiment.
Figure 21B:
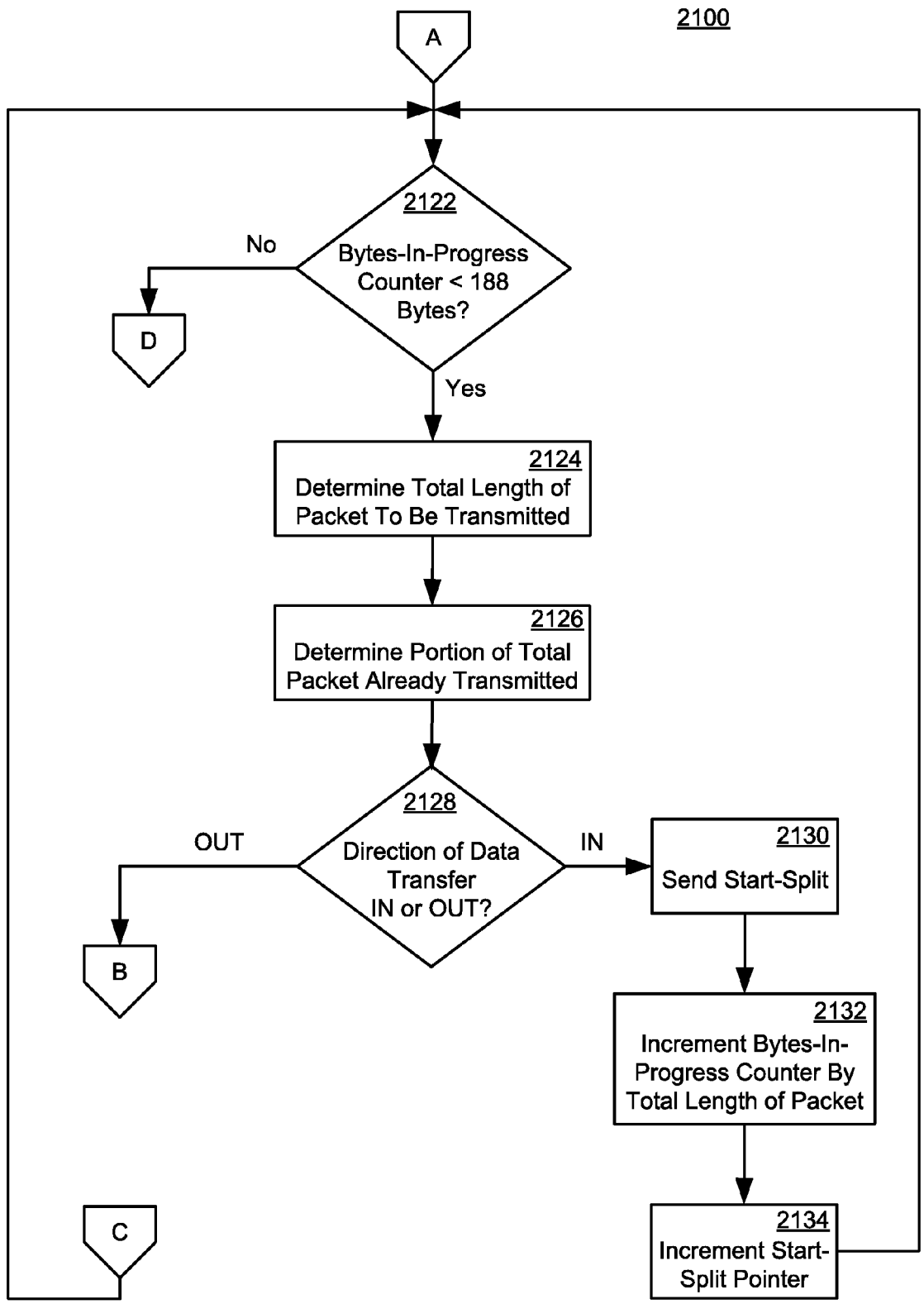
Figure 21C:
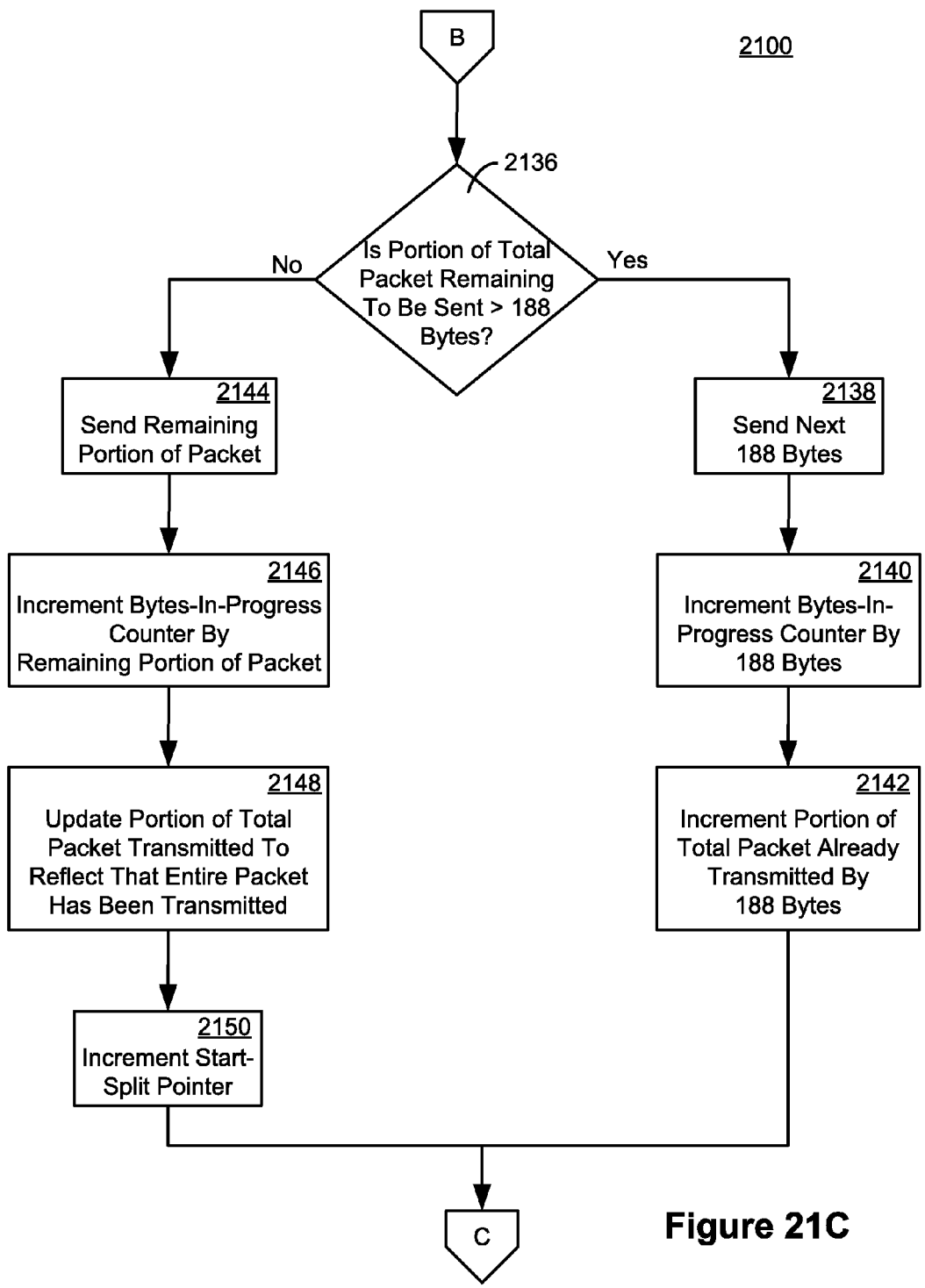

FIGS. 21A-21C are flow charts of a method 2100 of dispatching start-split transactions, which is implemented by the start-split engine 1920 (FIG. 19) according to one embodiment. At step 2102, the start-split engine determines the current microframe, such as by reading the microframe counter 1940 (FIG. 19). At step 2104, the start-split engine determines which of the two transaction lists to use (e.g., the even or odd transaction lists or the "A" or "B" transaction lists that are stored in the state memory associated with the TTID selected at step 2040 in FIG. 20). For example, the start-split engine may decode the lowest four bits of a microframe counter value (see Table 5, above) or may inspect bit 3 (see Table 4, above) of the current value of the microframe counter 1940 to see whether that bit is even or odd. Steps 2102 and 2104 may be performed in any order or in parallel (e.g., at the same time).

At step 2106, the start-split engine determines whether the current microframe is a valid start-split window. For example, as described with reference to FIGS. 17 and 18, the start-split engine may execute or dispatch start-split transactions from a transaction list during the start-split execution window (e.g., between the 7th microframe preceding the scheduled execution frame and the 5th microframe of the scheduled execution frame, such as between $R_7$ and $S_5$ and between $S_7$ and $T_5$). If it is determined that the current microframe is not a valid start-split window (e.g., the 6th microframe, such as $R_6$, $S_6$, and $T_6$), the method 2100 proceeds to step 2108 and the start-split engine waits for the next microframe interval before attempting to dispatch any start-split transactions. If, on the other hand, it is determined that the current microframe is a valid start-split window, the method 2100 proceeds to step 2110.

The start-split engine determines, at step 2110, whether the current microframe is the first start-split microframe. For example, the start-split engine may decode the lowest four bits of a microframe counter value (see Table 5, above) or may inspect lowest three bits (see Table 4, above) of the current value of the microframe counter 1940 to see whether the current microframe is the 7th microframe preceding the scheduled execution frame (e.g., $R_7$ or $S_7$ in FIGS. 17 and 18). If it is determined that the current microframe is the first start-split microframe, the start-split engine initializes the start-split pointer at step 2112 and initializes the bytes-in-progress counter or rolling offset counter at step 2114. For example, the start-split pointer (e.g., start-split pointers 1310, 1340, or 1370 in FIG. 13) for the appropriate transaction list (e.g., the even or odd transaction list) is initialized to the beginning or top of the list and the bytes-in-progress counter may be set to zero. If, on the other hand, it is determined that the current microframe is not the first start-split microframe, the start-split engine determines whether the bytes-in-progress counter is greater than a predetermined threshold, such as 188 bytes, at step 2116.

If the bytes-in-progress counter is greater than the predetermined threshold, the bytes-in-progress counter is decremented by a predetermined decrement, such as 188 bytes, at step 2118. The bytes-in-progress counter is decremented by the predetermined decrement at step 2118 because the buffers within the transaction translator corresponding to the selected TTID (step 2040 in FIG. 20) have had a chance to drain (e.g., drain 188 bytes) and can start to be filled again. In other words, if it is not the first start-split microframe, one or more start-split transactions have already been executed (e.g., the method 2100 is on the second or higher iteration). If, on the other hand, the bytes-in-progress counter is less than or equal to the predetermined threshold, the bytes-in-progress counter is reset or set to zero at step 2120.

Referring now to FIG. 21B, after steps 2114, 2118 or 2120, the method 2100 enters a while loop in which a number of steps are iteratively performed while the bytes-in-progress counter is less than a predetermined threshold. At step 2122, the start-split engine determines whether the bytes-in-progress counter is less than a predetermined threshold, such as 188 bytes. If the bytes-in-progress counter is greater than or equal to the predetermined threshold, the method proceeds to step 2108 (FIG. 21A) and the start-split engine waits for the next microframe until dispatching any more start-split transactions (e.g., the start-split engine waits until the bytes-in-progress counter falls below the predetermined threshold so that the buffers within the transaction translator associated with the selected TTID do not overflow). If, on the other hand, the bytes-in-progress counter is less than the predetermined threshold, the method proceeds to steps 2124 and 2126 and the start-split engine computes one or more variables.

At step 2124, the start-split engine determines or examines the total length of the packet (e.g., data payload) to be transmitted for the transaction (e.g., split packet request) in the determined even or odd packet list (step 2104 in FIG. 21A) identified by the start-split pointer. For example, the start-split engine may read the length of the packet. At step 2126, the start-split engine determines or examines, for the transaction in the determined even or odd packet list identified by the start-split pointer, the portion of the total packet (e.g., data payload) that has already been transmitted. For example, the start-split engine may read the length of the packet that has already been executed.

After the start-split engine computes the variables at steps 2124 and 2126, the start-split engine determines the direction of the data transfer at step 2128. For example, the start-split engine may check the endpoint direction field in the split packet request pointed to by the start-split pointer to determine whether the transaction is inbound (e.g., an IN packet)

or outbound (e.g., an OUT packet). If the transaction is an inbound transaction, the start-split engine executes or dispatches a start-split transaction corresponding to the split packet request at step 2130. At step 2132, the start-split engine increments the bytes-in-progress counter by the length of the packet (e.g., the data payload). According to a preferred embodiment, the bytes-in-progress counter is incremented by the maximum expected data payload. If the data payload is relatively large (e.g., 900 bytes), further start-split transactions may not be sent for several microframes (e.g., it may take several microframes to decrement the counter (e.g., steps 2118 or 2120 in FIG. 21A) so that the counter falls below the predetermined threshold (e.g., step 2122 in FIG. 21B).

Tracking, via the bytes-in-progress counter, the amount of data associated with an inbound transaction may help ensure that the buffer(s) within the downstream hub (e.g., the buffer 245 in FIG. 2) does not overflow. For example, if an outbound transaction follows an inbound transaction, the transaction translator may be busy for a time when the inbound transaction is in progress. In other words, if the maximum expected data payload is not added to the bytes-in-progress counter, the buffer(s) within the hub might overflow because the inbound transaction may still be stuck in its queue. Tracking, via the bytes-in-progress counter, the amount of data associated with an inbound transaction may also help ensure that the hub does not drop or purge the inbound data if the data is not retrieved within a certain number of microframes. For example, the hub may be configured to automatically purge any data if the data is not executed within four microframes. According to other embodiments, the step 2132 is omitted (e.g., the start-split engine does not increment the bytes-in-progress counter by the length of the packet).

At step 2134, the start-split pointer is incremented to point to the next entry in the transaction list. After steps 2130, 2132, and 2134, the method 2100 returns to step 2122 and the start-split engine again determines whether the bytes-in-progress counter is less than a predetermined threshold. If so, additional start-split transactions may be executed during the current microframe. Steps 2130, 2132, and 2134 may be performed in any order or in parallel (e.g., at the same time).

Referring now to FIG. 21C, if the transaction is an outbound transaction, the start-split engine determines, at step 2136, whether the portion of the packet that still needs to be sent is greater than a predetermined threshold (e.g., whether the length minus what has already been sent is greater than the predetermined threshold), such as 188 bytes. If so, the start-split engine executes or dispatches at step 2138 a start-split transaction corresponding to the split packet request along with a data payload that is approximately equal to the predetermined threshold (e.g., 188 bytes). At step 2140, the start-split engine increments the bytes-in-progress counter by the predetermined threshold (e.g., 188 bytes) and, at step 2142, the start-split engine increments the portion of the total packet already transmitted (e.g., the variable determined at step 2126) by the predetermined threshold (e.g., 188 bytes). It should be noted that the start-split pointer is not incremented if it is determined at step 2136 that the portion of the packet that still needs to be sent is greater than the predetermined threshold (e.g., 188 bytes) because there is additional payload data remaining to be sent. After steps 2138, 2140, and 2142, the method 2100 returns to step 2122 (FIG. 21B) and the start-split engine again determines whether the bytes-in-progress counter is less than a predetermined threshold. If not, the start-split engine waits until the next microframe before dispatching additional start-split transactions. Steps 2138, 2140, and 2142 may be performed in any order or in parallel (e.g., at the same time).

If the start-split engine determines, at step 2136, that the portion of the packet that still needs to be sent is less than or equal to the predetermined threshold (e.g., 188 bytes), the start-split engine executes or dispatches at step 2144 a start-split transaction corresponding to the split packet request along with a data payload that is approximately equal to the remaining portion of the payload to be sent (e.g., <188 bytes). At step 2146, the start-split engine increments the bytes-in-progress counter by the amount of payload data sent at step 2144 and, at step 2148, the start-split engine updates the portion of the total packet already transmitted (e.g., the variable determined at step 2126) to reflect that the entire payload packet has been transmitted. At step 2150, the start-split pointer is incremented to point to the next entry in the transaction list. After steps 2144, 2146, 2148, and 2150, the method 2100 returns to step 2122 (FIG. 21B) and the start-split engine again determines whether the bytes-in-progress counter is less than a predetermined threshold. If so, additional start-split transactions may be executed during the current microframe. Steps 2144, 2146, 2148, and 2150 may be performed in any order or in parallel (e.g., at the same time).

Figure 22:
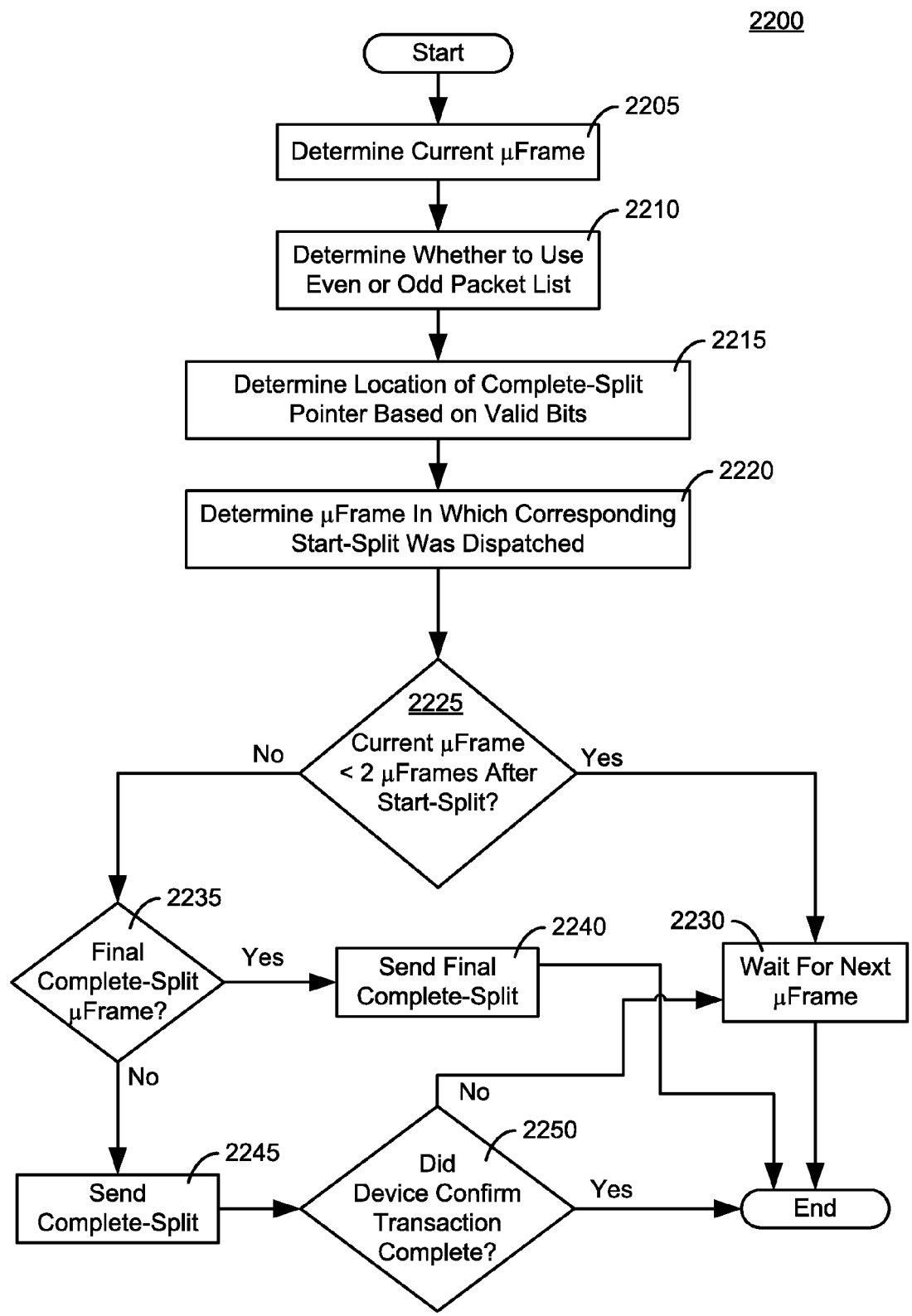
FIG. 22 is a flow chart of a method of dispatching complete-split transactions, according to one embodiment.

FIG. 22 is a flow chart of a method 2200 of dispatching complete-split transactions, which is implemented by the complete-split engine 1922 (FIG. 19) according to one embodiment. At step 2205, the complete-split engine determines the current microframe, such as by reading the microframe counter 1940 (FIG. 19). At step 2210, the complete-split engine determines which of the two transaction lists to use (e.g., the even or odd transaction lists or the "A" or "B" transaction lists that are stored in the state memory associated with the TTID selected at step 2040 in FIG. 20). For example, the complete-split engine may decode the lowest four bits of a microframe counter value (see Table 5, above) or may inspect bit 3 (see Table 4, above) of the current value of the microframe counter 1940 to see whether that bit is even or odd. Steps 2205 and 2210 may be performed in any order or in parallel (e.g., at the same time).

At step 2215, the complete-split engine determines the location of the complete-split pointer associated with the transaction list based on the valid bits associated with the valid bits associated with the entries in the transaction list (e.g., valid bits or flags 1224-1228, 1254-1258, and 1284-1288 in FIG. 12 that indicate that the transaction list entry is occupied). Complete-split transactions do not need to finish in order (e.g., if a packet in the middle of the list has an error and keeps issuing NYET handshakes, for example, the complete-split engine can go forward to the next complete-split transactions, which might be able to complete successfully). For the transaction (e.g., split packet request) in the determined even or odd packet list (step 2210) identified by the complete-split pointer, the complete-split engine determines, at step 2220, the microframe in which a corresponding start-split transaction was dispatched. For example, the complete-split engine may examine a time stamp field or marker in the split packet request stored in the transaction list that indicates when the final start-split transaction has been executed by the start split engine.

At step 2225, the complete-split engine determines whether the current microframe is less than two microframes after the corresponding start-split transaction was dispatched. If so, the method 2200 proceeds to step 2230 and the complete-split engine waits for the next microframe interval. In other words, the complete-split transaction begins two microframe periods after the associated start-split transaction is done. If, on the other hand, the complete-split engine determines that the current microframe is at least two microframes after the corresponding start-split transaction was dispatched, the methods 2200 proceeds to step 2235 and the complete-split engine determines whether the current microframe is the final complete-split microframe. For example, the complete-split engine may decode the lowest four bits of a microframe counter value (see Table 5, above) or may inspect lowest three bits (see Table 4, above) of the current value of the microframe counter 1940 to see whether the current microframe is the 1st microframe in the subsequent millisecond frame (e.g., $S_0$, $T_0$, or $U_0$ in FIGS. 17 and 18). According to one embodiment, for interrupt transactions, no more than three intervals a complete-split transaction shall be executed.

If it is determined that the current microframe is the final complete-split microframe, the method 2200 proceeds to step 2240 and the complete-split engine executes or dispatches the final complete-split transaction. If, on the other hand, it is determined that the current microframe is not the final complete-split microframe, the method 2200 proceeds to step 2245 and the complete-split engine executes or dispatches a complete-split transaction for the split packet request pointed to by the complete-split pointer. After sending the complete-split transaction, the complete-split engine determines at step 2250 whether the target device confirmed that the transaction is complete (e.g., the complete-split engine receives the last of indication from the target device). If not, the methods 2200 proceeds to step 2230 and the complete-split engine waits for the next microframe interval before issuing another complete-split transaction for the split packet request pointed to by the complete-split pointer. If the complete-split engine determines at step 2250 that the target device confirmed that the transaction is complete, the method 2200 ends. According to one embodiment, if device does not indicate that a transaction is complete after sending the final transaction, appropriate error handling is employed.

Figure 23:
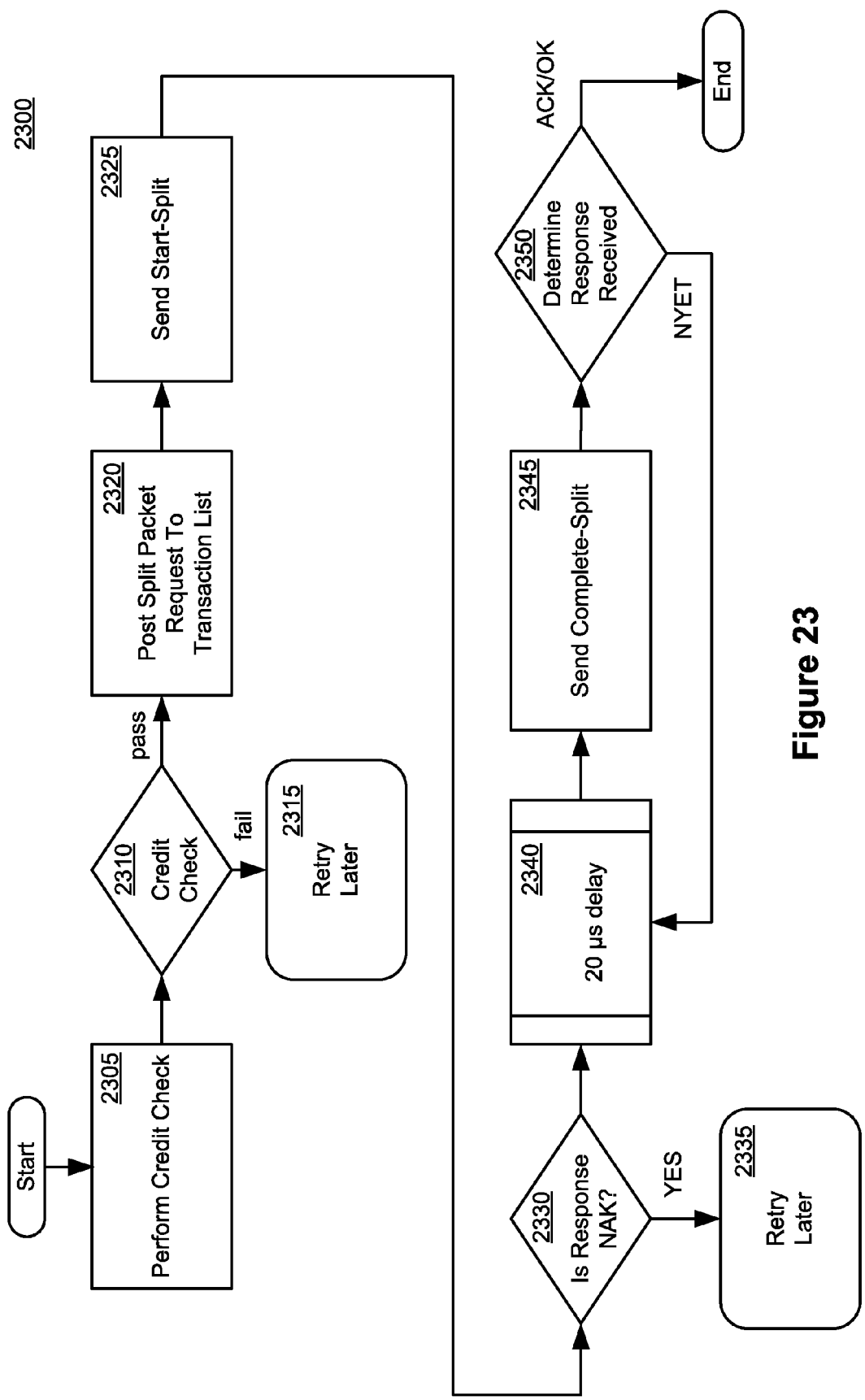
FIG. 23 is a flow chart of a method of executing non-periodic transactions, according to one embodiment.

FIG. 23 is a flow chart of a method 2300 of executing non-periodic transactions, according to one embodiment. Before posting a split packet request to a transaction list, the primary scheduler 190 performs or requests a credit check at step 2305 to verify that there is at least one remaining entry available in the appropriate transaction list and that there is sufficient bandwidth remaining for the designated transaction translator instance. For outbound transactions (e.g., OUT packets), the primary scheduler 190 may also determine whether there is sufficient packet space available in appropriate port buffer (e.g., buffer 976 in FIG. 9) using a credit counter. For example, the primary scheduler 190 may send a request to the credit check module 1902 in the encapsulator 146, which is described in more detail with respect to FIG. 19. At step 2310, the primary scheduler 190 determines whether the credit check passed or failed. If the credit check fails, the method 2300 proceeds to step 2315 and the primary scheduler 190 retries to post the split packet request relating to the non-periodic transaction at a later time.

If the credit check passes, the method 2300 proceeds to step 2320 and the primary scheduler 190 posts the split packet request to an appropriate asynchronous transaction list by, for example, sending a task processing request to the list processor 918 (FIG. 9), which accesses the transfer request block (TRB), for example, generates the split packet request, and hands the split packet request off to the DMA engine 920. The DMA engine 920 coordinates any necessary payload data movement and passes the split packet request along with any associated payload data to the encapsulator 146. After the split packet request is posted to the appropriate asynchronous transaction list (e.g., a transaction list associated with the TTID allocated to the target transaction translator), an asynchronous execution engine within the secondary scheduler 192 (e.g., engine 1680 in FIGS. 16 and 19) receives a trigger from a trigger circuit and executes or dispatches a start-split transaction corresponding to the split packet request at step 2325.

At step 2330, a completion engine within the secondary scheduler 192 (e.g., engine 1684 in FIGS. 16 and 19) receives a response from the hub corresponding to the start-split transaction and determines whether the response is a negative acknowledgment (e.g., a NAK packet). If the response is a negative acknowledgement, the method 2300 proceeds to step 2335 and the primary scheduler 190 executes the same start-split transaction again at another time (e.g., a NAK packet indicates that the hub cannot handle the packet so the primary scheduler retries sending the transaction at another time and, in the interim, the transaction list entry is free for reuse by another endpoint). If, on the other hand, the response is a positive acknowledgement (e.g., an ACK packet) and/or payload data (e.g., if the start-split transaction was an IN transaction), the method 2300 proceeds to step 2340 and waits for a predetermined amount of time (e.g., 20 microseconds) before proceeding to step 2345. According to one embodiment, the predetermined amount of time is configurable (e.g., the host controller 140 and/or the OS or drivers running on the host 120 adjust the amount of delay).

At step 2345, the asynchronous execution engine executes or dispatches a complete-split transaction corresponding to the start-split transaction (sent at step 2325). After sending the complete-split transaction, the asynchronous execution engine determines at step 2350 what type of response was received from the hub. If the response is a NYET handshake, which may be returned by the hub in response to a split transaction when the low-speed or full-speed transaction has not yet been completed, the method 2300 proceeds to step 2340 and waits for a predetermined amount of time before executing or dispatching another complete-split transaction corresponding to the start-split transaction (step 2325). If, on the other hand, the response is an acknowledgement other than a NYET handshake, the method 2300 ends (e.g., an ACK packet, NAK packet, or any response other than a NYET packet completes the secondary scheduler's responsibility and frees the transaction list entry). For clarity and conciseness, not all of the responses are shown after the start-split and complete-split transactions. The method 2300 may be used by the secondary scheduler 192 for each non-periodic transaction.

Embodiments may be provided as a computer program product including a nontransitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

The terms and descriptions used above are set forth by way of illustration only and are not meant as limitations. Those skilled in the art will recognize that many variations can be made to the details of the above-described embodiments without departing from the underlying principles of the invention. The scope of the invention should therefore be determined only by the following claims and their equivalents.

The invention claimed is:

1. A host controller for controlling transactions in a multi-speed Universal Serial Bus (USB) environment comprising a first bus having a first data transfer rate, a second bus having a second data transfer rate different from the first data transfer rate, and multiple transaction translators configured to translate a first transaction transferred over the first bus at the first data transfer rate to a second transaction transferred over the second bus at the second data transfer rate, the host controller comprising:
   memory configured to store for each of different ones of the multiple transaction translators:
      an identifier;
      transaction translator capacity information indicating whether there is available capacity to translate a transaction; and
      a transaction list configured to store a plurality of requests to generate a split packet transaction and state information regarding execution status of the plurality of requests; and
   a scheduler configured to examine transaction lists and transaction translator capacity information for the different ones of the multiple transaction translators, execute in a predetermined period for one or more of the transaction lists a number of split packet transactions from the stored plurality of requests to generate a split packet transaction so that the split packet transactions included in the number have a capacity within the transaction translator capacity information, and to update the transaction translator capacity information based on state information and the capacity of the number of split packet transactions.

2. The host controller of claim 1, wherein a stored transaction list comprises two transaction lists, and the scheduler is further configured to select one of the two transaction lists from which to execute the number of split packet transactions.

3. The host controller of claim 2, wherein the scheduler is further configured to alternate between the two transaction lists such that one of the two transaction lists stores execution status of split packet transactions while the scheduler executes the number of split packet transactions from the other one of the two transaction lists.

4. The host controller of claim 1, wherein the memory is configured to store for the different ones of the multiple transaction translators first and second transaction lists that are active during respective first and second time periods, the scheduler is configured to execute the number of split packet transactions from an active one of the first or second transaction lists during the respective first or second time periods, and the scheduler is configured to alternate between the first and second transaction lists during the respective first and second time periods as time progresses so that the scheduler executes split packet transactions from one of the first or second transaction lists while requests to generate split packet transactions are stored to the other one of the first or second transaction lists.

5. The host controller of claim 1, wherein, for requests to generate split packet transactions involving a transfer of a data payload from a root hub to a device, the state information regarding the execution status of the plurality of requests comprises an amount of payload data previously transmitted to a downstream hub coupled to the device.

6. The host controller of claim 1, wherein the state information comprises an indication of whether a corresponding split packet transaction is in a start phase or a complete phase.

7. The host controller of claim 1, wherein, after the scheduler executes a split packet transaction, the scheduler is configured to update the state information associated with the split packet transaction with a time-stamp indication of when the split packet transaction was executed.

8. The host controller of claim 1, wherein the memory is configured to store for the different ones of the multiple transaction translators start-split and complete-split pointers, the start-split pointer is configured to store a value referring to a next one of a split packet transaction for which a start-split token should be executed, and the complete-split pointer is configured to store a value referring to a next one of a split packet transaction for which a complete-split token should be executed.

9. The host controller of claim 8, wherein the memory is configured to store for the different ones of the multiple transaction translators two transaction lists and the start-split and complete-split pointers are shared by the two transaction lists.

10. The host controller of claim 8, wherein the memory is configured to store for the different ones of the multiple transaction translators two transaction lists and two sets of start-split and complete-split pointers, and one of the two sets of points is associated with one of the two transaction lists and the other one of the two sets of points is associated with the other one of the two transaction lists.

11. The host controller of claim 1, wherein the scheduler comprises a periodic scheduler.

12. The host controller of claim 1, wherein the scheduler includes a start-split execution engine configured to execute start-split transactions for a split packet transaction.

13. The host controller of claim 1, wherein the scheduler includes a complete-split execution engine configured to execute complete-split transactions for a split packet transaction.

14. The host controller of claim 1, wherein before the complete-split execution engine executes a complete-split transaction, the complete-split execution engine is configured to verify that (1) a start/complete state field associated with the split packet transaction indicates the transaction is in a complete phase and (2) a time-stamp field associated with the split packet request transaction indicates that a corresponding start-split transaction was executed at least two sub-frame intervals before the complete-split transaction.

15. The host controller of claim 1, wherein the first bus has a sub-frame rate that is eight times faster than an interval-frame rate of the second bus.

16. The host controller of claim 1, wherein the first data transfer rate corresponds to a USB high-speed data transfer rate of approximately 480 megabits per second, and the second data transfer rate corresponds to a USB full-speed data transfer rate of approximately 12 megabits per second.

17. The host controller of claim 1, wherein the first data transfer rate corresponds to a USB high-speed data transfer rate of approximately 480 megabits per second, and the second data transfer rate corresponds to a USB low-speed data transfer rate of approximately 1.5 megabits per second.

18. In a multi-speed Universal Serial Bus (USB) environment including multiple transaction translators, a method of executing transactions from a multiple transaction lists stored in a host controller memory configured to store for each of different ones of the multiple transaction translators (1) transaction translator capacity information indicating whether an associated one of the multiple transaction translators has available capacity to translate a transaction, (2) a transaction list including a plurality of packet headers to be executed and associated state information, and (3) one or more pointers associated with the transaction list, the individual pointers pointing to a next one of the packet headers to be executed in the transaction list, the method comprising:

selecting one of the multiple transaction lists from which to execute transactions during a sub-frame interval;

determining whether the transaction translator capacity information has a value that is less than a predetermined threshold;

while the value is less than the predetermined threshold, iteratively performing steps comprising:
 (a) executing a transaction from the packet header identified by the pointer associated with the selected transaction list, the transaction having associated therewith a data payload that is transmitted at least in part to or from an associated multiple transaction translator;
 (b) updating the value according to an amount of payload data transmitted to or from the transaction translator associated with the selected one of the multiple transaction lists; and
 (c) if the transaction is fully executed, adjusting the pointer to another packet header in the selected transaction list; and if the value is greater than or equal to the predetermined threshold, updating, during a subsequent sub-frame interval, the value according to a predetermined amount.

19. The method of claim 18, wherein steps (a), (b), and (c) are performed simultaneously.

20. The method of claim 18, wherein step (a) is performed before steps (b) and (c).

21. The method of claim 18, wherein a transaction list comprises first and second transaction lists, the first and second transaction lists being configured to track, during respective time periods that overlap with each other, state information regarding an execution status of transactions executed during the respective sub-frame intervals.

22. The method of claim 18, wherein the predetermined threshold comprises 188 bytes.

23. The method of claim 18, further comprising:
before iteratively performing steps (a), (b), and (c), determining whether the sub-frame interval is a valid sub-frame interval;
if it is determined that the sub-frame interval is a valid sub-frame interval, iteratively performing steps (a), (b), and (c) while the transaction translator capacity information has the value that is less than the predetermined threshold; and
if it is determined that the sub-frame interval is not a valid sub-frame interval, waiting for a subsequent sub-frame interval to iteratively performing steps (a), (b), and (c).

24. The method of claim 18, further comprising:
for the transaction identified by the pointer associated with the selected transaction list, determining a total amount of payload data to be transmitted to or from the transaction translator associated with the selected one of the multiple transaction lists and a portion of the total amount of payload data that has been previously transmitted to or from the transaction translator associated with the selected one of the multiple transaction lists.

25. The method of claim 18, wherein the transaction translator capacity information comprises total number of bytes-in-progress, the method further comprising:
determining whether the data payload is being transmitted to or from a device coupled to a downstream hub;
if the data payload is being transmitted from the device, transmitting a transfer-initiating request to the device, incrementing the total number of bytes-in-progress by a total data payload the device is expected to transmit, and incrementing the pointer;
if the data payload is being transmitted to the device, determining whether a total amount of payload data remaining to be transmitted to the device is greater than the predetermined threshold;
if it is determined that the total amount of payload data remaining to be transmitted to the device is greater than the predetermined threshold, transmitting a transfer-initiating request to the device along with a next portion of the data payload and incrementing the total number of bytes-in-progress by an amount of payload data included in the next portion; and
if it is determined that the total amount of payload data remaining to be transmitted to the device is less than or equal to the predetermined threshold, transmitting a transfer-initiating request to the device along with a remaining portion of the data payload, incrementing the total number of bytes-in-progress by an amount of payload data included in the remaining portion, and incrementing the pointer.

26. The method of claim 18, wherein the one or more pointers comprise start-split and complete-split pointers in association with the multiple transaction lists, the start-split pointer is configured to store a value referring to a next one of the packet headers for which a start-split token should be executed, and the complete-split pointer is configured to store a value referring to a next one of the packet headers for which a complete-split token should be executed.

27. The method of claim 18, further comprising:
determining whether a time-stamp field associated with a transaction identified by the pointer associated with the selected transaction list indicates that a current sub-frame interval is at least two sub-frame intervals after a transfer-initiating request for the transaction was executed; and
if so, executing a transfer-completion request for the transaction.

28. The method of claim 18, wherein the method is repeated during each sequential sub-frame interval for each of the different ones of the multiple transaction translators.

29. The method of claim 18, wherein the transaction translator capacity information comprises total number of bytes-in-progress, the method further comprising:
during the subsequent sub-frame interval, performing steps comprising:
 (d) determining whether the total number of bytes-in-progress is less than a predetermined threshold;
 (e) iteratively performing steps (a), (b), and (c) while the total number of bytes-in-progress is less than the predetermined threshold; and
 (f) if the value is greater than or equal to the predetermined threshold, decrementing, during another subsequent sub-frame interval, the counter value by a predetermined decrement; and
repeating steps (d), (e), and (f) until all of the packet headers in the selected transaction list have been executed.

* * * * *